(12) United States Patent
Mehrvar et al.

(10) Patent No.: US 9,456,260 B2
(45) Date of Patent: Sep. 27, 2016

(54) METHOD FOR CROSSTALK AND POWER OPTIMIZATION IN SILICON PHOTONIC BASED SWITCH MATRICES

(71) Applicant: Huawei Technologies Co., Ltd., Shenzhen (CN)

(72) Inventors: Hamid Mehrvar, Ottawa (CA); Yi Qian, Shenzhen (CN); Patrick Dumais, Ottawa (CA); Dominic John Goodwill, Ottawa (CA); Eric Bernier, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 109 days.

(21) Appl. No.: 14/530,192

(22) Filed: Oct. 31, 2014

(65) Prior Publication Data

US 2015/0055951 A1 Feb. 26, 2015

Related U.S. Application Data

(63) Continuation-in-part of application No. 14/018,273, filed on Sep. 4, 2013.

(60) Provisional application No. 61/818,296, filed on May 1, 2013.

(51) Int. Cl.
*H04J 1/12* (2006.01)
*H04Q 11/00* (2006.01)
(Continued)

(52) U.S. Cl.
CPC .......... *H04Q 11/0005* (2013.01); *H04L 49/25* (2013.01); *H04L 49/40* (2013.01); *H04Q 2011/0049* (2013.01)

(58) Field of Classification Search
CPC . H04L 49/25; H04L 49/40; H04Q 2011/049; H04Q 11/005
See application file for complete search history.

(56) References Cited

U.S. PATENT DOCUMENTS 4,932,735 A * 6/1990 Koai ................. G02F 1/313
385/17
5,258,978 A * 11/1993 Cloonan ........... H04Q 11/0005
370/411
(Continued)

FOREIGN PATENT DOCUMENTS

CN 1392696 A 1/2003
EP 2365703 A2 9/2011
WO 2013028241 A1 2/2013

OTHER PUBLICATIONS

International Search Report and Written Opinion received in International Application No. PCT/CN2014/076534 mailed Jul. 28, 2014, 12 pages.
(Continued)

*Primary Examiner* — Robert Wilson
(74) *Attorney, Agent, or Firm* — Slater Matsil, LLP

(57) ABSTRACT

Recursive optimization algorithms can be used to determine which idle photonic switching elements to configure in N×N switching fabrics to achieve crosstalk suppression. Different algorithms are used to achieve different levels of optimization. Embodiment full optimization techniques may configure all inactive cells to reduce crosstalk, and consequently may provide the best noise performance and highest power usage. Partial optimizations may configure fewer than all inactive cells to reduce crosstalk, and may provide suboptimal noise performance at lower power usages. Differential partial optimization algorithms configure inactive cells in different stages of a photonic switching fabric. Fewer than all cells in a given stage may be configured by some algorithms.

20 Claims, 65 Drawing Sheets

(51) Int. Cl.
*H04L 12/947* (2013.01)
*H04L 12/931* (2013.01)

(56) References Cited

U.S. PATENT DOCUMENTS

| | | | | |
|---|---|---|---|---|
| 5,467,211 | A * | 11/1995 | Haney | H04Q 11/0005 398/45 |
| 5,570,218 | A | 10/1996 | Sotom | |
| 5,737,103 | A | 4/1998 | Jackel | |
| 6,335,930 | B1 * | 1/2002 | Lee | H04L 49/101 370/387 |
| 6,567,573 | B1 * | 5/2003 | Domash | G02B 6/12007 385/10 |
| 8,792,787 | B1 * | 7/2014 | Zhao | H04B 10/2575 398/48 |
| 9,282,384 | B1 * | 3/2016 | Graves | H04Q 11/0005 |
| 2003/0035165 | A1 | 2/2003 | Schofield | |
| 2003/0235145 | A1 * | 12/2003 | Shanbhag | H04J 14/02 370/201 |
| 2014/0161447 | A1 | 6/2014 | Graves et al. | |
| 2014/0161450 | A1 | 6/2014 | Graves et al. | |
| 2014/0269351 | A1 * | 9/2014 | Graves | H04L 49/10 370/250 |
| 2014/0328154 | A1 * | 11/2014 | Mehrvar | H04L 49/25 370/201 |
| 2014/0334818 | A1 * | 11/2014 | Mehrvar | H04Q 11/0066 398/51 |
| 2014/0334819 | A1 * | 11/2014 | Mehrvar | H04Q 11/0003 398/51 |
| 2014/0334821 | A1 * | 11/2014 | Mehrvar | H04Q 11/0005 398/54 |
| 2015/0055951 | A1 * | 2/2015 | Mehrvar | H04Q 11/0005 398/45 |
| 2015/0350753 | A1 * | 12/2015 | Mehrvar | H04Q 11/0005 398/45 |

OTHER PUBLICATIONS

Bianco, A., "Optical Interconnection Networks Based on Microring Resonators," Journal of Optical Communications and Networking, IEEE/OSA, vol. 4, No. 7, pp. 546-556, Jul. 2012.

Bianco, A., "Optical Switch Architectures Based on Microring Resonators," Dipartimento di Elettronica e Telecomunicazioni Politecnico di Torino Italy, Ajaccio, Corse, Sep. 2012, 36 pages.

Chen et al., "Compact, Low-loss and Low-power 8×8 Broadband Silicon Optical Switch," Optics Express, vol. 20, No. 17, Aug. 13, 2012, 9 pages.

Chen, L., "Silicon Photonic Integrated Circuits for WDM Technology and Optical Switch," Optical Society of America Optical Fiber Communication Conference, Mar. 17-21, 2013, 3 pages.

International Search Report received in Application No. PCT/US14/63541 mailed Apr. 3, 2015, 8 pages.

Nashimoto, K., et al., "Nano-Second Response, Polarization Insensitive and Low-Power Consumption PLZT 4×4 Matrix Optical Switch." Optical Society of America Optical Fiber Communication Conference, Mar. 6-10, 2011, pp. 1-20.

Kabacinski, W., "Modified Dilated Benes Networks for Photonic Switching," IEEE Transactions on Communications, vol. 47, No. 8, Aug. 1999, pp. 1253-1259.

Qian, Y., et al., "Crosstalk Optimization in Low Extinction—Ratio Switch Fabrics," Optical Fiber Communications Conference and Exhibition (OFC), Mar. 2014, San Francisco, CA, pp. 1-3.

Song, G., "Asymmetric Dilation of Multiwavelength Cross-Connect Switches for Low-Crosstalk WDM Optical Networks," Journal of Lightwave Technology, vol. 15, No. 3, Mar. 1997, pp. 430-436.

* cited by examiner

| | OCCURRENCE | 1st | 2nd | 3rd | 4th | 5th |
|---|---|---|---|---|---|---|
| CLASS 1 | 4608 | 0 | 1 | 2 | 4 | 0 |
| CLASS 2 | 2880 | 0 | 1 | 4 | 2 | 0 |
| CLASS 3 | 4608 | 0 | 1 | 3 | 3 | 0 |
| CLASS 4 | 4608 | 0 | 0 | 5 | 2 | 0 |
| CLASS 5 | 11520 | 0 | 0 | 4 | 3 | 0 |
| CLASS 6 | 3072 | 0 | 1 | 1 | 5 | 0 |
| CLASS 7 | 4608 | 0 | 0 | 3 | 4 | 0 |
| CLASS 8 | 1536 | 0 | 1 | 2 | 3 | 1 |
| CLASS 9 | 768 | 0 | 0 | 3 | 3 | 1 |
| CLASS 10 | 1536 | 0 | 0 | 2 | 5 | 0 |
| CLASS 11 | 576 | 0 | 1 | 0 | 6 | 0 |

| RESULTS/ METHOD | FIRST CROSS-TALK | SECOND CROSS-TALK | THIRD CROSS-TALK | FOURTH CROSS-TALK | FIFTH CROSS-TALK | AVERAGE ELECTRICAL LEVEL | AVERAGE GLOBAL POWER | NUMBER OF IDLE CELLS ASSIGNED | ACTUAL ASSIGNED NUMBER |
|---|---|---|---|---|---|---|---|---|---|
| -3db SPLITTER OR COUPLER (NO CROSSTALK OPTIMIZATION) | 0 | 1.2857 WORST CASE: 3 | 0 | | | 0.0204 | 42.4 | 0 | 0 |
| St.5 INACTIVE CELLS REDEFINED | 0 | 1.169047 | 0.495238 | 0 | 0 | 0.0195 | 46.9 | 8 | 0 TO 8 |
| FIXED-16 | 0 | 0.992225 | 0.997018 | 0 | 0 | 0.0177 | 51.9 | 16 | FIXED |
| St.4 INACTIVE CELLS REDEFINED | 0 | 1 | 0.952380 | 0 | 0 | 0.0177 | 52.8 | 24 | 0 TO 24 |
| St.4 AND 5 INACTIVE CELLS REDEFINED | 0 | 0.964286 | 1.038095 | 0.190476 | 0 | 0.0174 | 54.3 | 32 | 0 TO 32 |
| FIXED-40 | 0 | 0.80729 | 2.485125 | 0 | 0 | 0.0178 | 61.8 | 40 | FIXED |
| St.3 AND 4 INACTIVE CELLS REDEFINED | 0 | 0.714286 | 2.857143 | 0 | 0 | 0.0170 | 65 | 48 | FIXED |
| ALL IDLE OFF (CROSS) | 0 | 0.714286 | 2.571429 | 3.714286 | 0 | 0.0174 | 68 | 64 | FIXED |
| PERFORMANCE OPTIMIZED | 0 | 0.4286 | 3.2 | 3.3143 | 0.0571 | 0.014 | 71.9 | 64 | FIXED |

FIG. 11

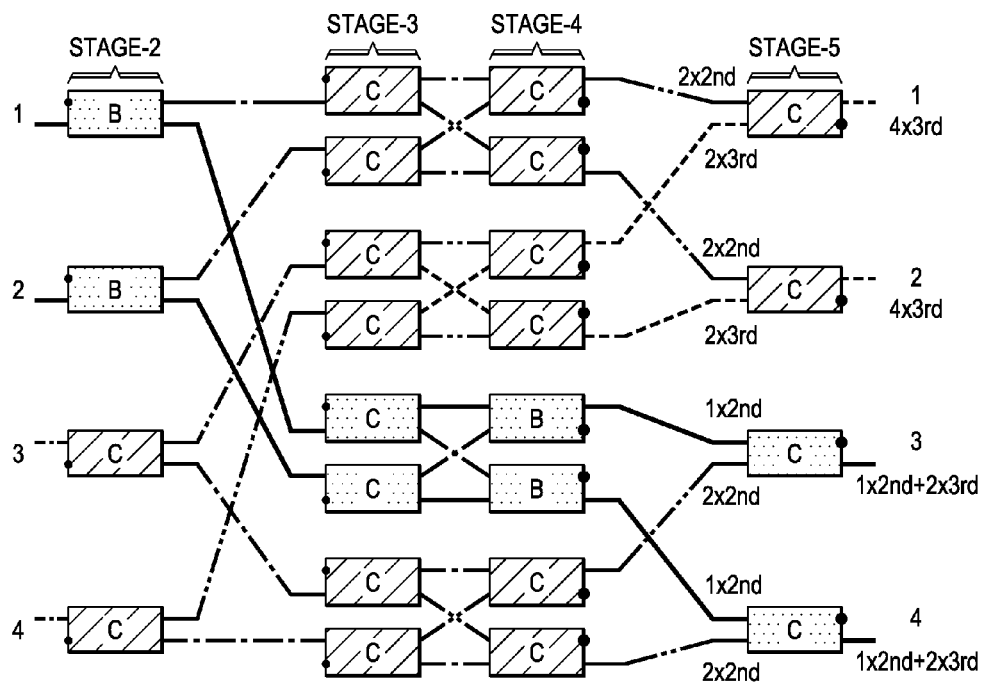
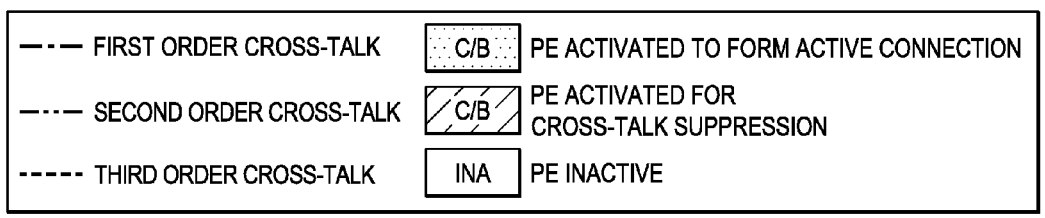
FIG. 17C

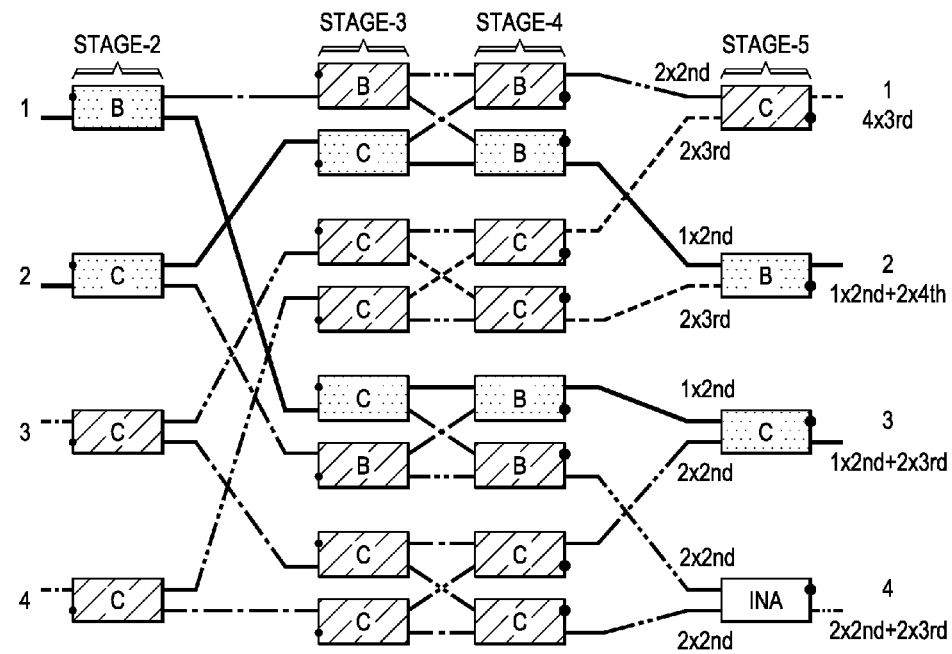
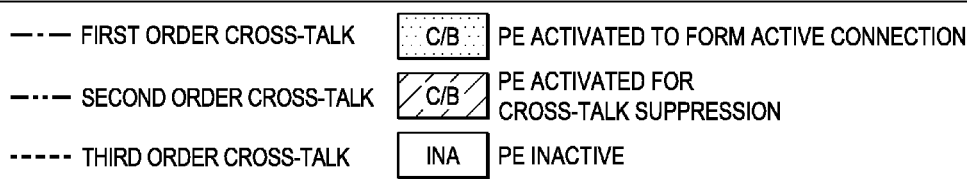
FIG. 17D

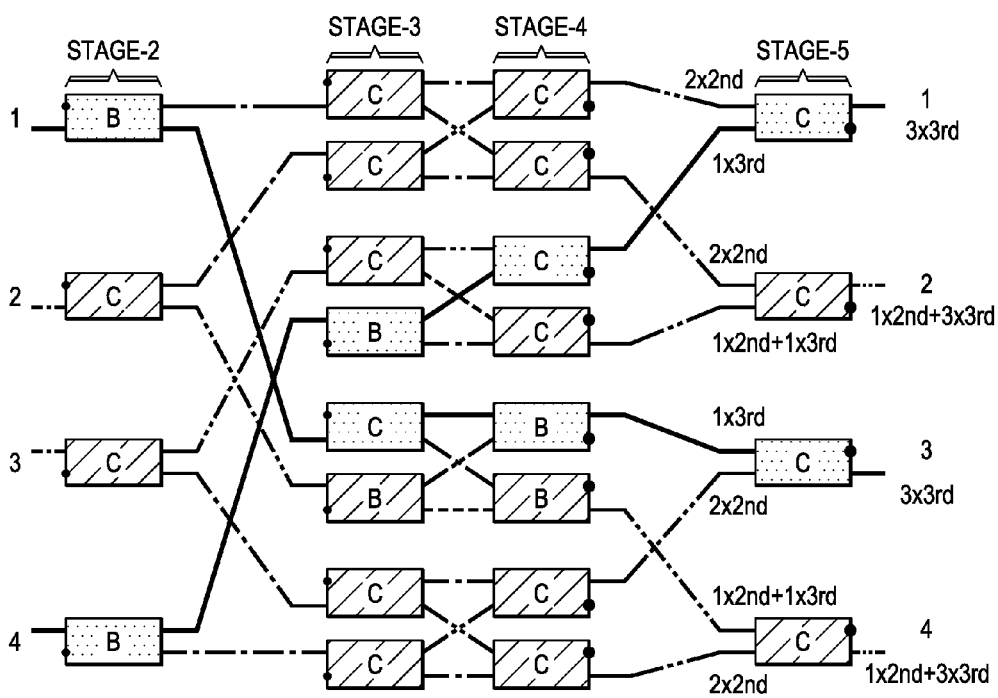
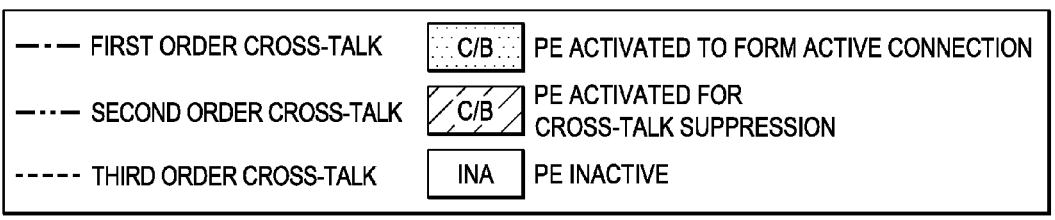
FIG. 17L

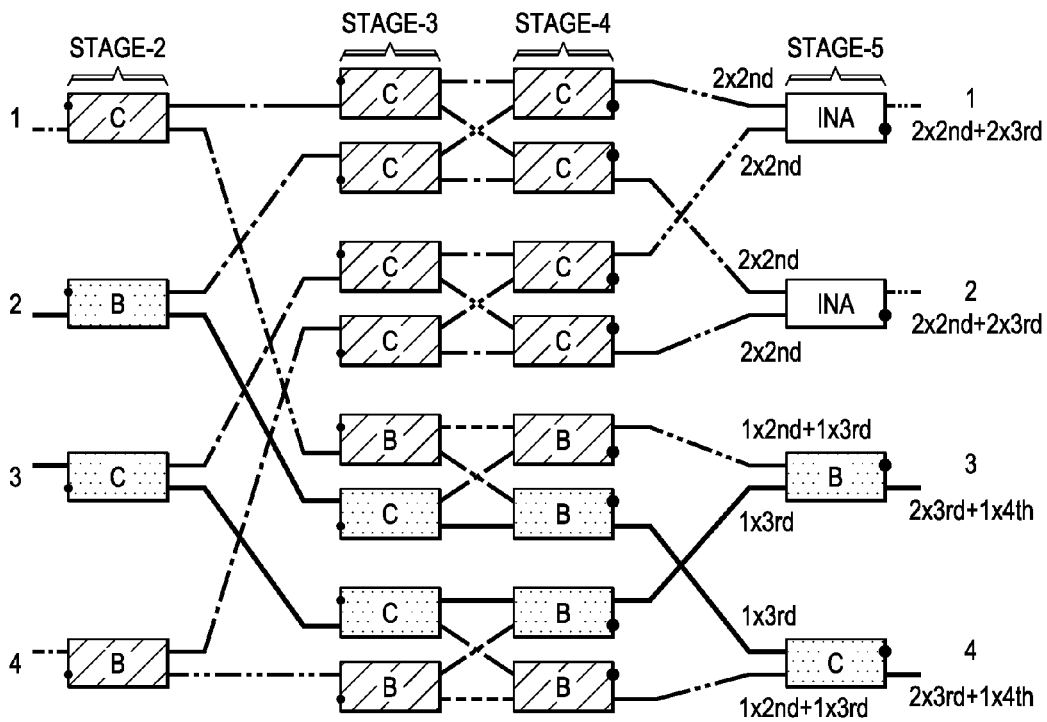
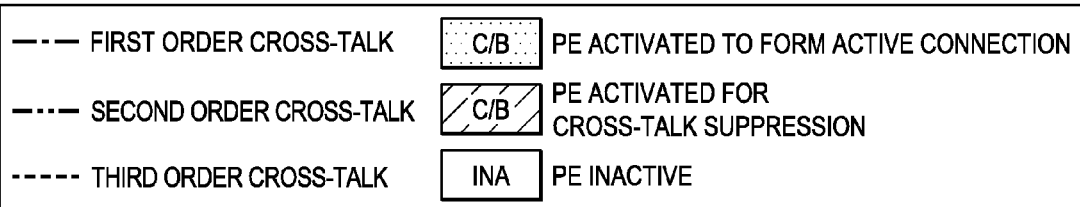
FIG. 17O

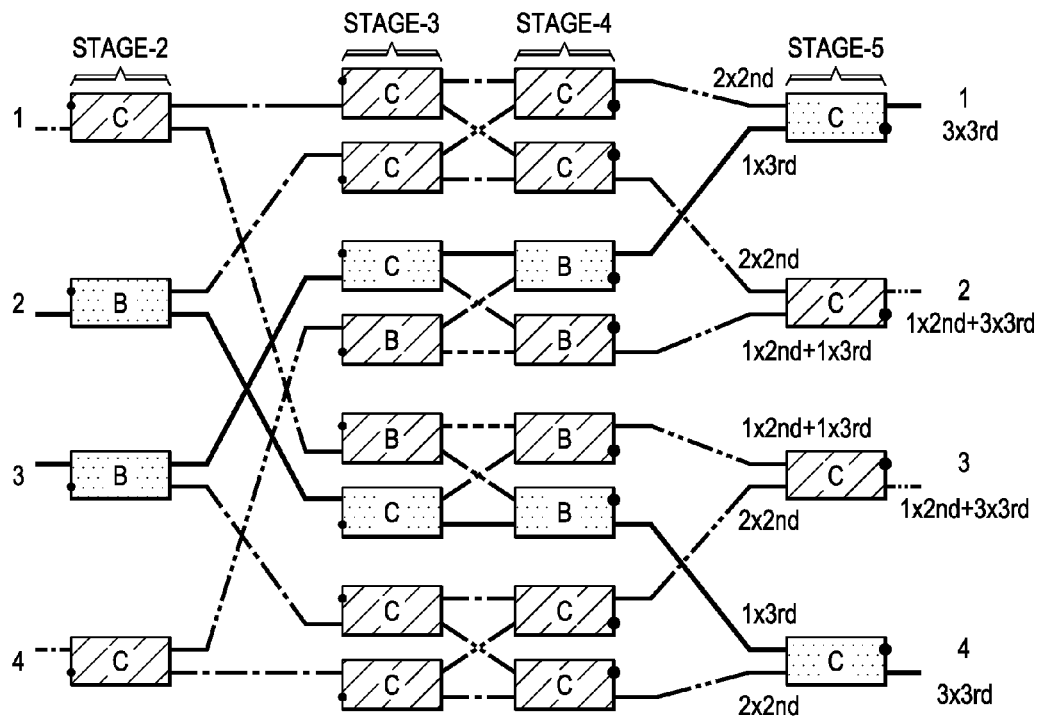
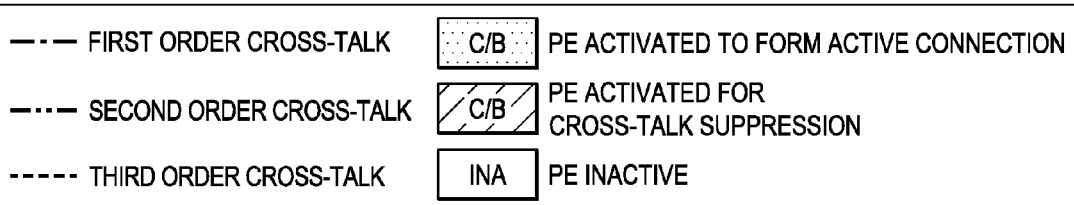
FIG. 17P

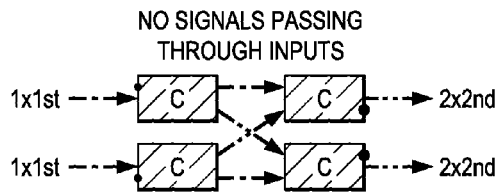
FIG. 19A
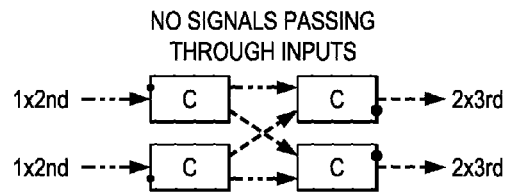
FIG. 19B
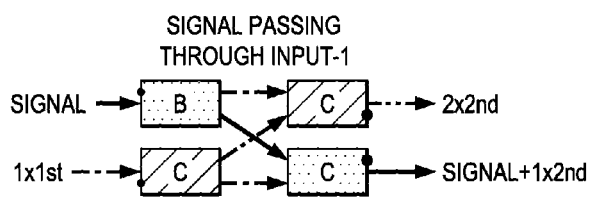
FIG. 19C
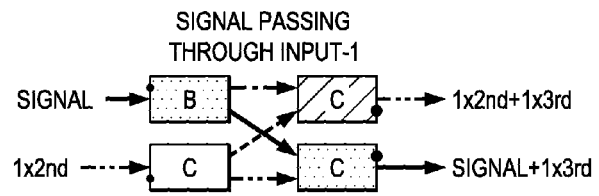
FIG. 19D
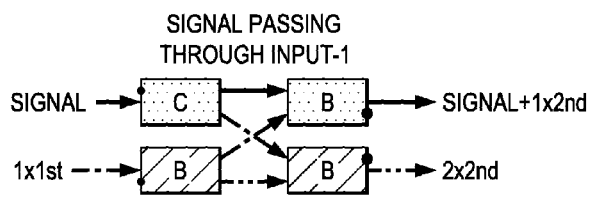
FIG. 19E
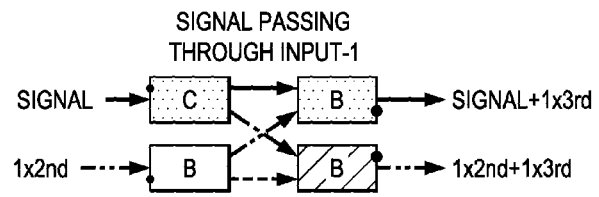
FIG. 19F
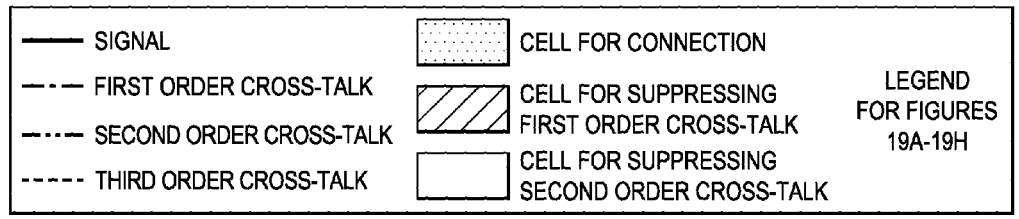

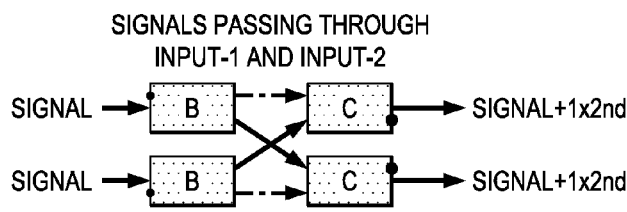
FIG. 19G
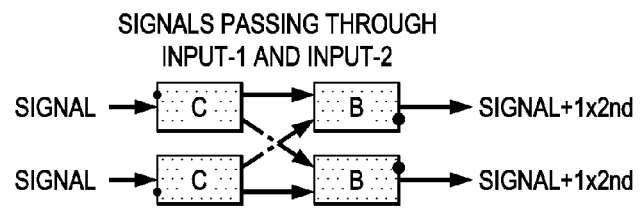
FIG. 19H
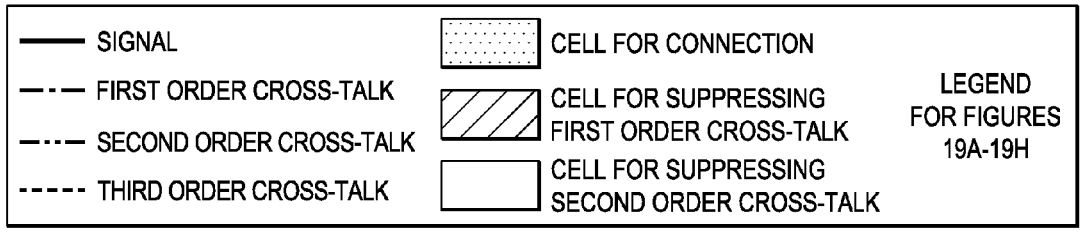

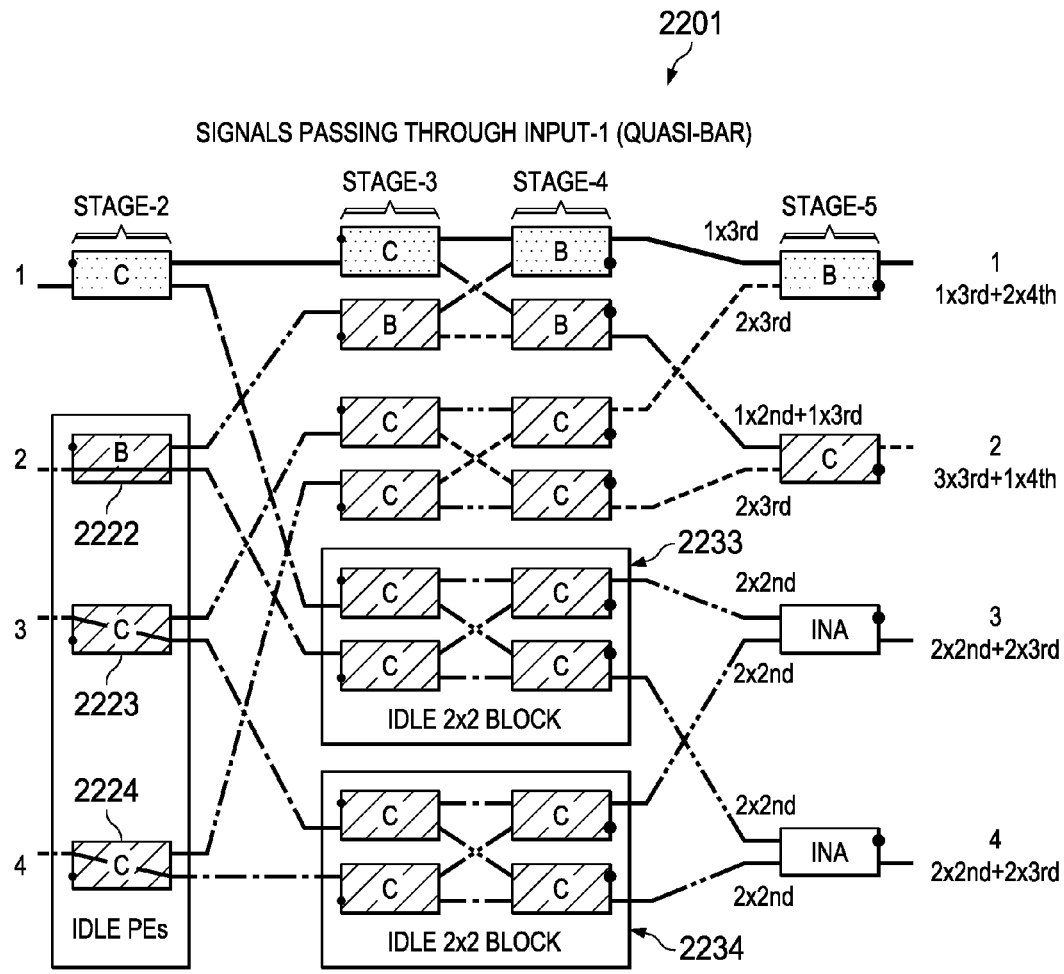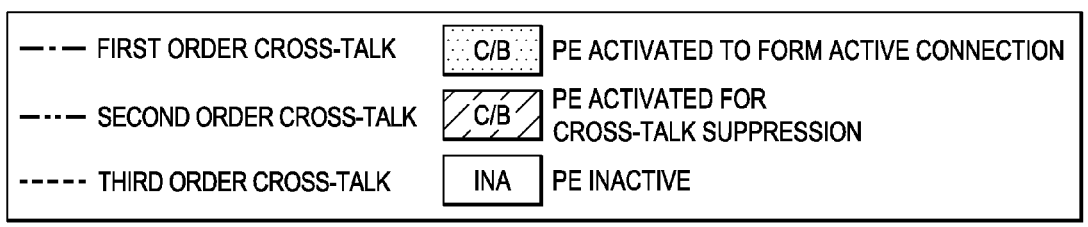
FIG. 22A

| | 1st CROSSTALK | 2nd CROSSTALK | 3rd CROSSTALK | 4th CROSSTALK | 5th CROSSTALK | AVERAGE OUTPUT CROSSTALK (dB) | AVERAGE GLOBAL POWER | GLOBAL POWER RANGE | IDLE CELLS' ASSIGNED NUMBER | ACTUAL ASSIGNED NUMBER |
|---|---|---|---|---|---|---|---|---|---|---|
| -3dB SPLITTER OR COUPLER (AVERAGE PERFORMANCE WHEN IDLE CELLS UNPOWERED) | 0 | 1.2857 | 0 | 0 | 0 | -33.8 | 42.4 | FIXED | 0 | 0 |
| ST.5 INACTIVE CELLS REDEFINED | 0 | 1.169047 | 0.495238 | 0 | 0 | -34.2 | 46.9 | MIN 42.4 MAX 49.6 | 8 | 0 TO 8 |
| FIXED-16 | 0 | 0.992225 | 0.997018 | 0 | 0 | -35.03 | 51.9 | MIN 48.8 MAX 54.8 | 16 | FIXED |
| ST.4 INACTIVE CELLS REDEFINED | 0 | 1 | 0.952380 | 0 | 0 | -35.01 | 52.8 | MIN 42.4 MAX 60 | 24 | 0 TO 24 |
| ST.4 AND 5 INACTIVE CELLS REDEFINED | 0 | 0.964286 | 1.038095 | 0.190476 | 0 | -35.2 | 54.3 | MIN 42.4 MAX 60 | 32 | 0 TO 24 |
| FIXED-40 | 0 | 0.80729 | 2.485125 | 0 | 0 | -35.01 | 61.8 | MIN 58.4 MAX 66.4 | 40 | FIXED |
| ST.3 AND 4 INACTIVE CELLS REDEFINED | 0 | 0.714286 | 2.857143 | 3.714286 | 0 | -35.38 | 65 | MIN 61.6 MAX 69.6 | 48 | FIXED |
| ALL IDLE OFF | 0 | 0.714286 | 2.571429 | 3.3143 | 0 | -35.2 | 68 | FIXED | 64 | FIXED |
| FULL OPTIMIZATION | 0 | 0.4286 | 3.2 | 3.3143 | 0.0571 | -37.07 | 71.9 | MIN 64.8 MAX 84 | 64 | FIXED |

FIG. 30

METHOD FOR CROSSTALK AND POWER OPTIMIZATION IN SILICON PHOTONIC BASED SWITCH MATRICES

This application is a continuation-in-part of U.S. Non Provisional application Ser. No. 14/018,273 filed on Sep. 4, 2013, entitled "Method for Crosstalk and Power Optimization in Silicon Photonic Based Switch Matrices," which claims the benefit of U.S. Provisional Application No. 61/818,296 filed on May 1, 2013, entitled "Method for Crosstalk and Power Optimization in Silicon Photonic Based Switch Matrices," both of which are incorporated herein by reference as if reproduced in its entireties.

TECHNICAL FIELD

The present invention relates to Photonic Integrated Circuits (PICs), and, in particular embodiments, to methods for crosstalk and power optimization in silicon photonic based switches.

BACKGROUND

Modern day optical networks may use N×N photonic switching fabrics to interconnect inputs and outputs in central offices and other network switching locations. The N×N photonic switching fabrics may include multiple passive silicon photonic elements. By way of example, an 8×8 photonic switch may include a total of 112 1×2 photonic elements with half of them is 1×2 and the other half is 2×1. In practice, the photonic elements exhibit non-ideal performance such that at least a portion of the signal leaks over to the non-selected output. For example, in a 1×2 photonic element having a "bar" configuration (e.g., input-1 is connected to output-1), at least a portion of the signal will leak over the output-2. Likewise, in a 1×2 photonic element having a "cross" configuration (e.g., input-1 is connected to output-2), at least a portion of the signal will leak over the output-1. The degree to which the signal leaks across may depend on the extinction ratio of the photonic element, with photonic elements having high extinction ratios exhibiting less leakage than those having low extinction ratios. Signal leakage across the individual photonic elements accumulates throughout the switch fabric and ultimately leads to cross-talk noise amongst the various output ports in the N×N photonic switch, which degrades network performance. Accordingly, techniques and mechanisms for reducing crosstalk in N×N photonic switches is desired.

SUMMARY OF THE INVENTION

Technical advantages are generally achieved, by embodiments of this disclosure which describe methods for crosstalk and power optimization in silicon photonic based switches.

In accordance with an embodiment, a method for determining switching configurations of idle cells to suppress cross-talk in photonic switching fabrics is provided. In this example, the method includes identifying signal paths through an N×N photonic switching fabric. The N×N photonic switching fabric includes N input ports, N output ports, and a plurality of photonic elements (PEs) positioned in between the N input ports and the N output ports. The plurality of PEs are arranged in a central stage of 2×2 PE blocks, a first set of PE stages positioned in between the central stage and the N input ports, and a second set of PE stages positioned in between the central stage and the N output ports. The method further includes identifying idle PEs in the plurality of PEs, and determining a cross-talk suppression map for the idle PEs in accordance with a recursive algorithm. The idle PEs are inactive when the N×N photonic switching fabric is configured to provide the signal paths, and the cross-talk suppression map specifies active configurations for at least one idle PE to reduce cross-talk between the signal paths. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which:

FIG. 11 illustrates a table depicting optimization methods with associated average crosstalk profiles and power consumption;

FIGS. 19A-19H illustrate diagrams of embodiment switching configurations for 2×2 photonic switching sub-networks;

FIGS. 22A-22C illustrate diagrams for configuring idle cells in an Sth stage of an N×N switching fabric based on M×M blocks in the N×N switching fabric;

FIG. 30 illustrates a chart summarizing performance characteristics for different optimization schemes in 8×8 banyan switching fabrics;

DETAILED DESCRIPTION OF ILLUSTRATIVE EMBODIMENTS

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Photonic elements operate in either an active (i.e., powered) mode or an inactive (i.e., unpowered) mode depending on whether a power signal is being supplied. In the active mode, the switching configuration of the photonic element is selected by the operator to determine which output is connected to the input. In the inactive state, the switching configuration is not determined by the operator, and instead varies depending on environmental conditions (e.g., temperature, time, etc.) and/or characteristics of the photonic element. Conventional photonic switching fabrics are configured to supply a power signal only to those photonic elements needed to establish a connection, which allows photonic elements that are excluded from the active connections to remain inactive for the purpose of conserving power. However, the inactive photonic elements nevertheless reside in a cross or bar configuration, and therefore inactive connections are formed within the switching fabric. These inactivate connections allow crosstalk to propagate to the output ports, thereby producing noise in the output signals and reducing the ratio of signal power to noise power.

As discussed in U.S. Non Provisional application Ser. No. 14/018,273, it is possible to suppress crosstalk in photonic switching fabrics by activating unused photonic elements in a manner that inhibits the propagation of cross-talk over the switching fabric. Aspects of this disclosure provide different recursive optimization algorithms for determining which idle photonic switching elements need to be configured in N×N switching fabrics to achieve crosstalk suppression. Different algorithms are used to achieve different levels of optimization.

Figure 1A:
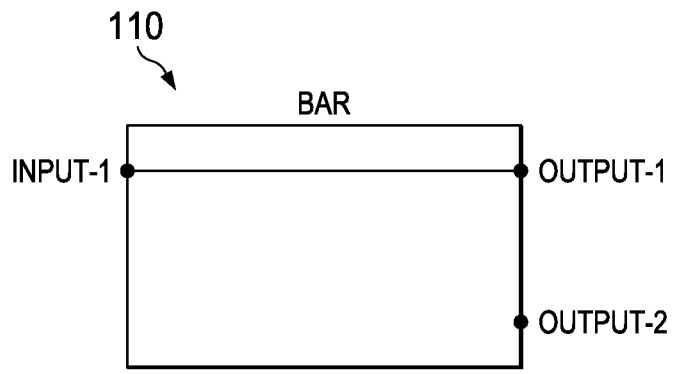
FIG. 1A illustrates a diagram of an embodiment photonic element in a bar configuration.
Figure 1B:
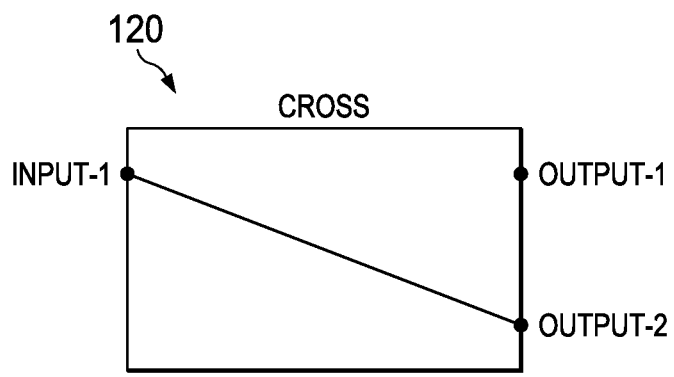
FIG. 1B illustrates a diagram of an embodiment photonic element in a cross configuration.

Photonic elements come in a variety of configurations, including 1×2 and 2×2 configurations. The descriptions included herein discuss photonic elements primarily in the context of a 1×2 configuration. However, aspects of this disclosure are extendable to other photonic element configurations, including (but not limited to) 2×2 configurations. Photonic elements can be in either a bar or cross configuration. FIG. 1A illustrates a photonic element 110 comprising a bar configuration in which the input port (input-1) being connected to the first output port (output-1), while FIG. 1B illustrates a photonic element 120 comprising a cross configuration in which the input port (input-1) is connected to the second output port (output-2).

Figure 2A:
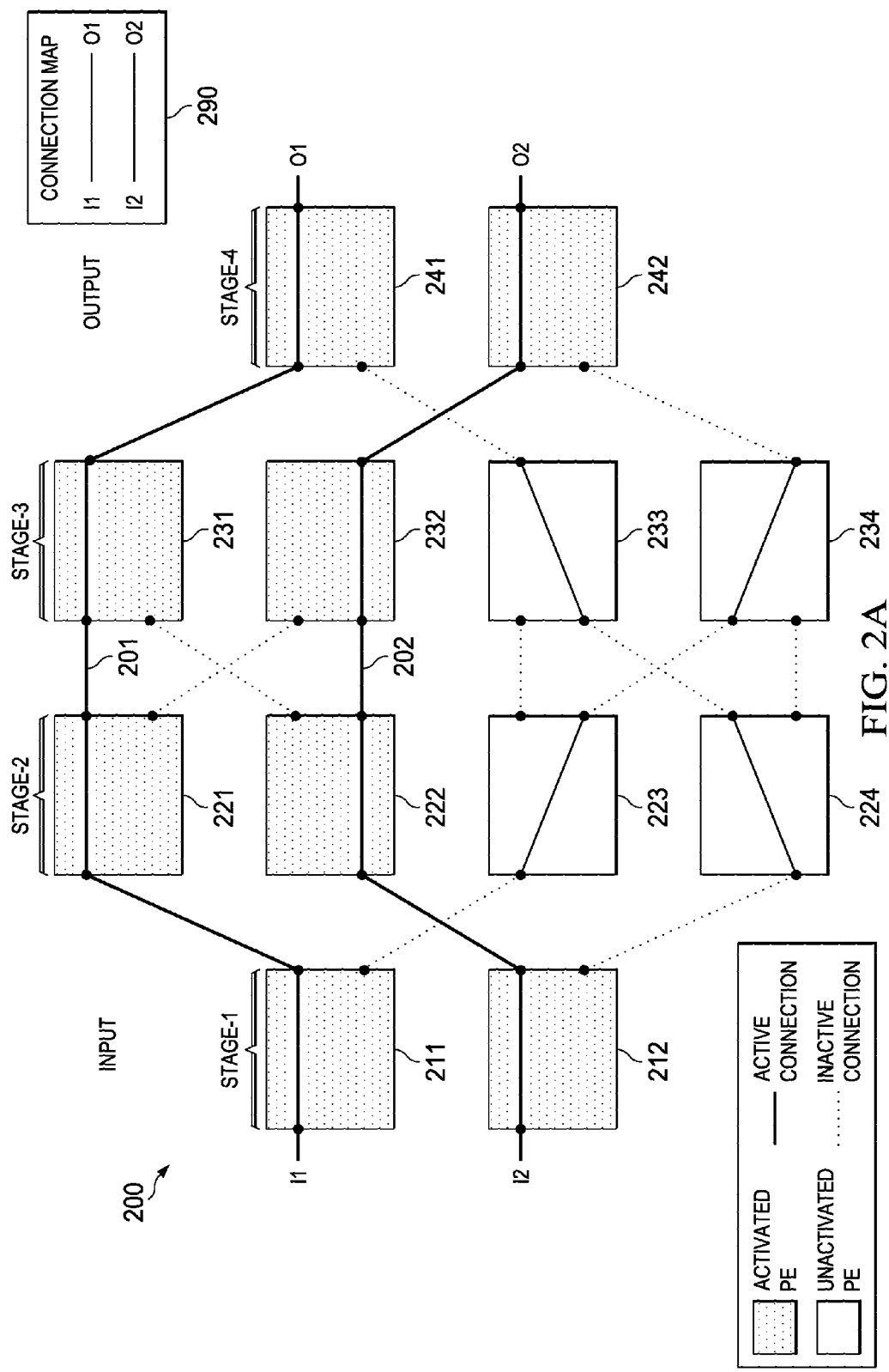
FIGS. 2A-2B illustrate diagrams of a photonic switching fabric.

Groups of photonic elements may be arranged to form a photonic switching fabric. FIG. 2A illustrates a photonic switching fabric 200 comprising a first input port ($I_1$), second input port ($I_2$), first output port ($O_1$), a second output port ($O_2$), and a plurality of photonic elements. The photonic elements are arranged in a first stage of photonic elements 211, 212, a second stage of photonic elements 221-224, a third stage of photonic elements 231-234, and a fourth stage of photonic elements 241, 242. As shown, a switching configuration of the photonic switching fabric 200 is defined by a connection map 290, which specifies that $I_1$ is connected to $O_1$ and $I_2$ is connected to $O_2$. To achieve this switching configuration, photonic elements 211, 221, 231, 241, are activated to form the active connection 201 between $I_1$ and $O_1$, while photonic elements 212, 222, 232, 242, are activated to form the active connection 202 between $I_2$ and $O_2$. Conventionally, photonic elements 223, 224, 233, 234 would remain inactive, as they are not used to form active connections.

Figure 2B:
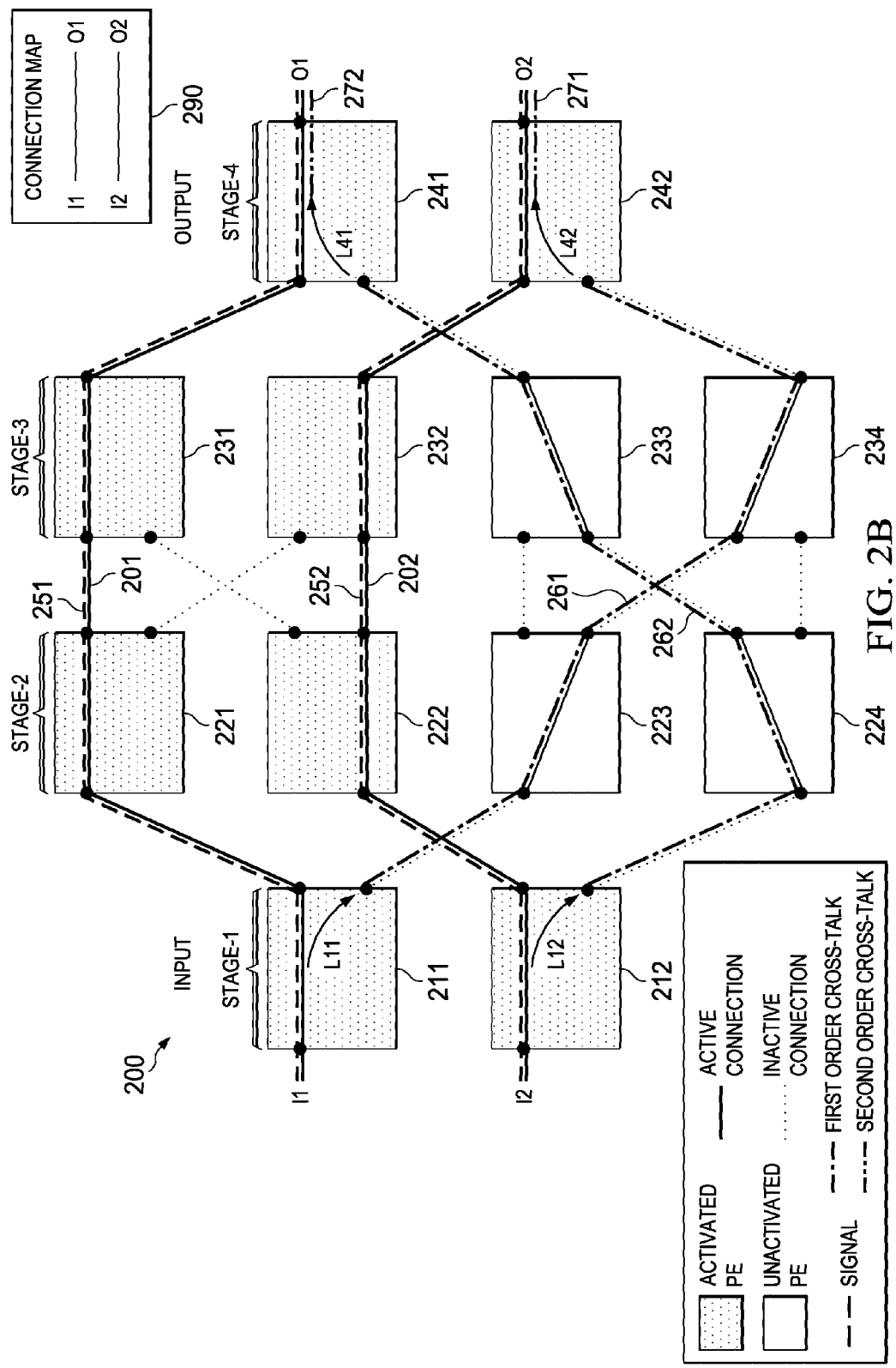

FIG. 2B illustrates how signals 251, 252 are transferred from the input ports to the output ports over the active connections 201 and 202. Notably, first stage photonic elements 211, 212 have an extinction ratio that allows a portion ($L_{11}$, $L_{12}$) of the signals 251, 252 to leak across the outputs of the photonic elements, thereby producing first order cross-talk signals 261, 262. For purposes of clarity and concision, the cross-talk produced by the active photonic elements 221, 222, 231, 232 is disregarded in FIG. 2B. Conventionally, the unused photonic elements 223, 224, 233, 234 are inactive, and therefore can assume either a bar or cross configuration depending on environmental conditions and/or photonic element characteristics. In this example, the inactive photonic elements 223, 224, 233, 234 have a cross configuration, which allows the first order crosstalk signals 261, 262 to propagate all the way to the fourth stage photonic elements 241, 242. The fourth stage photonic elements 241, 242 also have an extinction ratio that allows a portion ($L_{41}$, $L_{42}$) of the first order cross-talk signals 261, 262 to leak across the outputs, thereby forming second order cross-talk signals 271, 272. Accordingly, the output signal of $O_1$ includes the signal 251 as well as a second order cross-talk signal 272, while the output of $O_2$ includes the signal 252 as well as a second order cross-talk signal 271.

Figure 3:
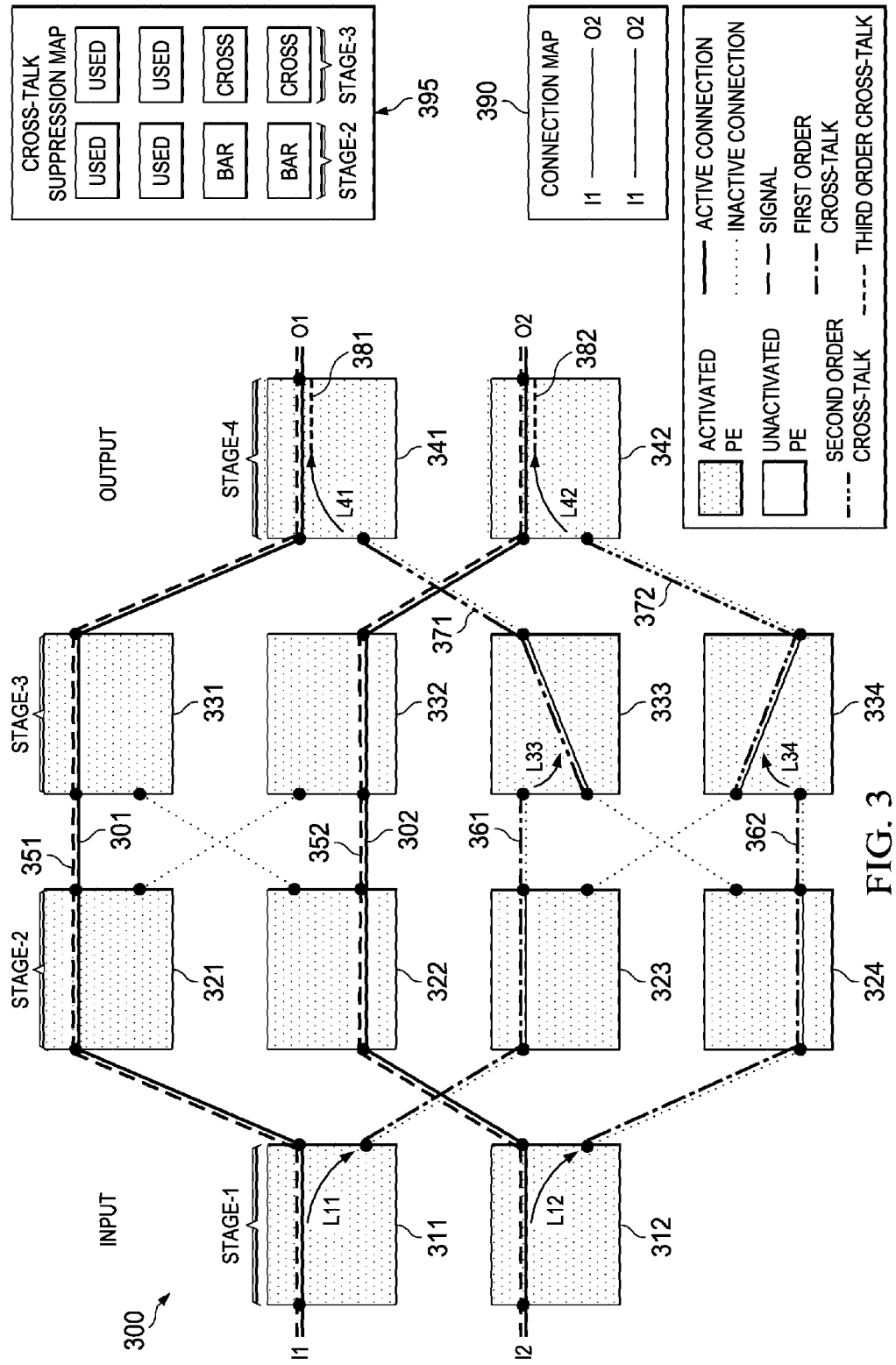
FIG. 3 illustrates a diagram of an embodiment photonic switching fabric.

Aspects of this disclosure activate unused photonic elements in order to suppress crosstalk in photonic switching fabrics. FIG. 3 illustrates a photonic switching fabric 300 that is configured for cross-talk suppression. The photonic switching fabric 300 has a similar structure to the switching fabric 200, and includes a plurality of photonic elements 311-342 that are arranged in four stages. The photonic switching fabric 300 has a switching configuration that is defined by a connection map 390. The connection map 390 is identical to the connection map 290, and consequently the photonic elements 311, 312, 321, 322 331, 332, 341, and 342 are activated to form the active connection 301, 302, over which the signals 351, 352 propagate from the input ports to the output ports. However, the photonic switching fabric 300 differs from the photonic switching fabric 200 in that the unused photonic elements 323, 324, 333, 334 are activated in order to suppress crosstalk. More specifically, the unused photonic elements 323, 324, 333, 334 are activated in accordance with the crosstalk suppression map 395 such that the photonic elements 323,324 are set to a bar configuration and the photonic elements 333, 334 are set to a cross configuration. Activation of the unused photonic elements 323, 324, 333, 334 in this manner blocks the first order crosstalk signals 361, 362 from reaching the third stage of the photonic switching architecture 300. The photonic elements 333, 334 have extinction ratios that allow a portion ($L_{33}$ and $L_{34}$) of the first order crosstalk signals 361, 362 to leak to outputs, thereby creating second order crosstalk signals 371, 372. The second order crosstalk signals 371, 372 produce third order crosstalk 381, 382 at the fourth stage of the switching fabric 340, and the third order crosstalk signals 381, 382 produce interference over the output ports $O_1$ and $O_2$. As a note, residual crosstalk that would normally be produced from the extinction ratios of the photonic elements 321-322 and 331-332 is disregarded in FIG. 3 for the sake of clarity. Notably, activating the unused photonic elements 323, 324, 333, 334 reduces the order of crosstalk experienced over the output ports of the switching fabric architecture 300, thereby reducing the average level interference in the output signals.

The principals described above can be applied to larger switching fabrics, as well as to switching fabrics that include 2×2 photonic elements. Another class of architectures uses 1×2 and 2×1 switch elements in a dilated Banyan fabric. Features of a dilated Banyan architecture include the ability to eliminate first order crosstalk at the output. Dilated Banyan architectures often require many more switch elements, as only parts of them are used for establishing connections between inputs and outputs, meaning that some unused elements exist.

For dilated Banyan that uses 1×2 and 2×1 photonic integrated circuits (PIC) elements as a building block, there is a need for an optimizer algorithm. The algorithm uses Switch Element (SE) Crosstalk level (or extinction ratio interchangeably is used in some arts) and intelligently optimizes both power consumption and crosstalk level by applying a connection map dependent state assignment to the unused switching elements. The method/algorithm achieves an acceptable level of crosstalk at the output and minimizes the power consumption of the switch. In this disclosure, a switch architecture equipped with this method is referred to as an "Enhanced Dilated Banyan" (EDB). The algorithm offers flexibility based on Switch Element (SE) Crosstalk level to flexibly adjust crosstalk and/or power levels for each connection map. The algorithm reduces crosstalk levels for High Crosstalk SEs. The algorithm minimizes power consumption for low crosstalk SEs. The algorithm optimizes both the crosstalk level and power for medium crosstalk SEs.

The next generation photonic switches for Metro and Packet switching should not only be non-blocking and scale, but also should offer low cross-talk and crosstalk uniformity at each output of the switch to allow for a better transient behavior.

Figure 4:
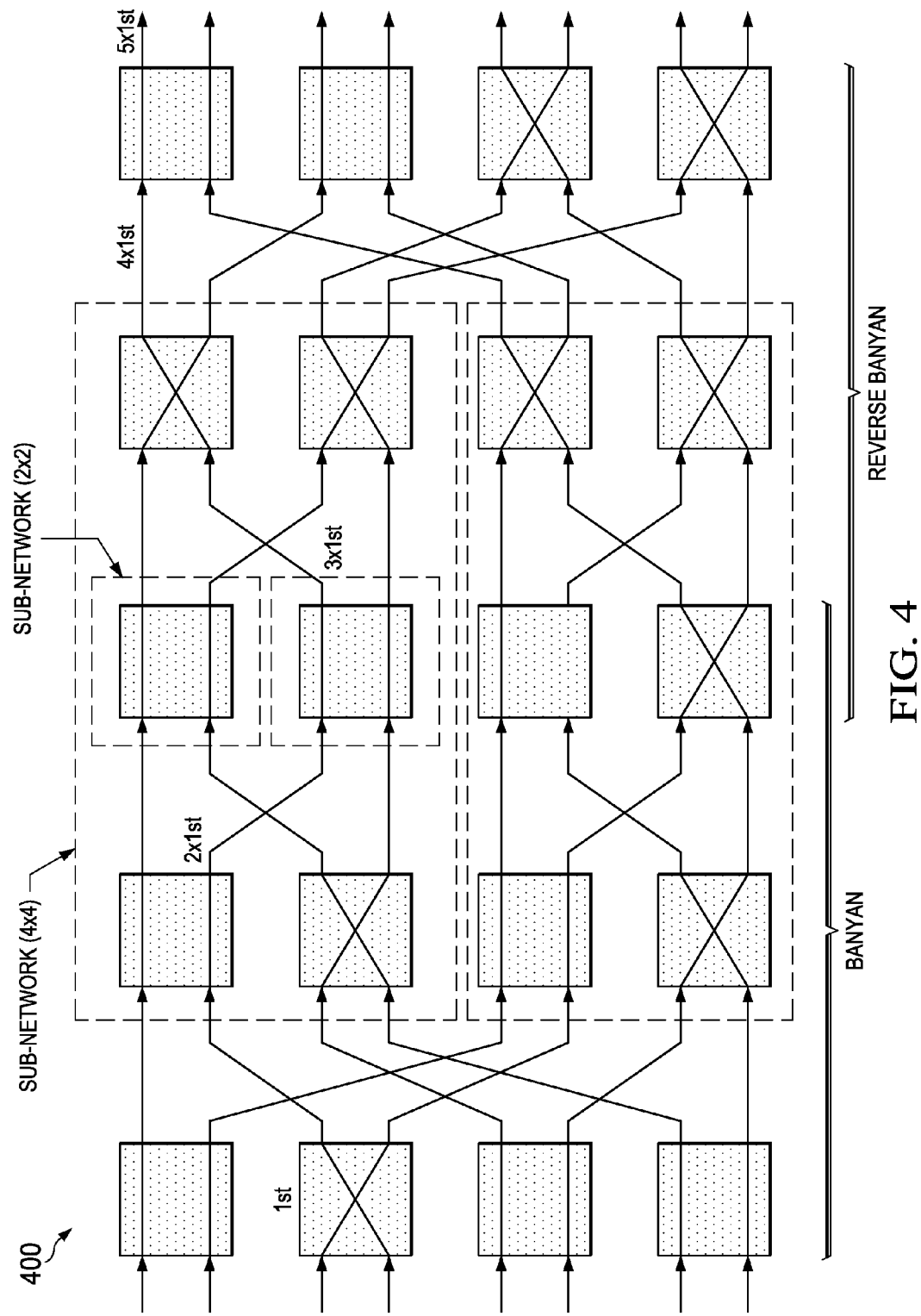
FIG. 4 illustrates a diagram of a recursive construction of a Benes network.

One class of optical switches uses 2×2 switching elements (e.g., MMI-based implementation using passive silicon photonics) as building blocks arranged in a multistage Benes architecture. The benefit of the Benes architecture is low chip count and low power. However, the problem is the buildup of crosstalk noise on a certain channel due to the interference with other signals inside the 2×2 Switch elements, resulting in appearance of first order crosstalk at the output. This crosstalk propagates to the output, and is added at each stage. FIG. 4 illustrates a recursive construction of Benes network from 2×2 switching elements. As shown in each output there are five elements of first order crosstalk. This is because at the output of each stage, there is a first order cross-talk from the other outputs.

Another class of the switches uses 1×2 and 2×1 elements (also implemented using passive silicon photonic) connected in a dilated Banyan architecture. The benefit of dilated Banyan is lower cross talk compared to the Benes architecture. However, the problem is high chip count and lower utilization of the chips as there will be many unused elements. Simple method of un-powering all the un-used elements result in relatively higher crosstalk at the output (which is still much lower than Benes) but may not be acceptable for high SE crosstalk (or low extinction ratio). Putting all the unused switch cells in a fixed state of 'cross' or 'bar' may not yield the required crosstalk performance while it adds to power consumption or heat for the chip.

The dilated Banyan architecture inherently eliminates the first order crosstalk; however, the level of second order crosstalk at each output could vary. The existing methods do not have any crosstalk optimization embedded into connection map algorithm. The novelty of this disclosure is to intelligently assign some or all of the unused switch cells to offer a low and uniform crosstalk at all the outputs. The assigned unused cells depend on a connection map. For an N×N switch, total number of connection maps is N!=1×2 . . . ×N. The proposed algorithm offers both crosstalk and power optimization depending on the modes of operation and/or depending on the extinction ratio of manufactured cells.

Figure 5:
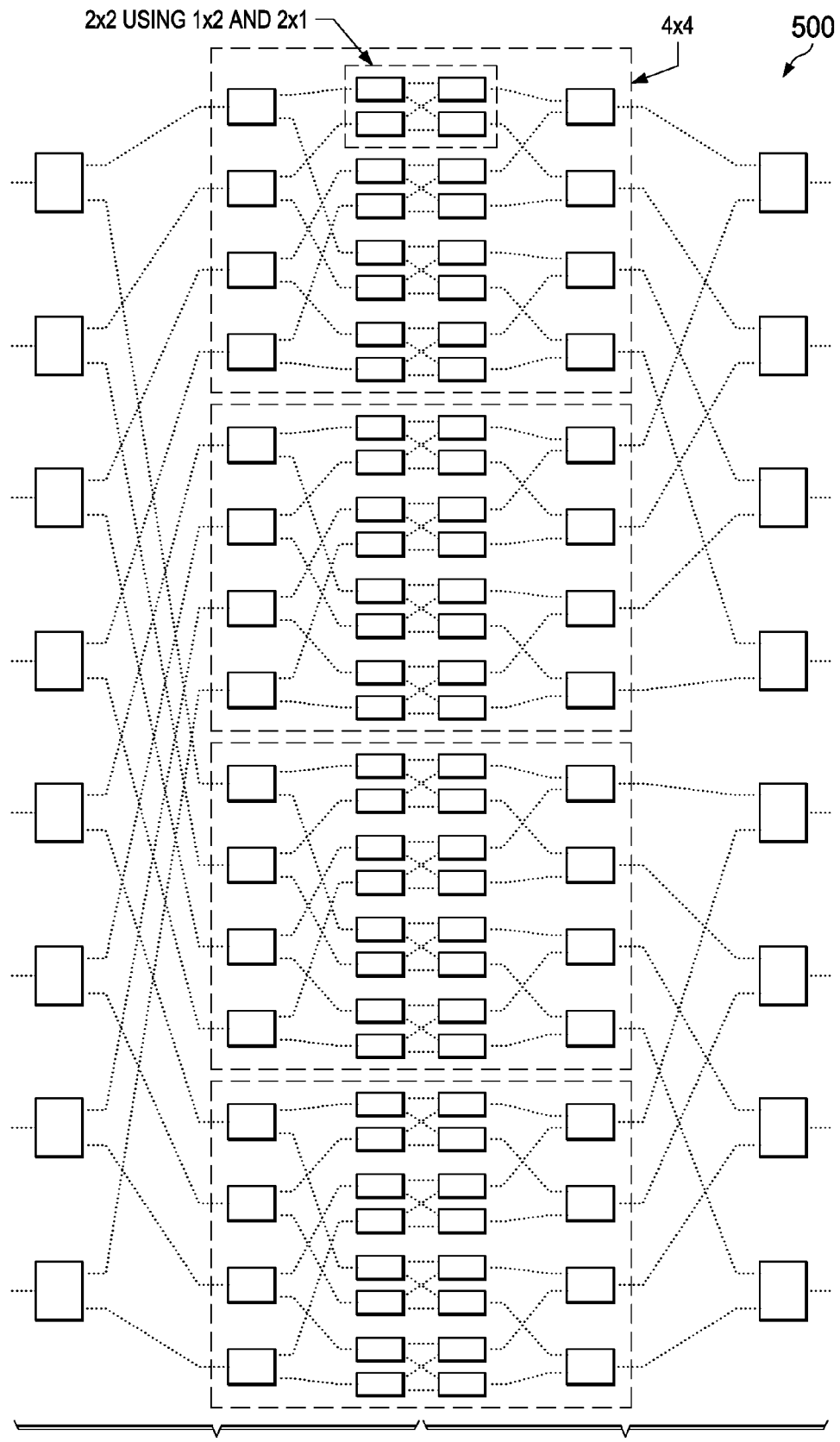
FIG. 5 illustrates a diagram of a dilated Banyan architecture.

The dilated Banyan architecture for building non-blocking low crosstalk switch has been shown in FIG. 5. The building block is 1×2 and 2×1 switching elements implemented in Photonic Integrated Circuit (PIC). As seen, the recursive nature has some similarity and some differences with Benes architecture. The following describes techniques for building 2×2, 4×4, 8×8, and 16×16 switching elements in accordance with this disclosure: 2×2 switching elements include First stage columns (Two 1×2) and Second stage columns (Two 2×1); 4×4 switching elements include First stage columns (Four 1×2), Middle stage columns (Four 2×2), and Third stage columns (Four 2×1); 8×8 switching elements (shown in FIG. 5) include First stage columns (Eight 1×2), Middle stage columns (Four 4×4), Third stage columns (Eight 2×1); 16×16 switching elements include First stage columns (Sixteen 1×2), Middle stage columns (Four 8×8), and Third stage columns (Sixteen 2×1); N×N switching elements include First stage columns (N 1×2), Middle stage columns (Four N/2×N/2); and Third stage columns (N 2×1).

Figure 6:
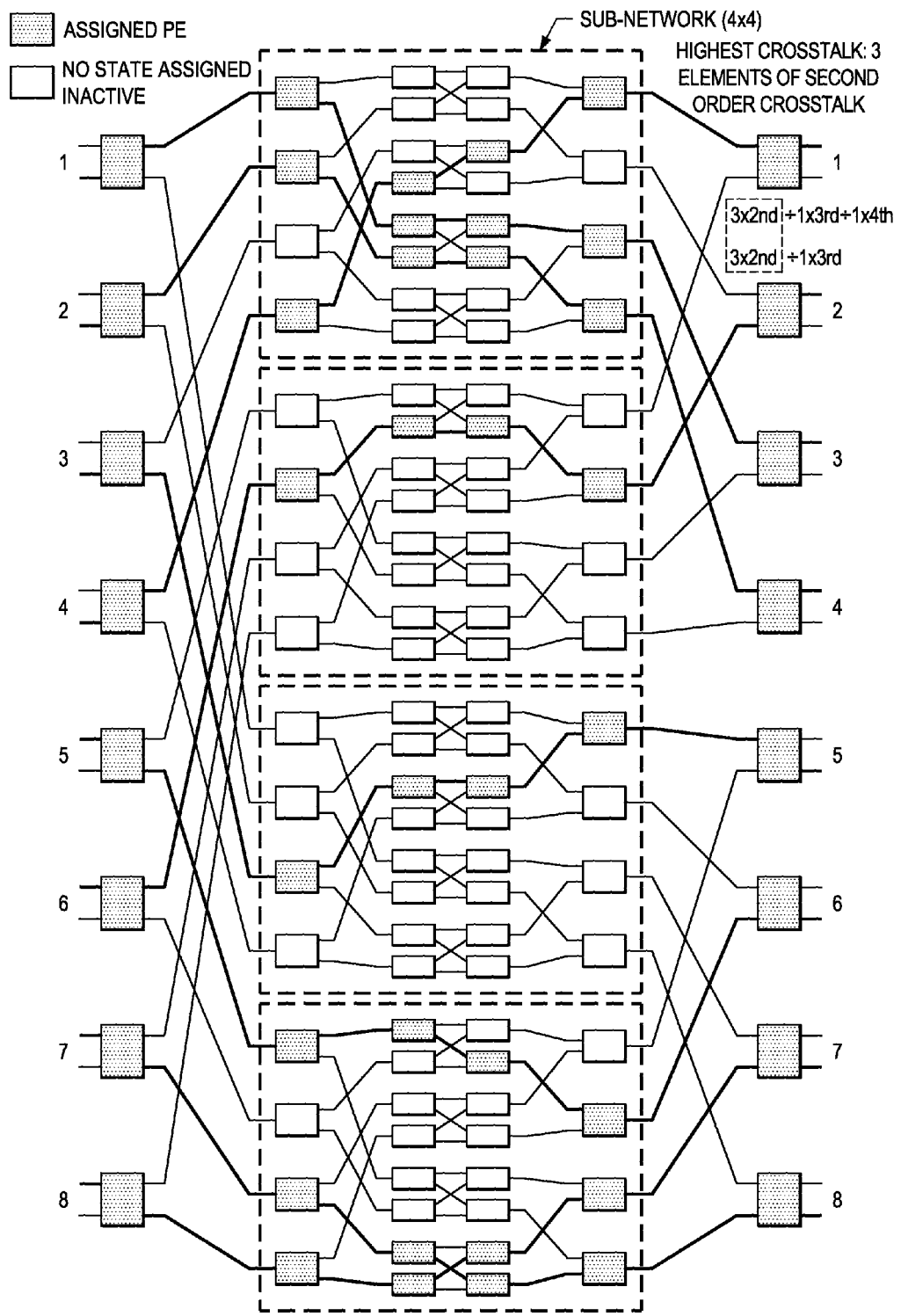
FIG. 6 illustrates a diagram of a maximum crosstalk of a dilated Banyan architecture.

The switching element architecture can be described using a four metrics point of view, namely blocking, crosstalk, implementation, and power. (i) Blocking—Architecture in FIG. 4 is re-arrange-able non-blocking while the architecture in FIG. 5 is strictly non-blocking; (ii) Crosstalk—The architecture differences between the two lead to significant performance improvement in terms of crosstalk. For 8×8 Benes, as shown in FIG. 4, the maximum amount of crosstalk at the output is five elements of first order. However, for dilated Banyan, the maximum amount of crosstalk at the output is when the inactive cell is swinging to worst possible state and results in 3 elements of second crosstalk at the output as shown in FIG. 6; (iii) Implementation—Both could use the same silicon Photonic using MZI 2×2 or 1×2; (iv) Power—Assuming bar state consumes most power (say a normalized unit of 1), and cross state consumes a normalized unit of 0.5 and inactive state consumes a normalized unit of 0.1, then the total power is Benes: 10×cross+10×Bar=15, Dilated Banyan with no crosstalk optimization: 24×Cross+24*Bar+68*Inactive=42.8. FIG. 6 illustrates a Maximum Crosstalk of a dilated Banyan with no optimization performed. All unused cells are un-powered.

Regarding crosstalk optimization, with no loss of generality, we assume an 8×8 dilated Banyan based on 1×2 and 2×1 switching cells as an illustrative example of a dilated architecture. For a given connection map of 8 inputs connecting to 8 outputs: 48 used elements (dotted cells as in FIG. 6); and 64 unused elements (white Cells as in FIG. 6).

For a given switch element crosstalk (or extinction ratio), with no optimization, a maximum of 3 elements of second Order crosstalk appears at each output. The key idea is to use the unused idle switch elements to reduce crosstalk level at the output while minimizing the overall switch power. The crosstalk optimized case is used when low extinction ratio of each element result in high output crosstalk, hence, it is important to reduce the level of crosstalk from the maximum of 3 elements on each output.

Figure 7A:
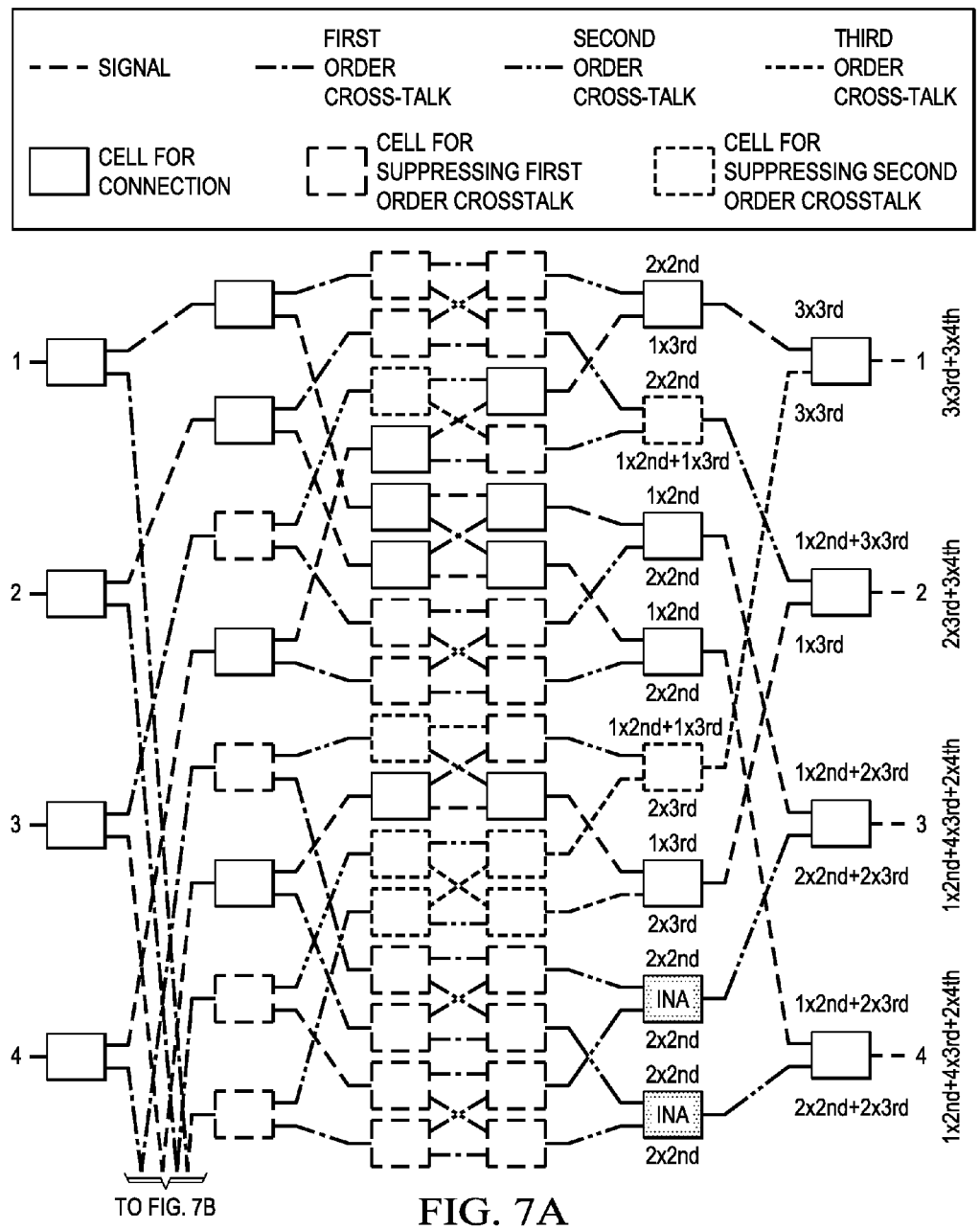
FIGS. 7A-7B illustrates a diagram of crosstalk optimization for a given connection map.
Figure 7B:
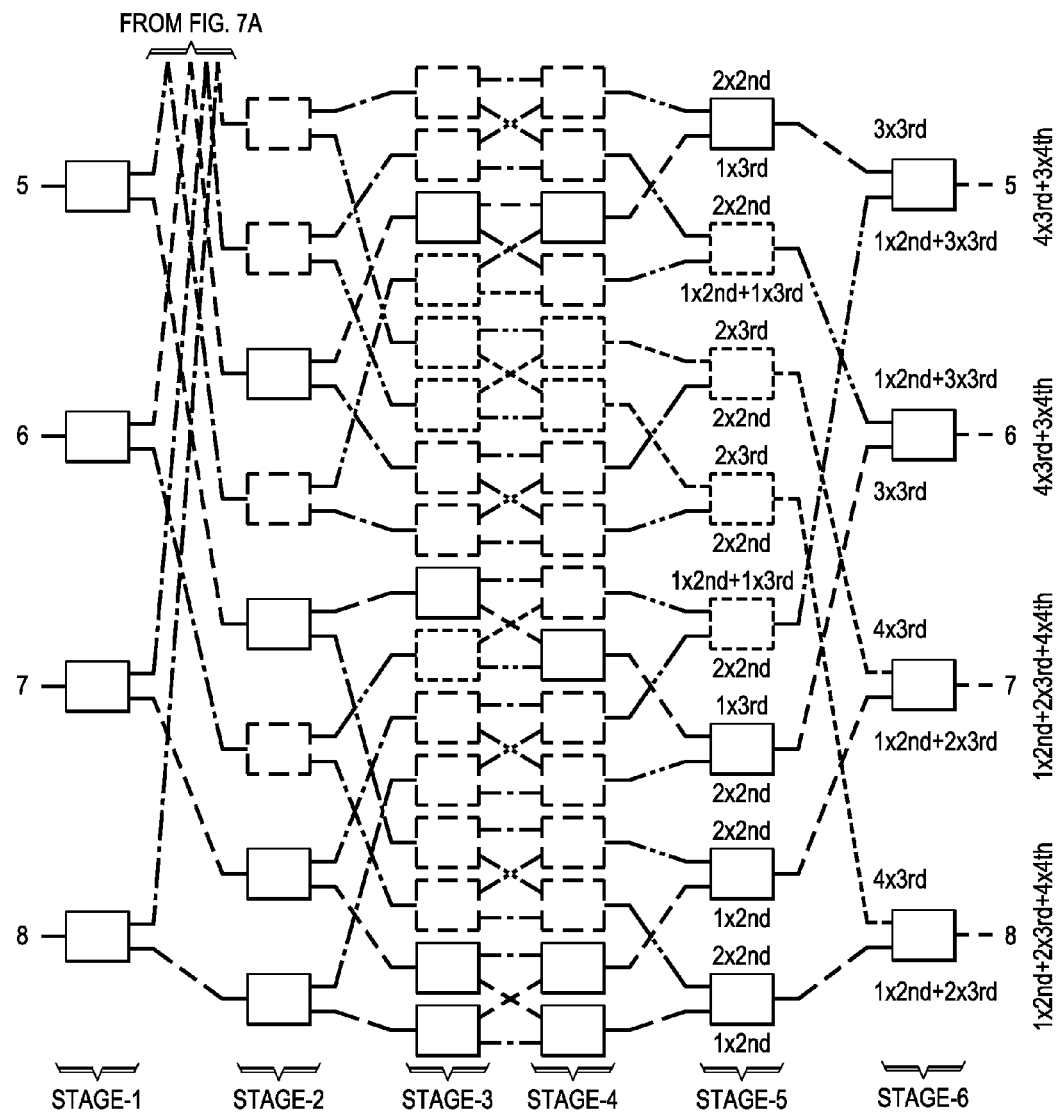

FIGS. 7A-7B illustrates an example of crosstalk optimization for a given connection map. Note that for an 8×8, there are 8!=40320 different connection maps. FIG. 7A-7B illustrate crosstalk optimized case with an average of 0.43 element of second crosstalk on each output (comparing to a maximum of 3 elements of second crosstalk). This means that 43% of all the connection in 40320 maps have one second order crosstalk element at the output while 57% of them has no second order crosstalk at the output.

The optimizer algorithm looks into crosstalk level at each stage, and makes proper assignments of the unused cells to degrade the crosstalk level that is propagated to the outputs. For crosstalk optimized case, all or most of unused cells are assigned at the expense of higher power or heat. For other cases, where it is desirable to have the power reduced, the crosstalk severity at each stage is ordered and subsets of the unused cells are assigned so the remainder of unused cells can be un-powered.

Figure 8:
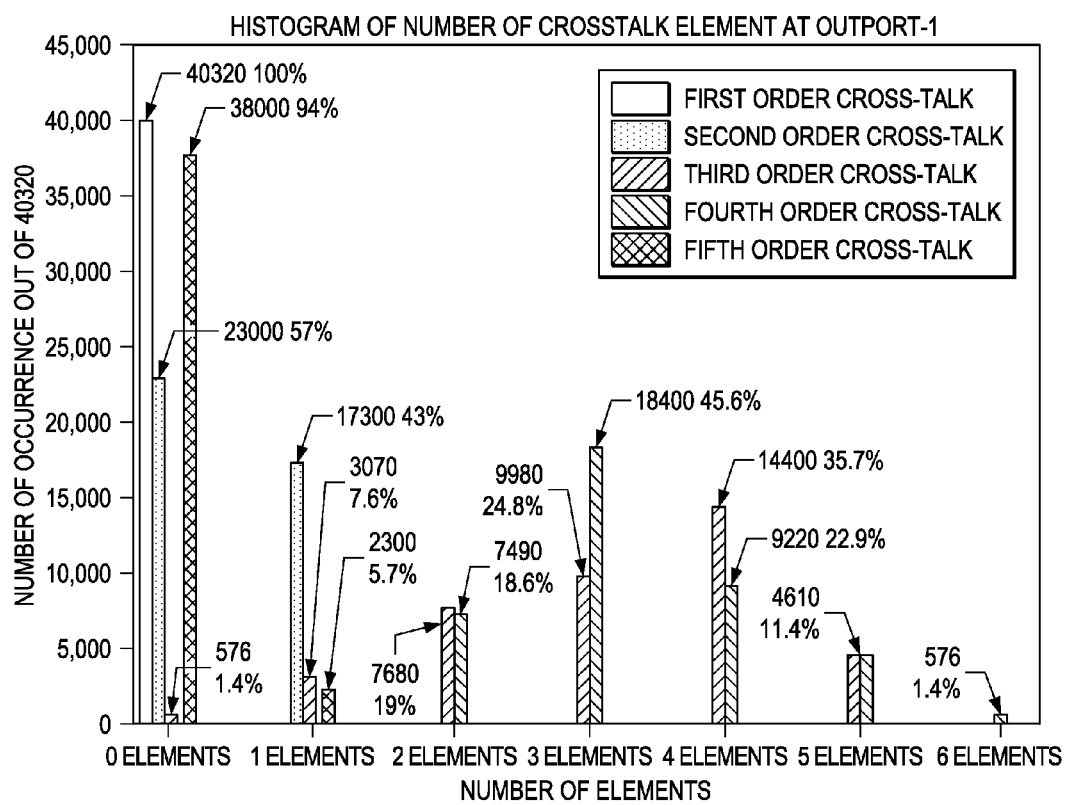
FIG. 8 illustrates a graph depicting a histogram of crosstalk elements.

The optimizer algorithm that assigns certain states (cross, bar or inactive) based on the input/output connection map has been applied to all 8! cases and the results of optimization has been obtained. FIG. 8 illustrates a Histogram of crosstalk elements on all different input/output connection maps. As shown there is no first order crosstalk on any output as the x-axis with "0 elements" covers 100% of the first order. There are 57% of the outputs that have no second crosstalk while 43% have one element of second crosstalk. In contrast, the non-optimized case has 3 elements of second order crosstalk. The algorithms use the unused switch cells and assign them proper states so as to reduce the order of the crosstalk at the expense of increasing power.

Figures 9, 10:
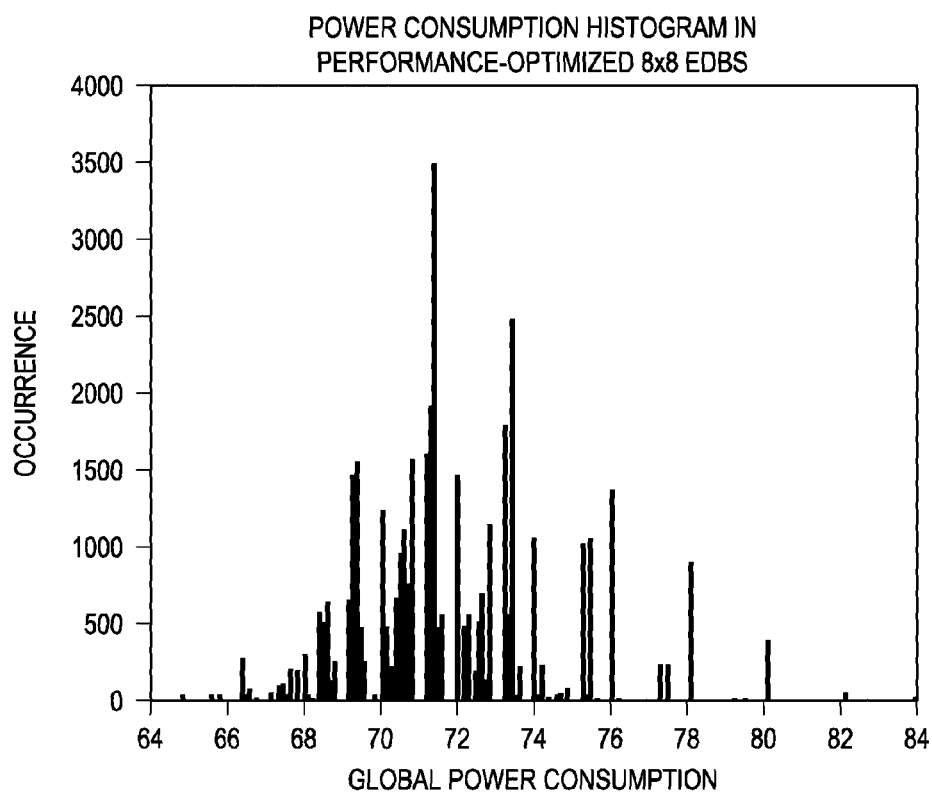
FIG. 9 illustrates a graph depicting global power consumption.
FIG. 10 illustrates a table depicting various crosstalk profiles for crosstalk optimization.

For crosstalk optimized case, the calculation of power consumption (based on the assumption of 1 for bar, 0.5 for cross and 0.1 for inactive) for the crosstalk optimized case for all 40320 cases has been shown in FIG. 9. For connection cells there are 48 elements with 24 cells in cross and 24 cells in bar states requiring 36 units of power for connection. After crosstalk optimization with assigning states to unused cells, the average global power consumption is about 72—that means the performance optimization cost almost the same amount as full connection power consumption. FIG. 9 illustrates a power consumption Histogram for all connections when only crosstalk optimization is performed.

FIG. 10 illustrates a table depicting various crosstalk profiles for Crosstalk optimized case. For the total of 40320 connection map possibilities, there are eleven classes of crosstalk for fully crosstalk optimized case. Column 1 of FIG. 10 shows occurrence of each class out of 40320 possibilities. As shown, five classes have no second order crosstalk and six classes have one element of second order crosstalk. This is in contrast with worst case of three elements of second crosstalk for non-optimized case.

Regarding power optimization, one goal of power optimization is to develop an algorithm by which the full connection 8×8 Enhance Dilated Banyan switch can have a fair output crosstalk performance with minimized power consumption. As seen in FIG. 9, power consumption for crosstalk-optimized is between 64 and 82 with an average power of 72. Comparing this with a minimum power case of 42.8 when all idle cells are inactive, there seems to be a middle ground. Depending on the crosstalk value of the switch elements, one may decide to use the crosstalk optimized case only or power-optimized or somewhere in between. A low crosstalk value for a switch element (or high extinction ration) is −30 dB where one might perform power optimization only. A high value for switch element crosstalk (or low extinction ratio) is −12 dB, where one might consider crosstalk optimization only. For a medium value extinction ratio, say −18 dB, one could perform an optimization for either power or crosstalk or on both. We consider the following spectrum for optimization and we calculate both power and crosstalk results: Power-optimized case (no crosstalk optimization, no idle cell assignment and assuming idle cells on average act as −3 dB splitters); Stage 5 inactive cells assigned proper states (0 to 8 cells assignment); Fixed 16 unused cells assignment (depending on connection map, 16 cells of stage 4 and 5 are assigned); Stage 4 inactive cells assigned proper states (some or all 24 cells of stage 4 are assigned); Stages 4 and 5 inactive cells assigned proper states (0 to 24 cells of stage stages 4 and 5 are assigned depending on connection map); Fixed-40 unused cells assignment (depending on connection map, 40 cells of the 48 cells of stage 3 and 4 are assigned); Stages 3 and 4 inactive cells assigned proper states (all 48 idle cells of stages 3 and 4 are assigned); all unused switch cells in cross (Off) state meaning all 64 idle cells of 8×8 in the example are assigned cross state); crosstalk optimized case (all 64 idle cells are assigned).

FIG. 11 illustrates optimization possibilities from one spectrum of fully power-optimized (no crosstalk optimization) to another spectrum of fully crosstalk optimized with in-between cases of both power and crosstalk optimization. FIG. 11 assumes an extinction ratio of −18 dB for switch elements. As shown in FIG. 11, the results for one of the optimum scenarios in which stage 4 and 5 optimization is performed results in 0.96 element of second cross-talk in output with average power of 54.

Aspects of this disclosure provide: Crosstalk minimization for dilated Banyan architecture; crosstalk optimization for route and select architecture and switches with tree architecture; Methods to change second order crosstalk using state assignment of the unused cells; Methods to optimize the power and crosstalk based on deployment scenarios. Aspects of this disclosure relate to High capacity optical switches operating at the packet level or similar switches operating at the long-packet (differentiated packet stream) level.

A Photonic Integrated Circuit (PIC) allows integration of various photonic components such as switching fabric on a single substrate. This disclosure relate to an N×N switch matrix architecture by interconnection of 1×2 (or 1×k) and 2×1 (or k×1) switching elements integrated into a PIC chip, where k=2, 3, . . . . An N×N route and select architecture shown in FIG. 12 or Dilated Banyan shown in FIG. 13-A are aspects of this disclosure. One of the salient features of dilated Banyan or route and select architecture is the elimination of first order crosstalk at switch outputs at the expense of larger number of switching elements. For this architecture, the accumulated crosstalk noise from all other channels at each switch output is at most second order crosstalk. When extinction ratio of each switch element is high, the effect of accumulated crosstalk at the output is insignificant. However, with low or medium extinction ratio, the impact of second order crosstalk is considerable and there is a need to reduce its impact.

In an N×N Dilated Banyan switch, the total number of switch elements is $2N*(N-1)$, out of which $2N*\log 2(N)$ is used to provide the connectivity of N inputs to N outputs. For high extinction ratio switch cells, e.g., −30 dB, these idle switches can be un-powered to minimize chip power consumption. However, for low to medium extinction ratio switch cells, state assignment of these unused switches can reduce the impact and the orders of the accumulated crosstalk at the output. This disclosure provides an optimization technique that intelligently assigns unused $2N*(N-1-\log 2(N))$ switches to 'cross', 'bar' or 'inactive' states so as to improve the crosstalk performance to an acceptable value while the chip power consumption is maintained at a relatively low level.

Aspects of this disclosure address the merits of dilated Banyan or route and select PIC switch by performing crosstalk analysis of an 8×8 fabric with no optimization, e.g., un-powering all the idle switch elements, and compare the results with that of an 8×8 Benes switch. Aspects of this disclosure apply an optimizer algorithm, for low to medium extinction ratios, to further reduce the accumulated crosstalk at the output. The results show that with a medium PIC Switch Element (SE) crosstalk of −18 dB (or extinction ratio of 18 dB) with no-optimization the average number of second crosstalk signal at each output is 1.29, and a maximum of three second crosstalk elements, and the power consumption is minimum. With addition of layers of optimization rules at various stages, the crosstalk performance is improved while the power consumption starts to increase. The highest level of crosstalk optimization achieves an average of 0.43 element of second-order crosstalk signal on each output (one third of the average of non-optimized case) while the power is increased on average 67% from its minimum level. Dilated Banyan with optimizers are referred to as Enhanced dilated Banyans (EDBs). For each characterized value of the extinction ratio for the manufactured switch cell, the algorithm allows optimized operation of EDB based on chip power requirement and the target accumulated crosstalk performance.

The following references are related to subject matter of the present application. Each of these references is incorporated herein by reference in its entirety: Keiichi Nashimoto, David Kudzuma, Hui Han, "Nano-Second Response, Polarization Insensitive and Low-Power Consumption PLZT 4×4 Matrix Optical Switch, OSA/OFC/NFOEF 2011; Andrea Bianco, "Optical Switch Architectures Based on Microring Resonators"; L. Chen, "Silicon photonic integrated circuits for WDM technology and optical switch," Optical Fiber Communications Conference, 2013, paper OW1C.1.

An embodiment photonic switch or a plurality of such switches using 1×2 and 1×k components, where k<N and k=2, 3, . . . , can be used for fiber management at service providers' offices. An example of usage is Passive Optical Networks (PON) for automated management of fibers of Fiber To The Home (FTTH) customers. Embodiments may be implemented in a wide variety of devices. Such devices include Optical cross connects (OXC) for carriers and data centers; Multi-granularity optical cross-connects (fiber XC, waveband XC, Wavelength XC) for flexible resource allocation for carriers and cloud computing data centers based on demand changes; Optical packet switch; Transceiver components; Passive optical networks; Reconfigurable optical add-drop multiplexer (ROADM);

Automated fiber management for data center, service providers, enterprises and government applications; Service restoration from multiple optical network failures (line protection using 1+1 or 1:N switches and protection switching for 1+1 lines, mesh or ring configurations); Fiber to the home (FTTH) network automation and test; network monitoring; performance monitoring, e.g., wavelength error, bit error rate (BER), optical signal-to-noise ratio, OSNR, etc.

Figure 12:
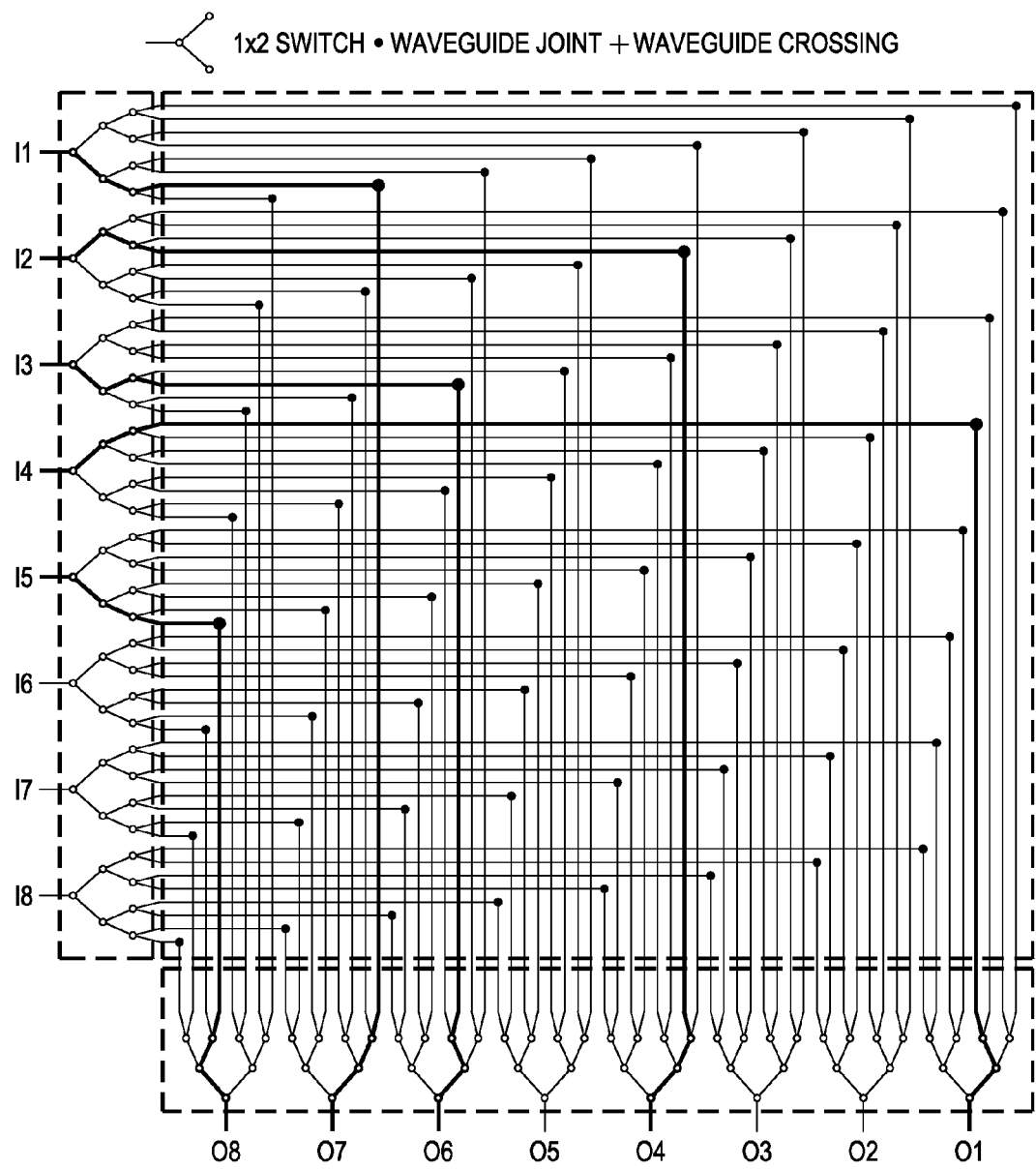
FIG. 12 illustrates a diagram of an 8×8 route-and-select switch for a silicon photonic circuit.

Embodiments can also be used in computing platforms for both optically switching and optically interconnecting the computing components such as CPU, accelerated processing unit (APU), memory, co-processors and other peripherals for high speed, high throughput, low latency, high performance connections. FIG. 12 illustrates an 8×8 route-and-select switch in a silicon photonic circuit. All the aspects of various embodiments disclosed herein also apply to a route-and-select switch fabric.

Aspects of this disclosure provide a recursive algorithm for determining cross-talk suppression maps in N×N photonic switching networks. The N×N photonic switching networks can be broken down into a first column of Photonic Elements (PEs) coupled to input ports of the N×N switching network, a last column of PEs coupled to output ports of the N×N switching network, and multiple N/2×N/2 sub-networks (referred to herein as modules) positioned in-between the first and last column. The inputs/outputs of the N×N photonic switching network are used to determine the switching configurations of the first and last columns of the N×N photonic switching network. Thereafter, individual switching configurations for each of the multiple N/2×N/2 modules are determined independently. More specifically, the N/2×N/2 modules can be broken down into a first column of PEs coupled to inputs of the N/2×N/2 module, a last column of PEs coupled to output ports of the N/2×N/2 module, and multiple N/4×N/4 sub-networks. The inputs of each N/2×N/2 module are used to determine the switching configurations of the first and last columns of that N/2×N/2 module. This process is repeated until the switching configuration for 2×2 modules (located in the center of the N×N photonic switching network) are obtained. These concepts are explained in greater detail below, where the recursive algorithm is explained in the context of an 8×8 photonic switching network. However, those of ordinary skill in the art will recognize, upon reviewing this disclosure, that these concepts are applicable to any N×N photonic switching network, e.g., 16×16, 32×32, etc.

Figure 13A:
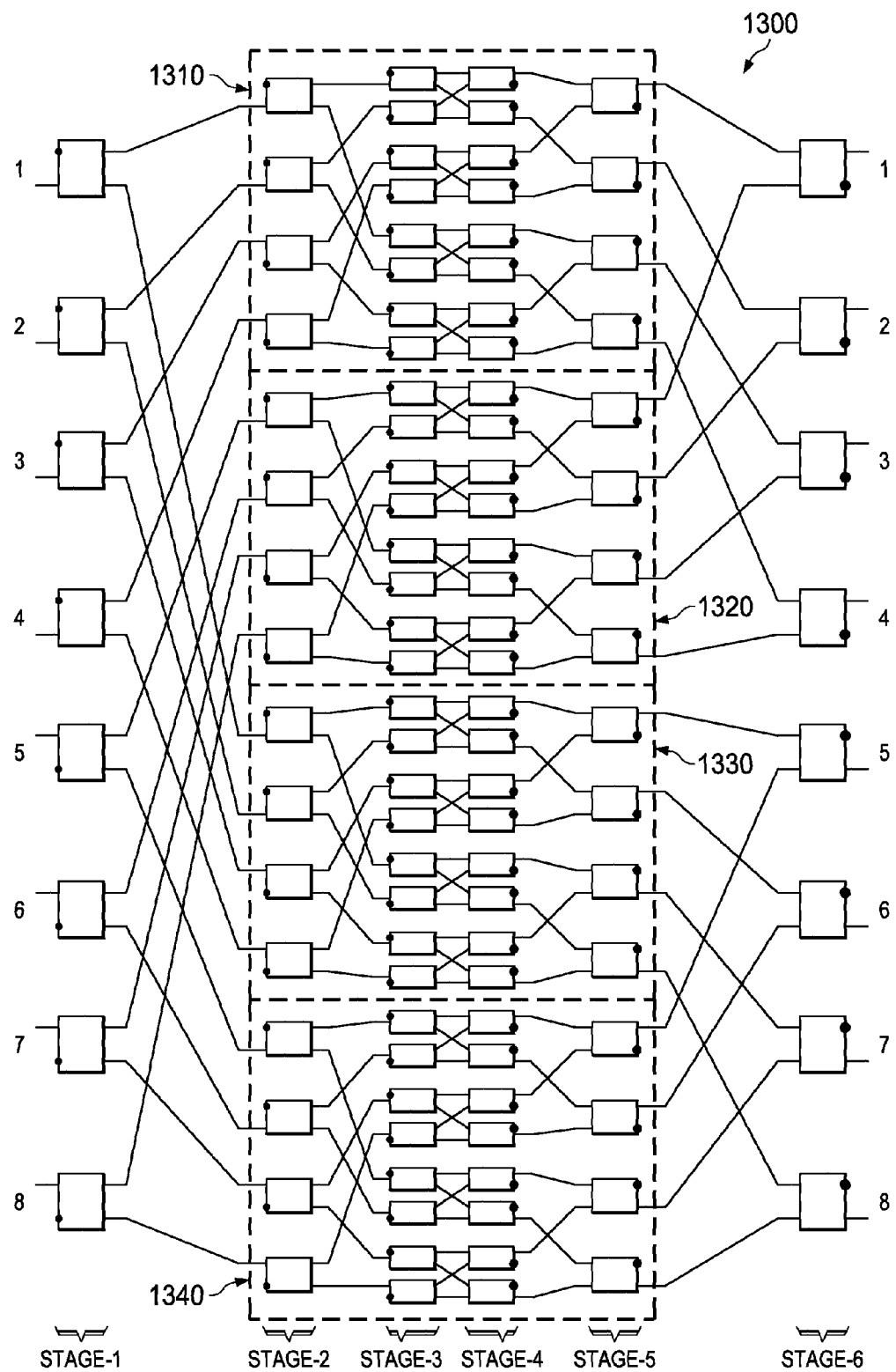
FIGS. 13A-13B illustrate diagrams of an embodiment 8×8 photonic switching network.
Figure 13B:
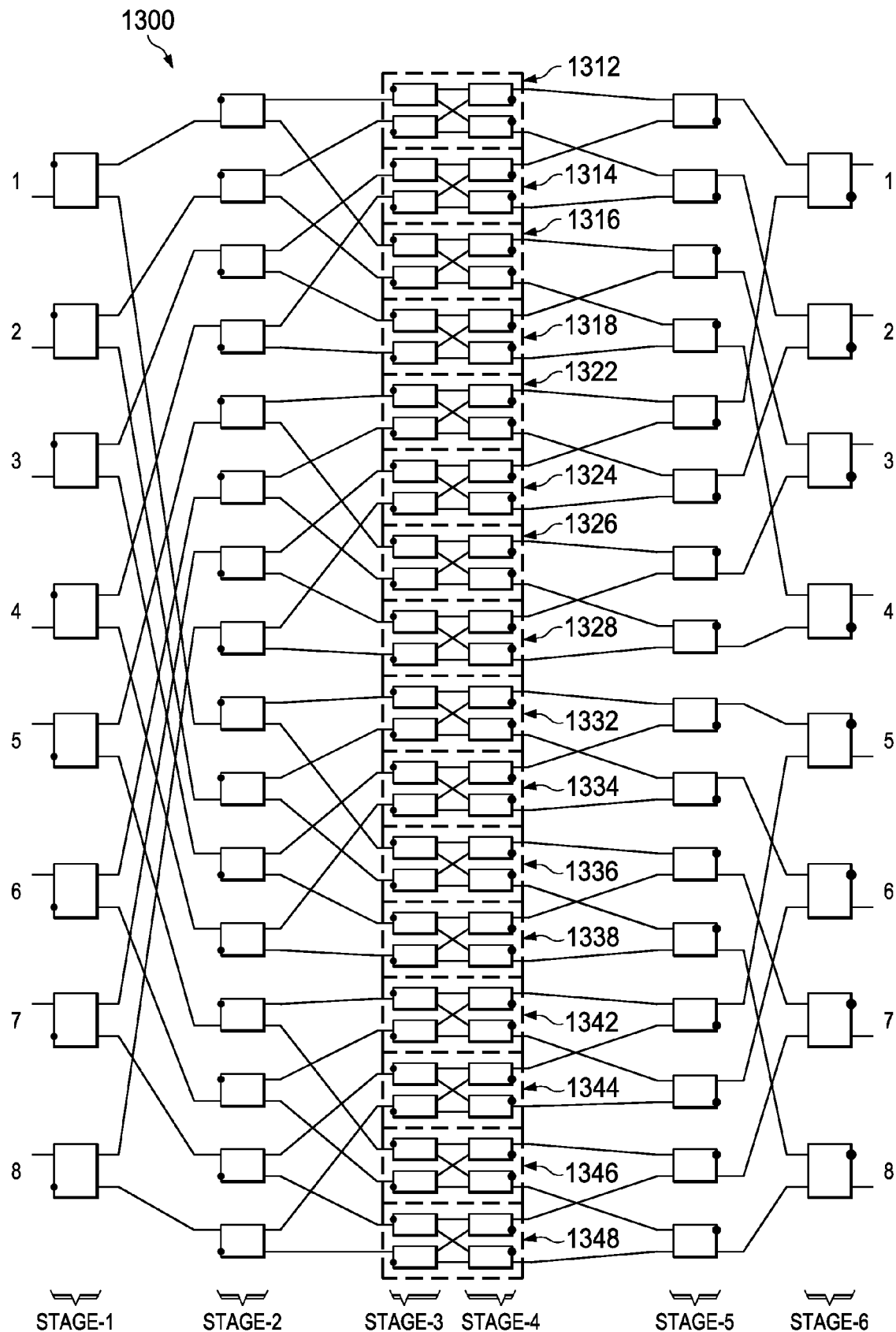
Figure 14:
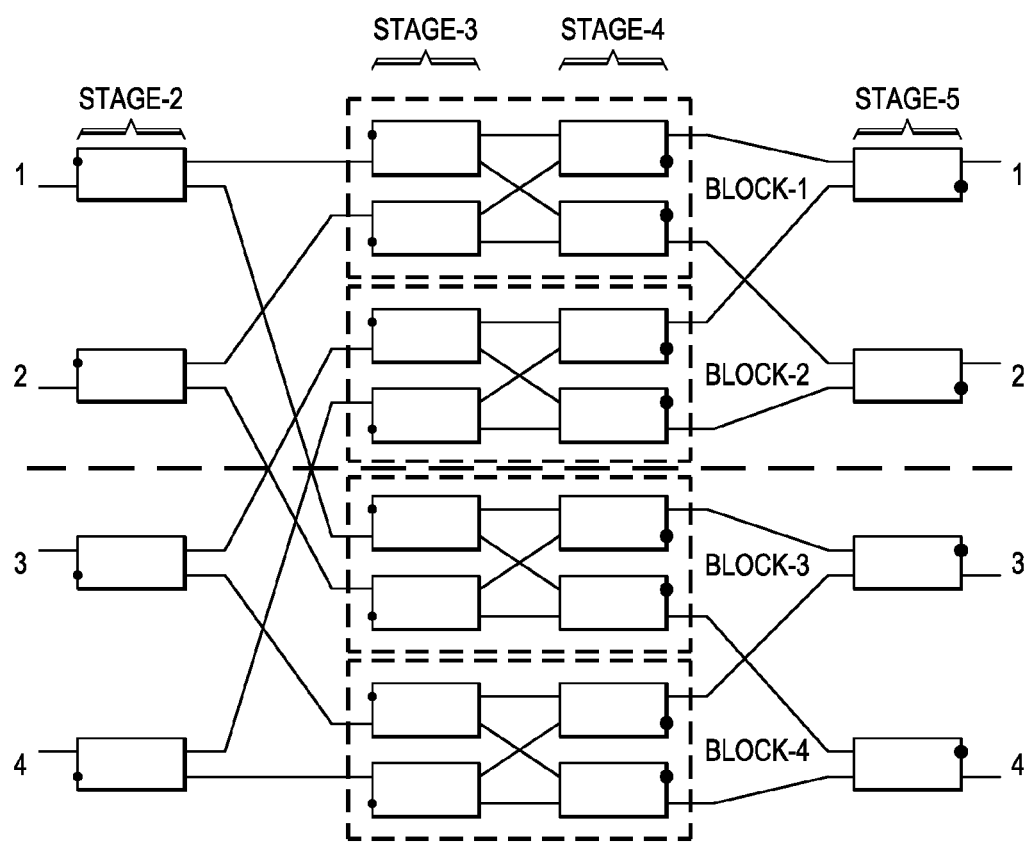
FIG. 14 illustrates a diagram of the symmetric prosperities of a 4×4 photonic switching sub-network.

FIGS. 13A-13B illustrate an 8×8 photonic switching network 1300 comprising a plurality of 4×4 switching sub-networks 1310, 1320, 1330, 1340. The 4×4 switching sub-network 1310 includes 2×2 switching modules 1312, 1314, 1316, and 1318, the 4×4 switching sub-network 1320 includes 2×2 switching modules 1322, 1324, 1326, and 1328, the 4×4 switching sub-network 1330 includes 2×2 switching modules 1332, 1334, 1336, and 1338, and the 4×4 switching sub-network 1340 includes 2×2 switching modules 1342, 1344, 1346, and 1348. Switching configurations for photonic elements in stage-1 and stage-6 are defined by the connection map. Switching configurations for each of the intermediate 4×4 sub-networks 1310, 1320, 1330, 1340 are determined on an individual basis. More specifically, switching configurations for photonic elements in stage-2 and stage-5 are determined by applying a first set of rules (described below) to the input signals entering the respective 4×4 sub-networks 1310, 1310, 1320, 1330, 1340. Thereafter, switching configurations for photonic elements in stage-3 and stage-4 are determined by applying a second set of rules (described below) to the input signals entering the respective 2×2 sub-networks 1312, 1314, 1316, 1318, 1322, 1324, 1326, 1328, 1332, 1334, 1336, 1338, 1342, 1344, 1346, 1348. The rules for determining the switching configurations are demonstrated in FIGS. 15-19H, with the 4×4 module being symmetric about the dashed line shown in FIG. 14.

Figure 15:
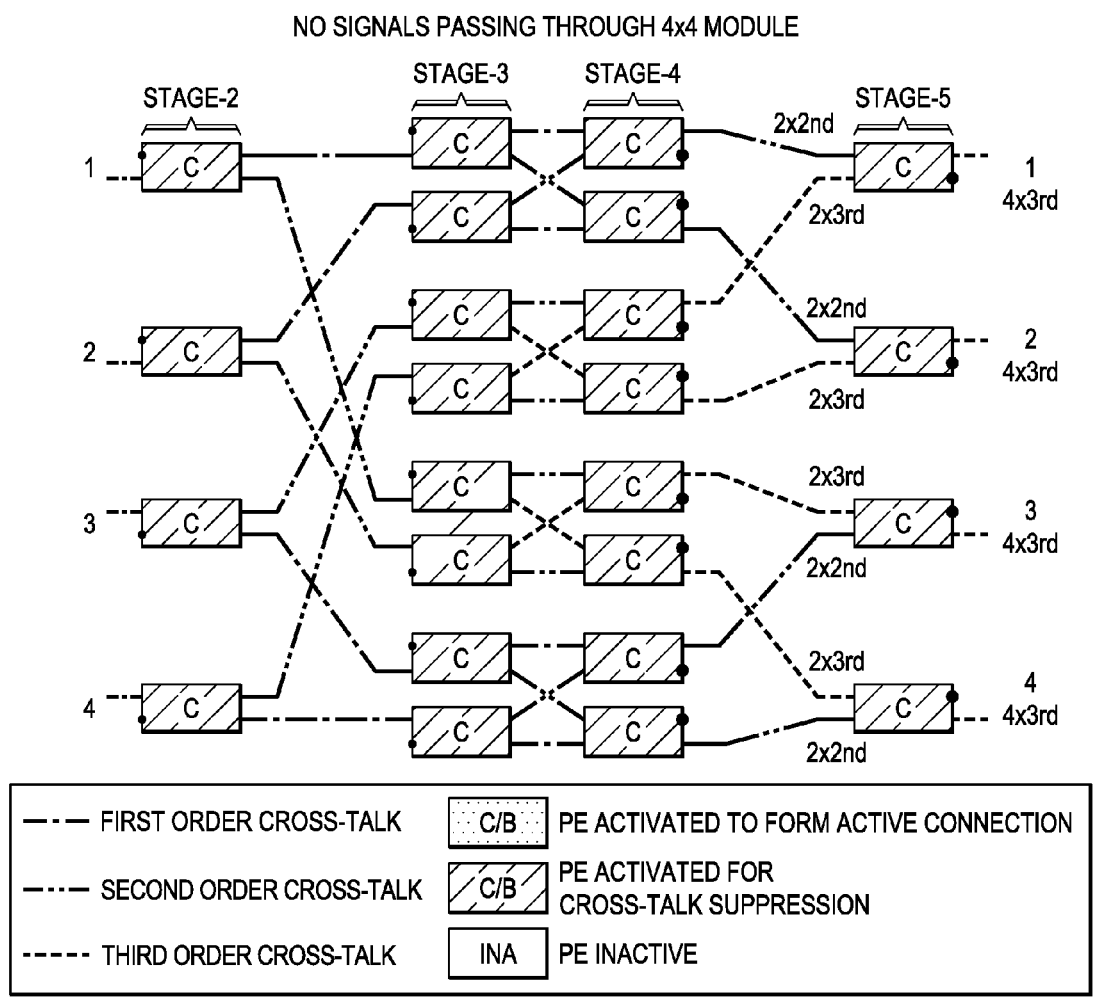
FIG. 15 illustrates a diagram of embodiment switching configuration for a 4×4 photonic switching sub-network.
Figure 16A:
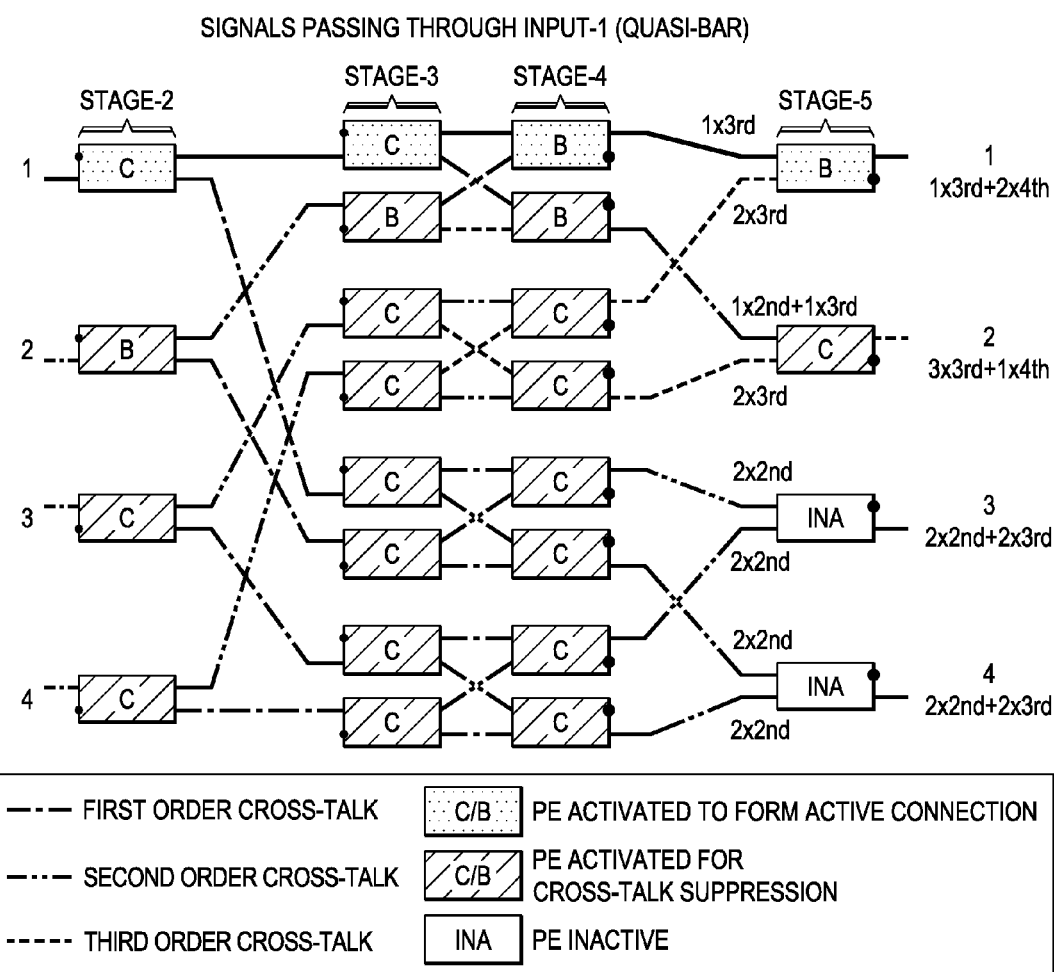
FIGS. 16A-16D illustrate diagrams of additional embodiment switching configurations for 4×4 photonic switching sub-networks.
Figure 16B:
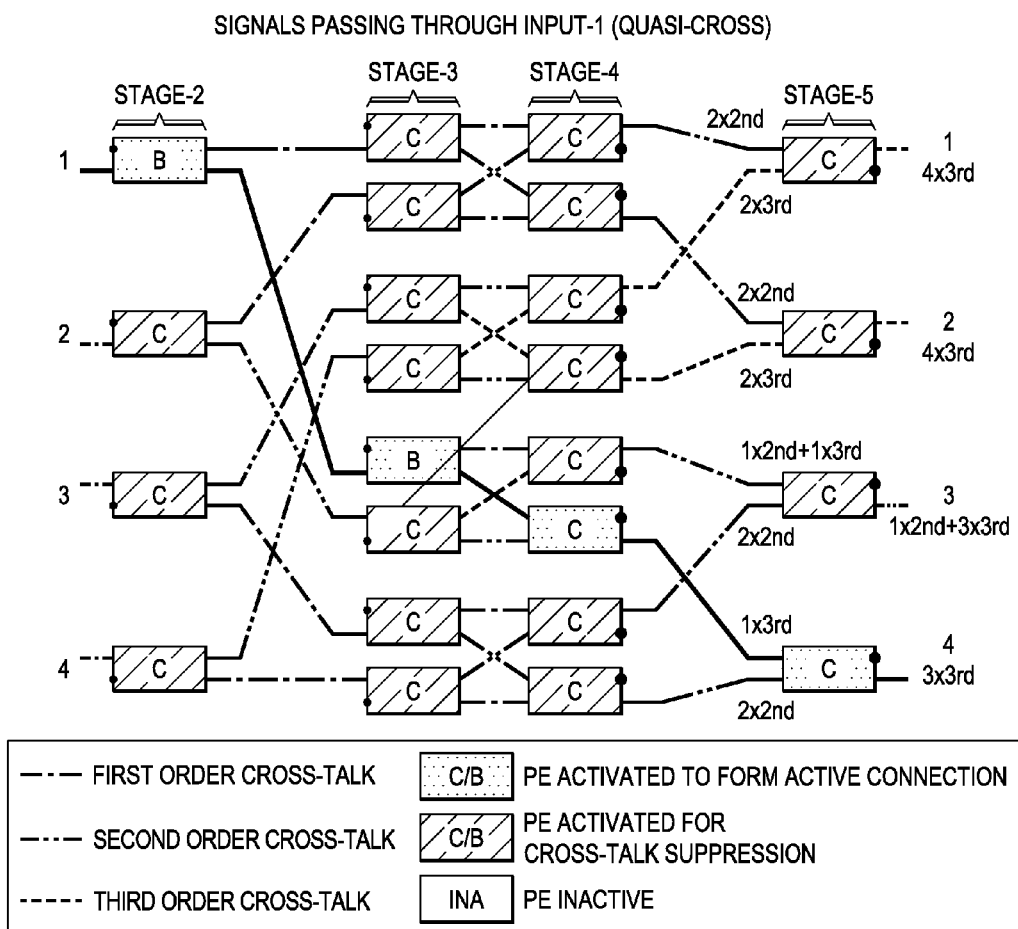
Figure 16C:
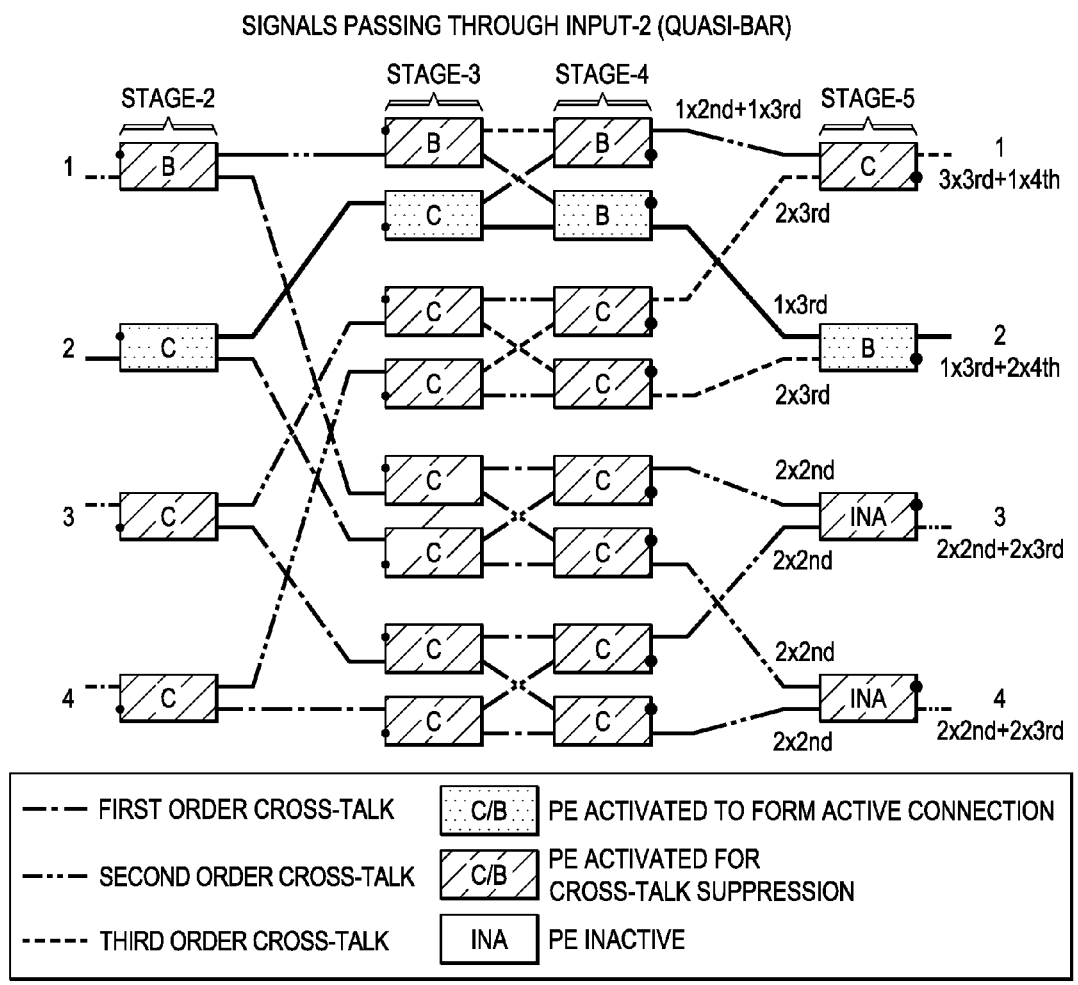
Figure 16D:
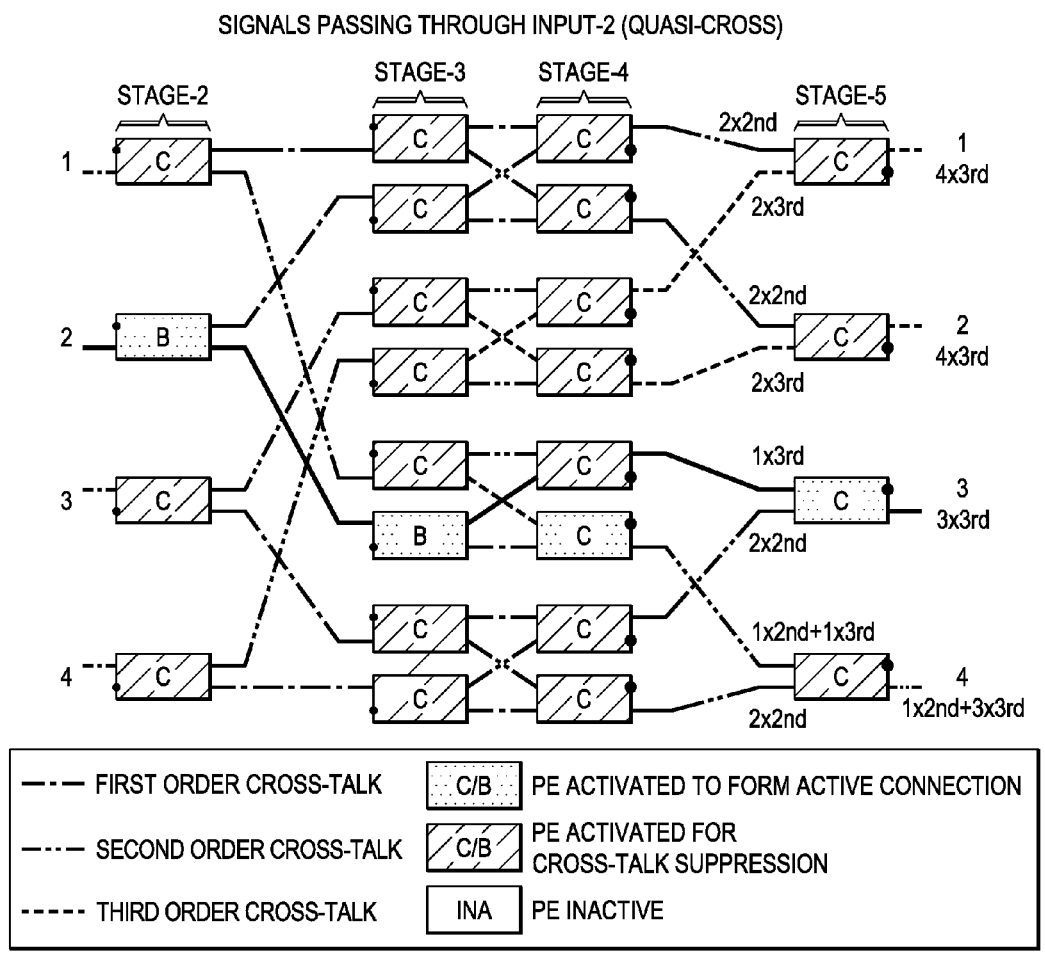
Figure 17A:
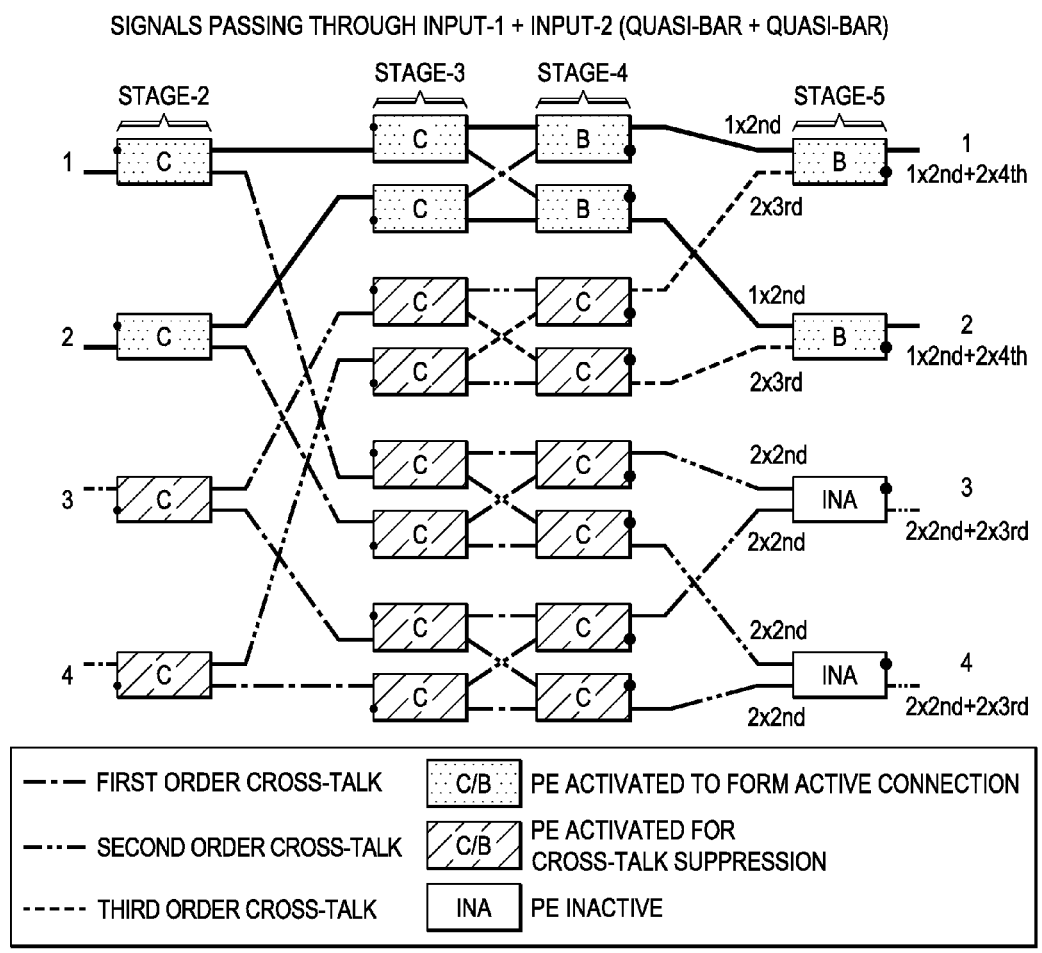
FIGS. 17A-17P illustrate diagrams of yet additional embodiment switching configurations for 4×4 photonic switching sub-networks.
Figure 17B:
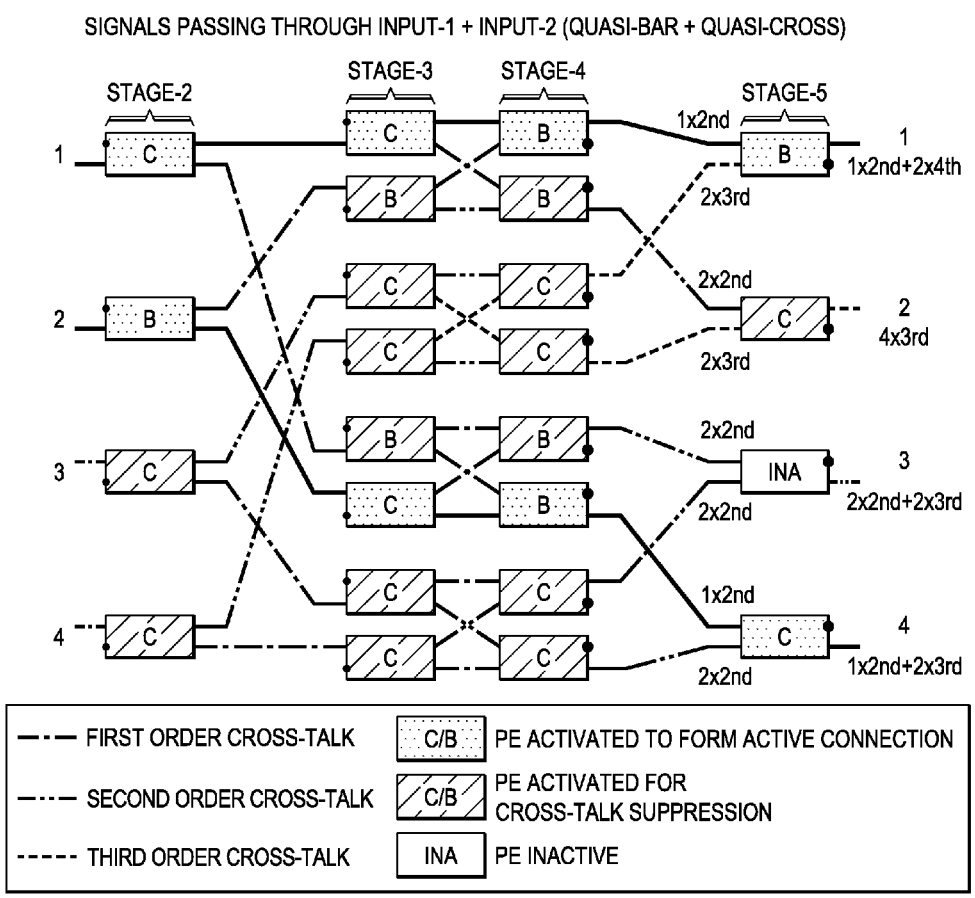
Figure 17E:
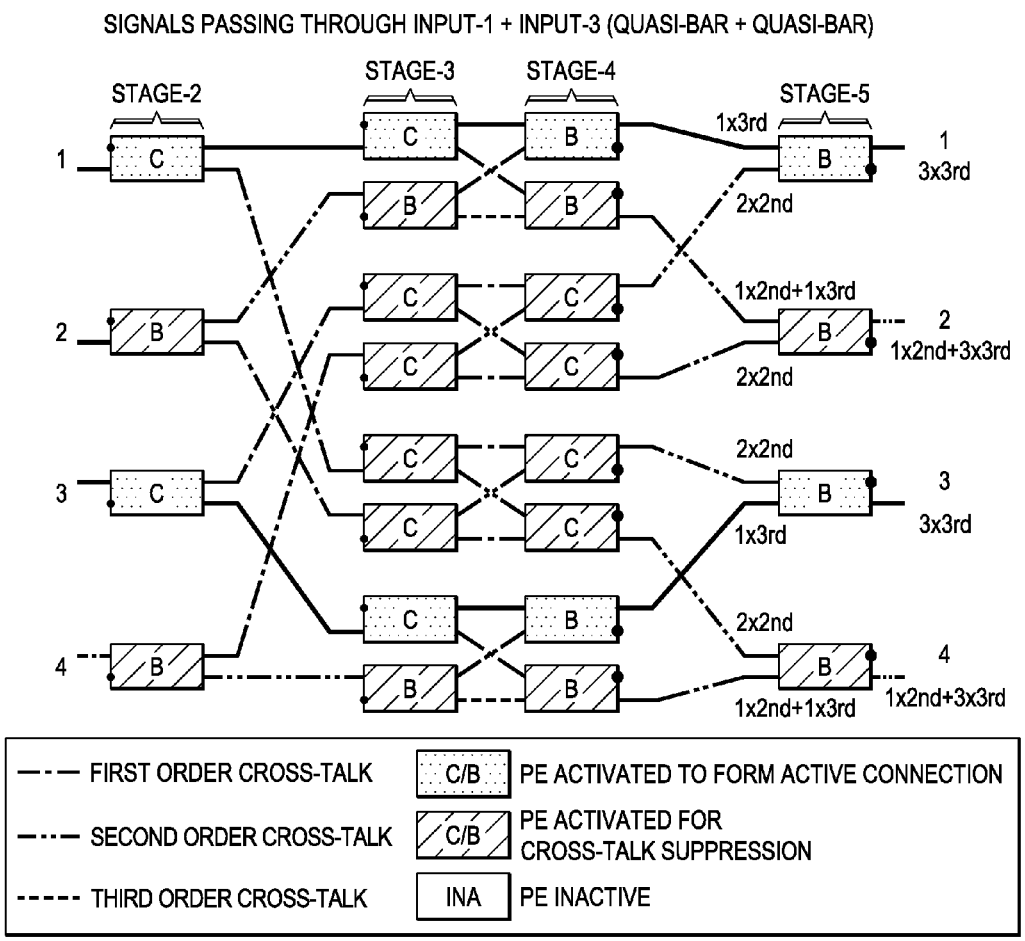
Figure 17F:
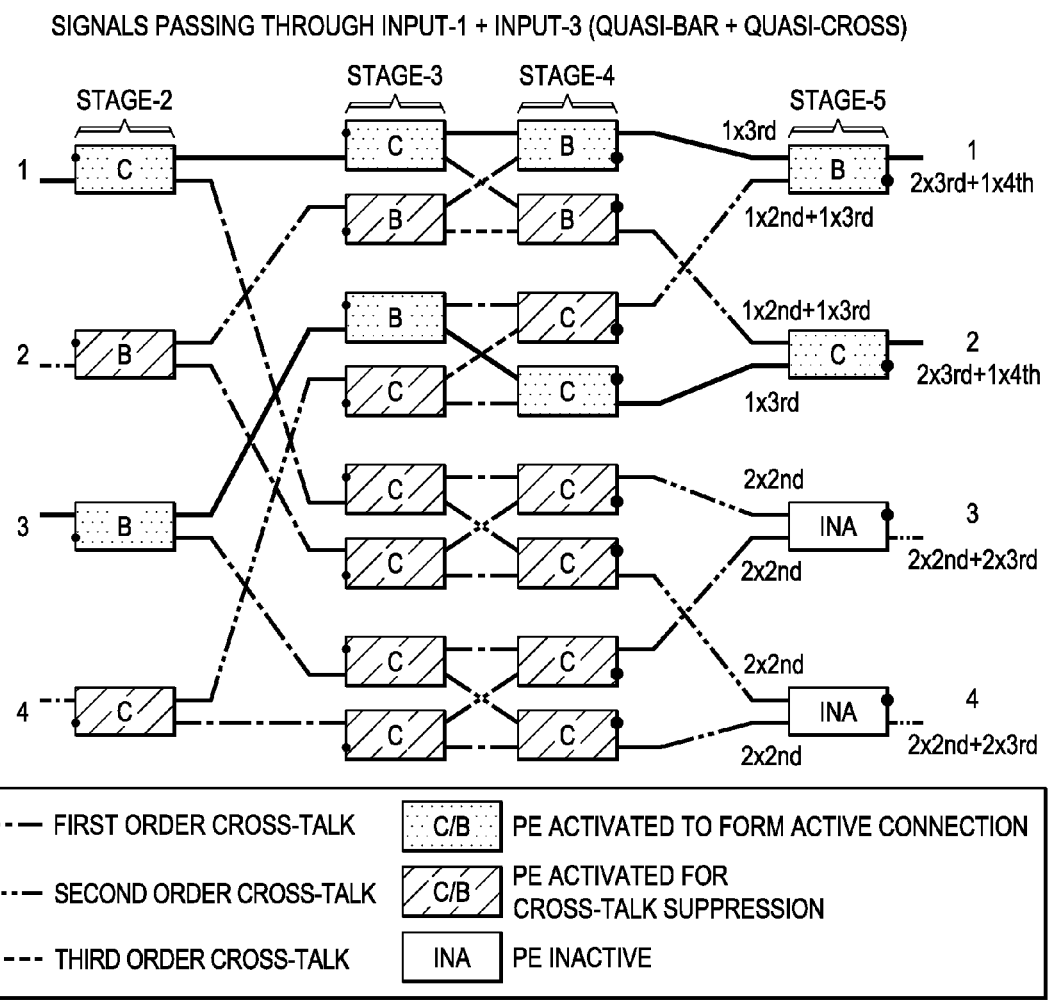
Figure 17G:
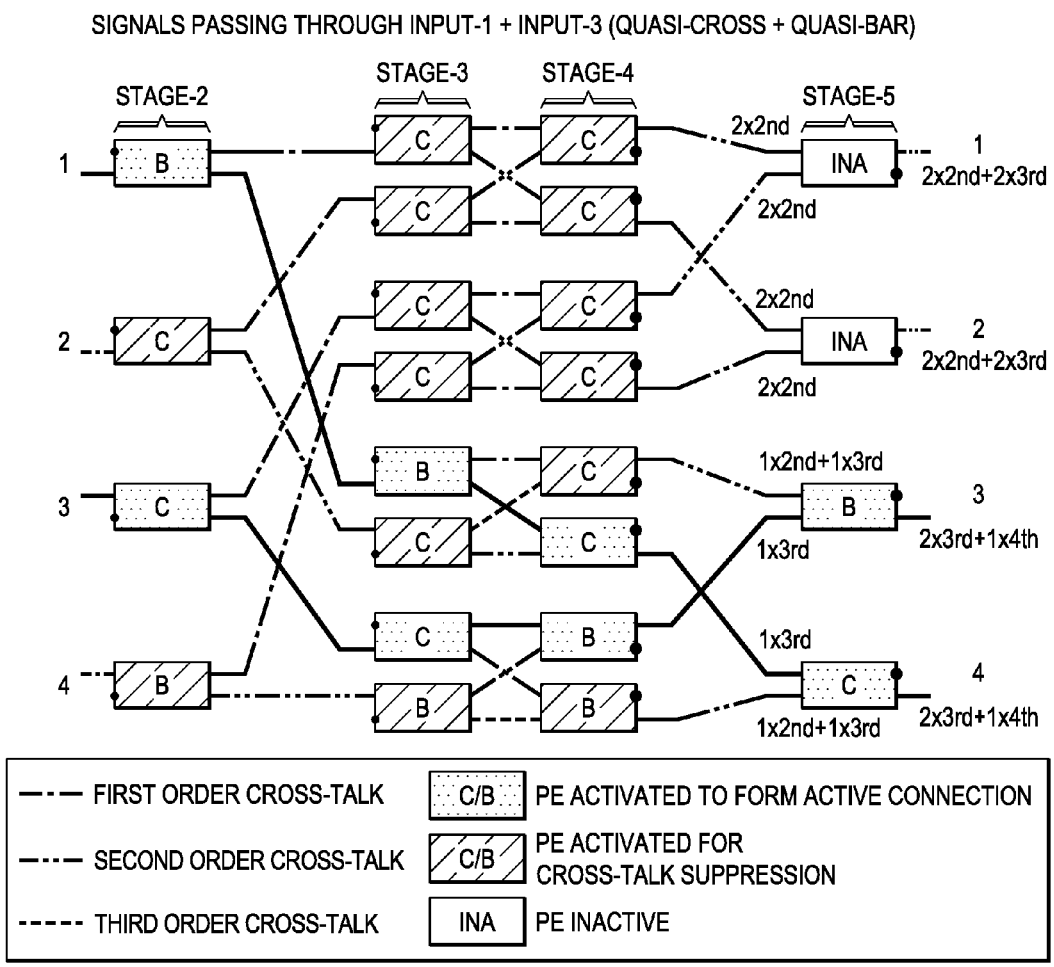
Figure 17H:
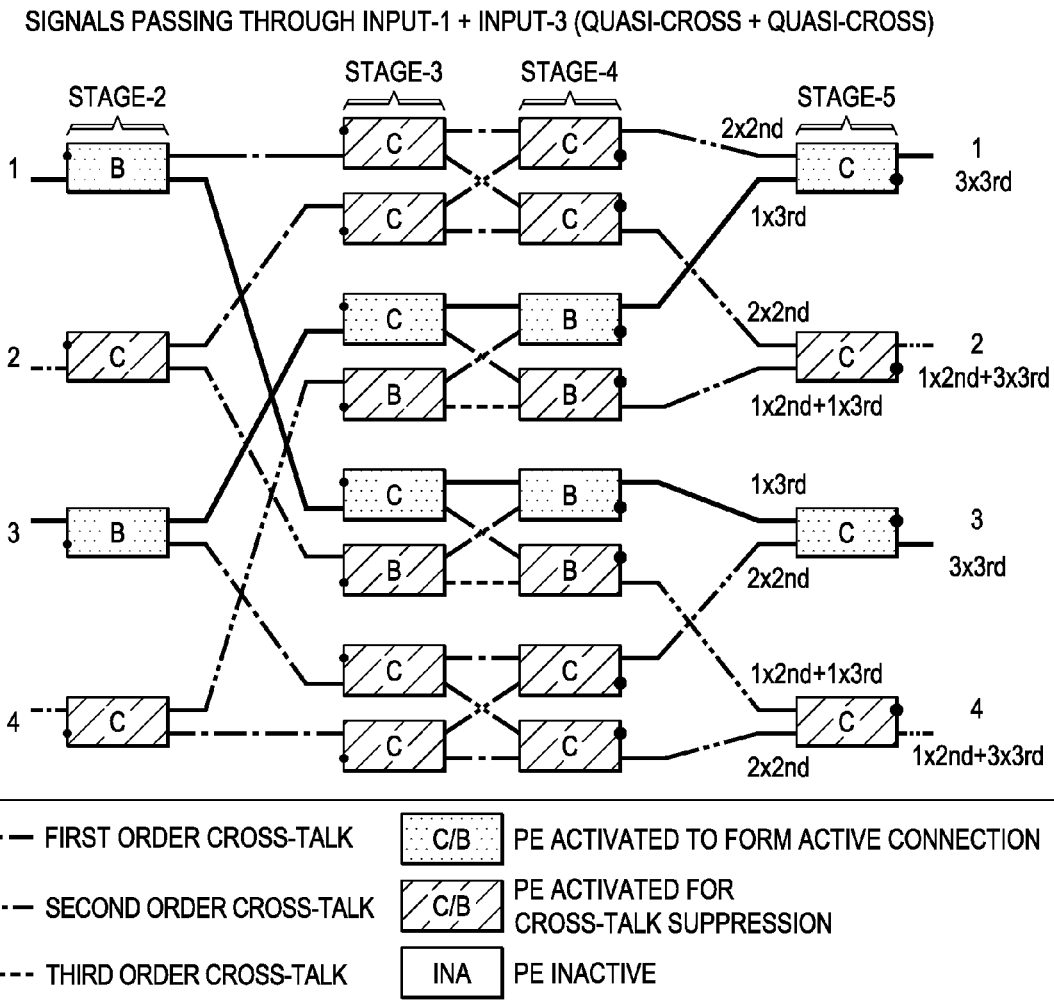
Figure 17I:
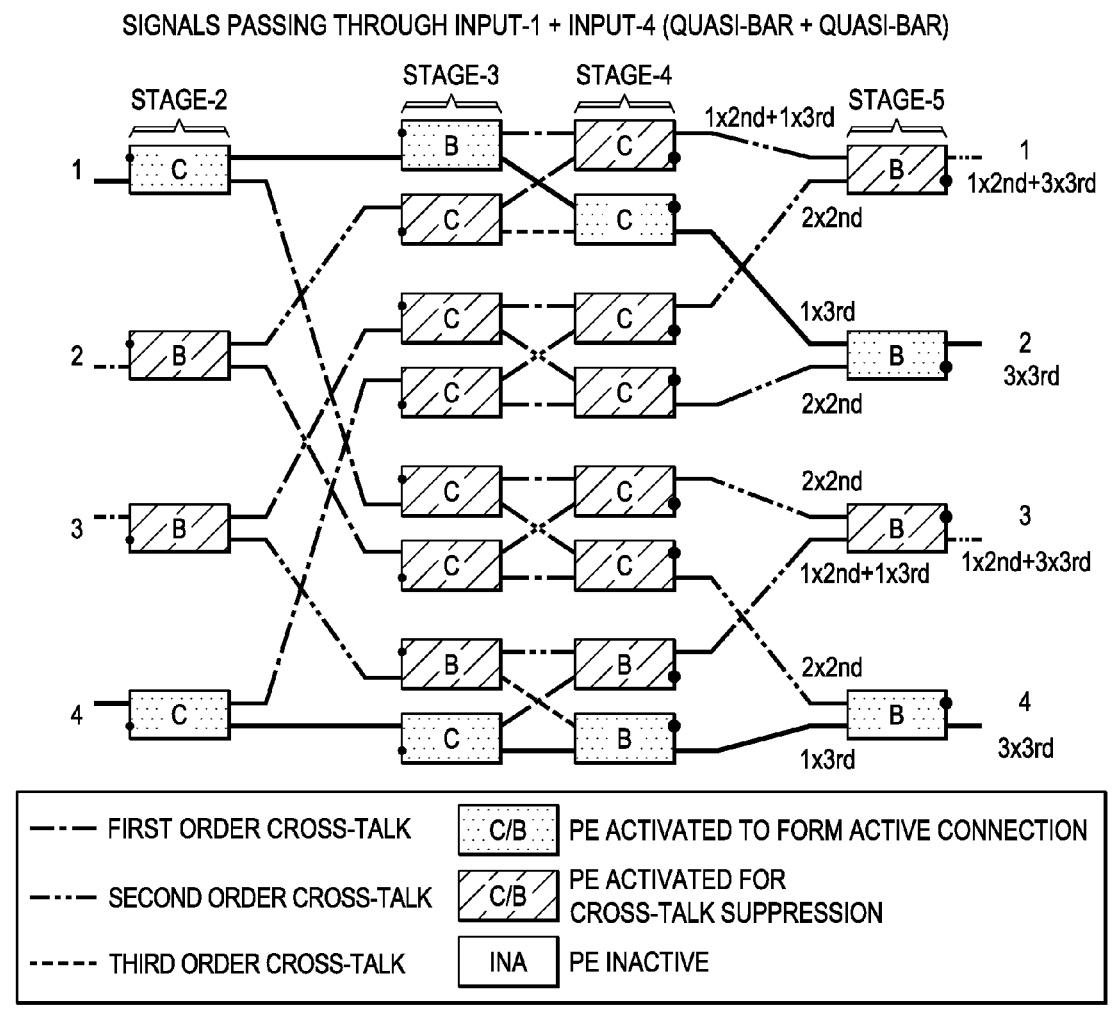
Figure 17J:
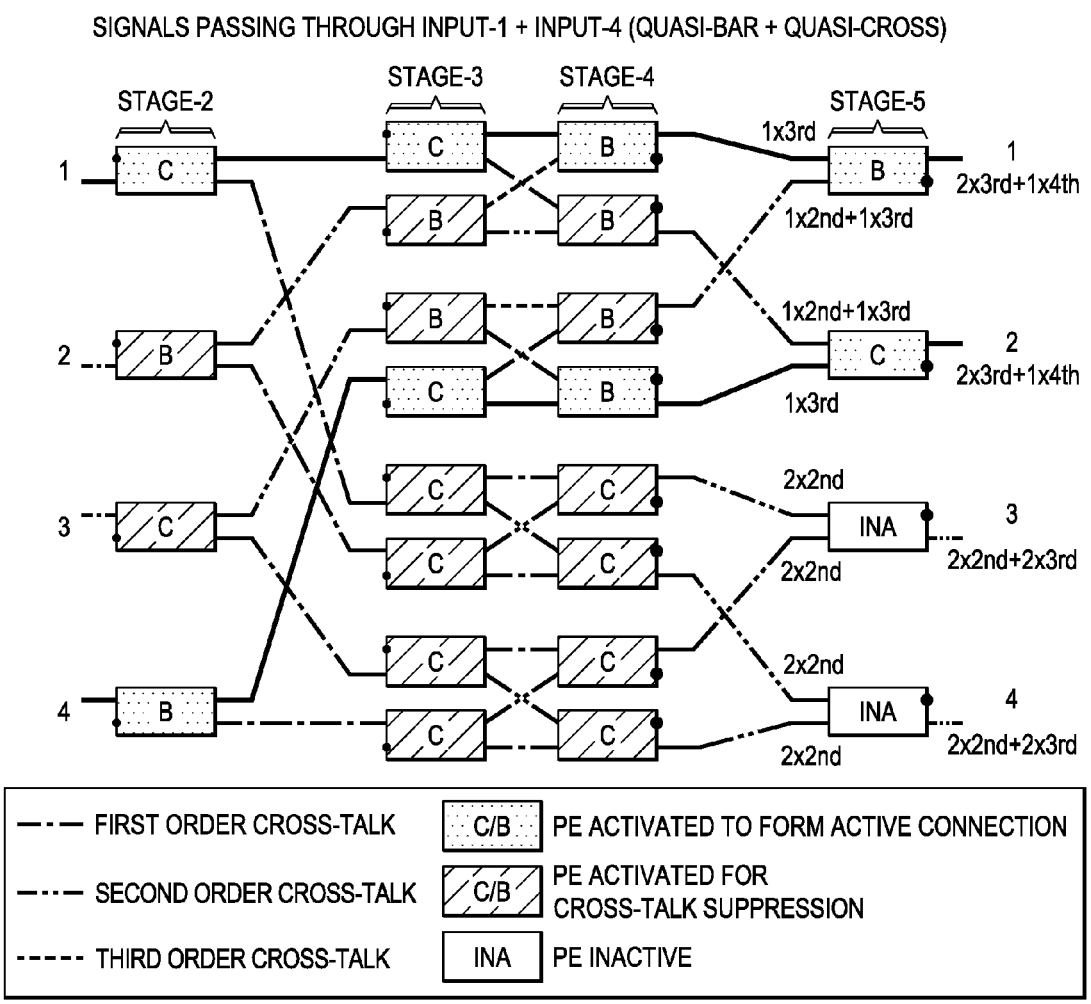
Figure 17K:
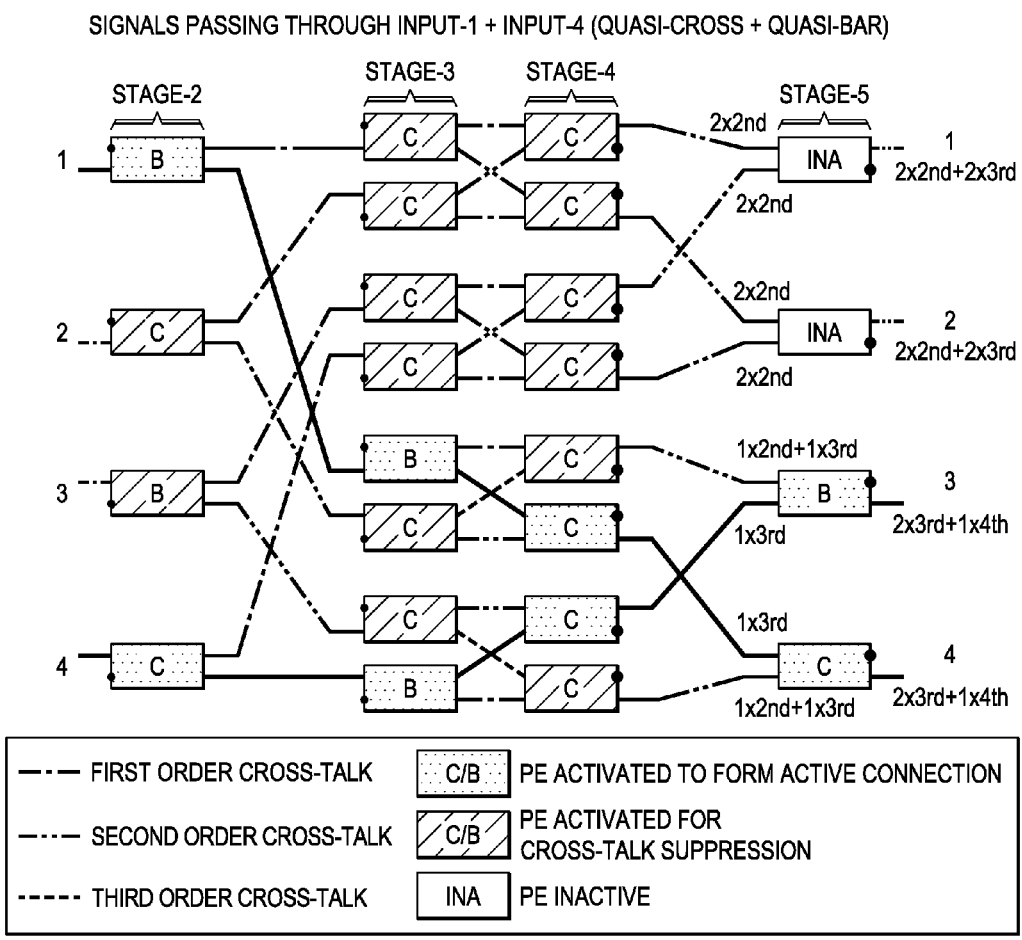
Figure 17M:
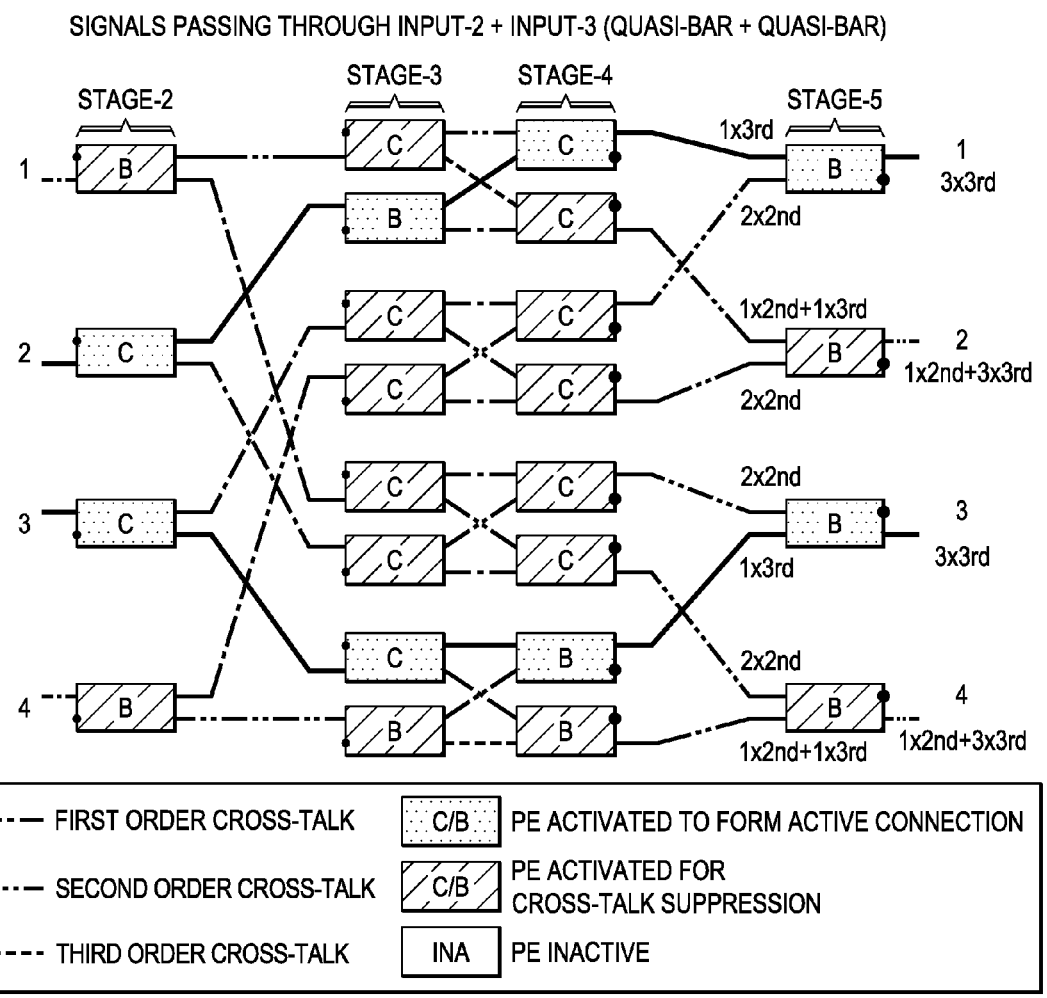
Figure 17N:
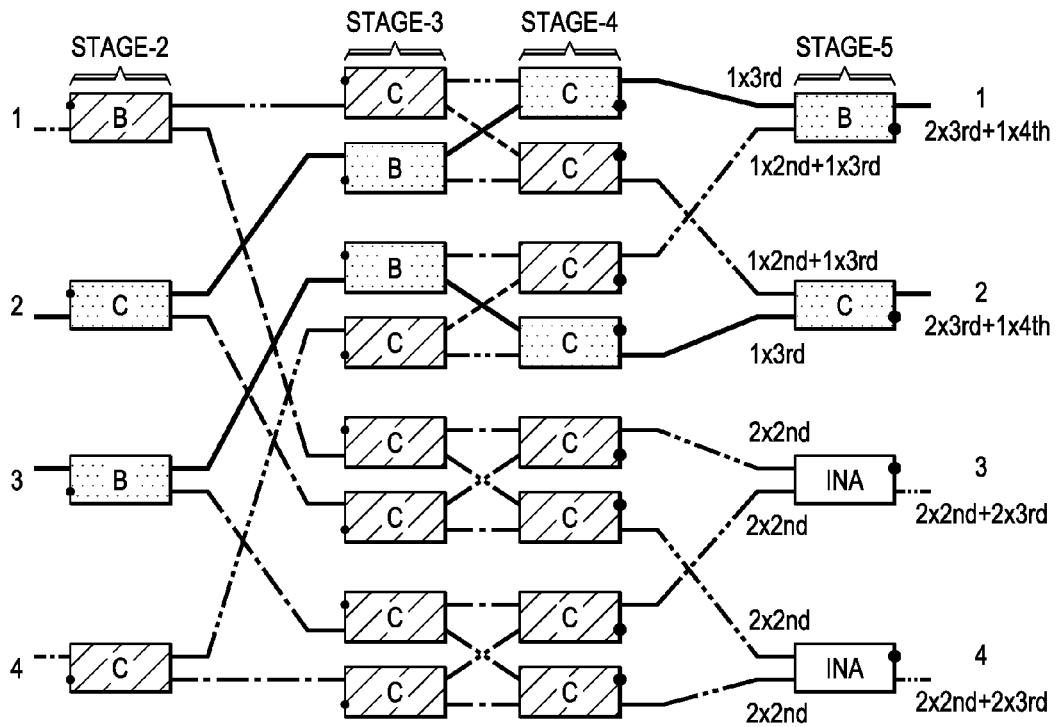
Figure 18A:
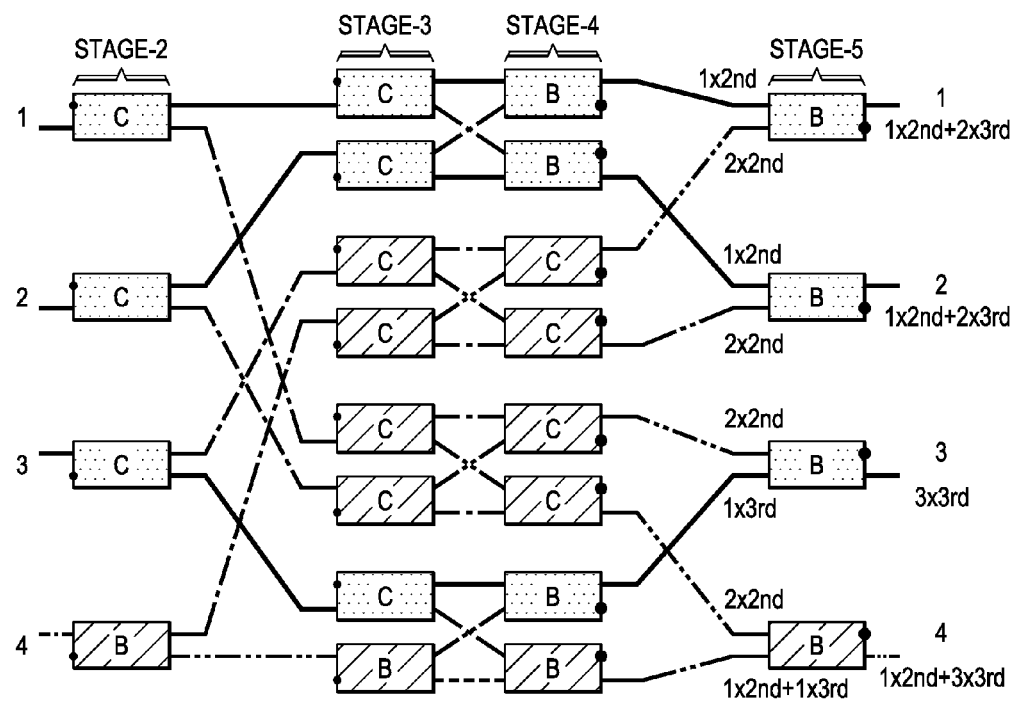
FIGS. 18A-18L illustrate diagrams of yet additional embodiment switching configurations for 4×4 photonic switching sub-networks.
Figure 18B:
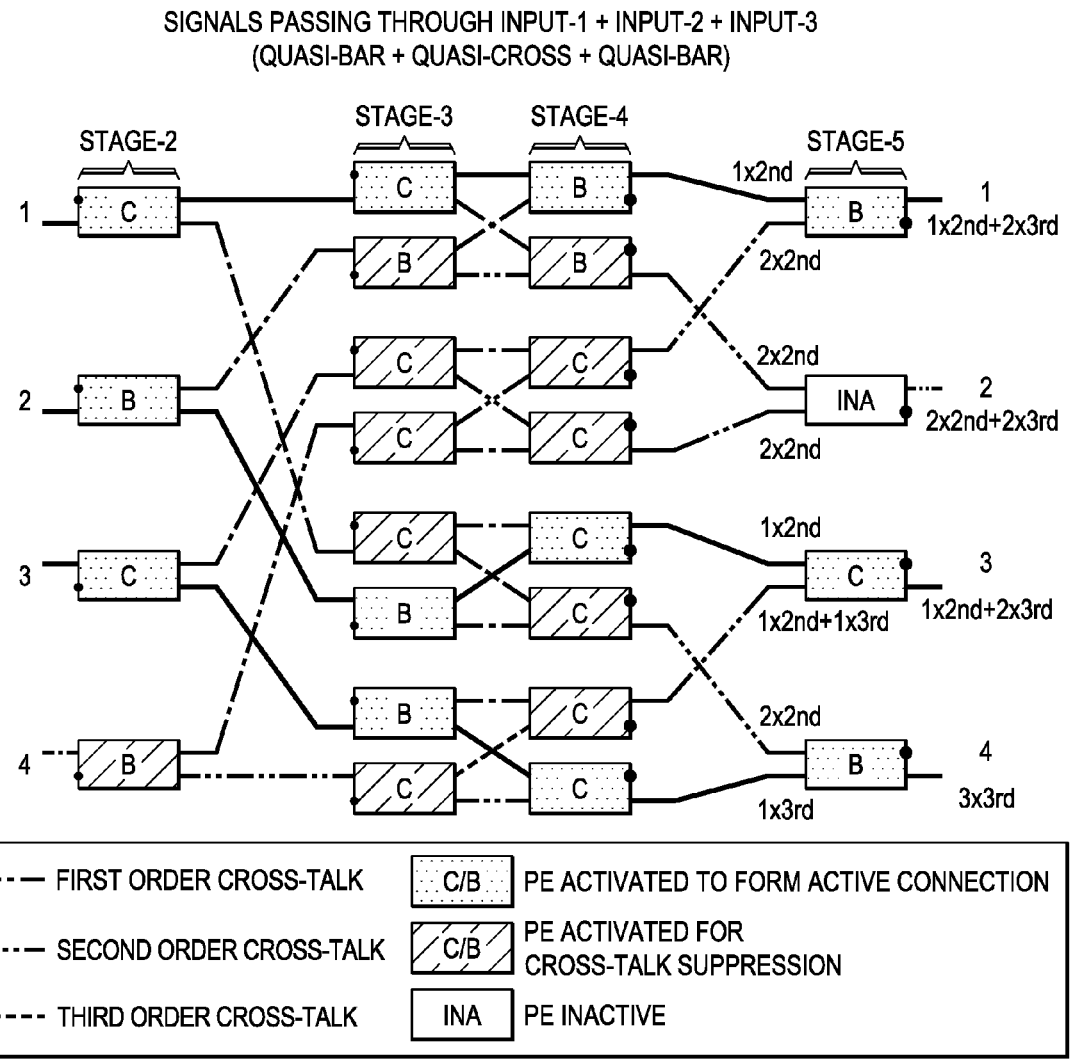
Figure 18C:
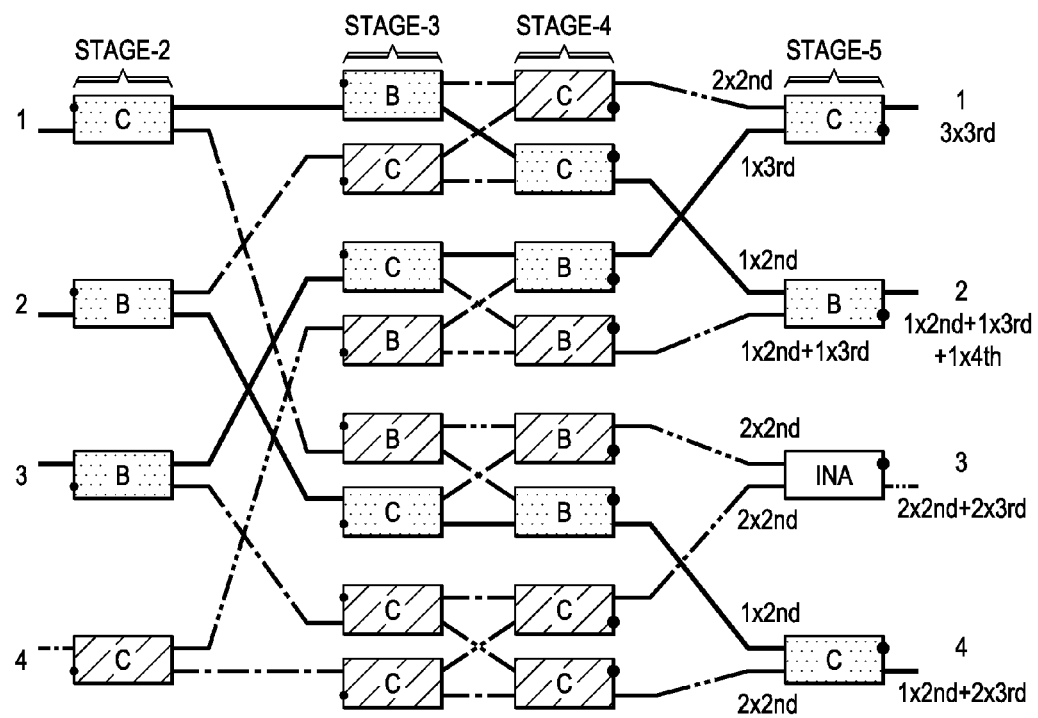
Figure 18D:
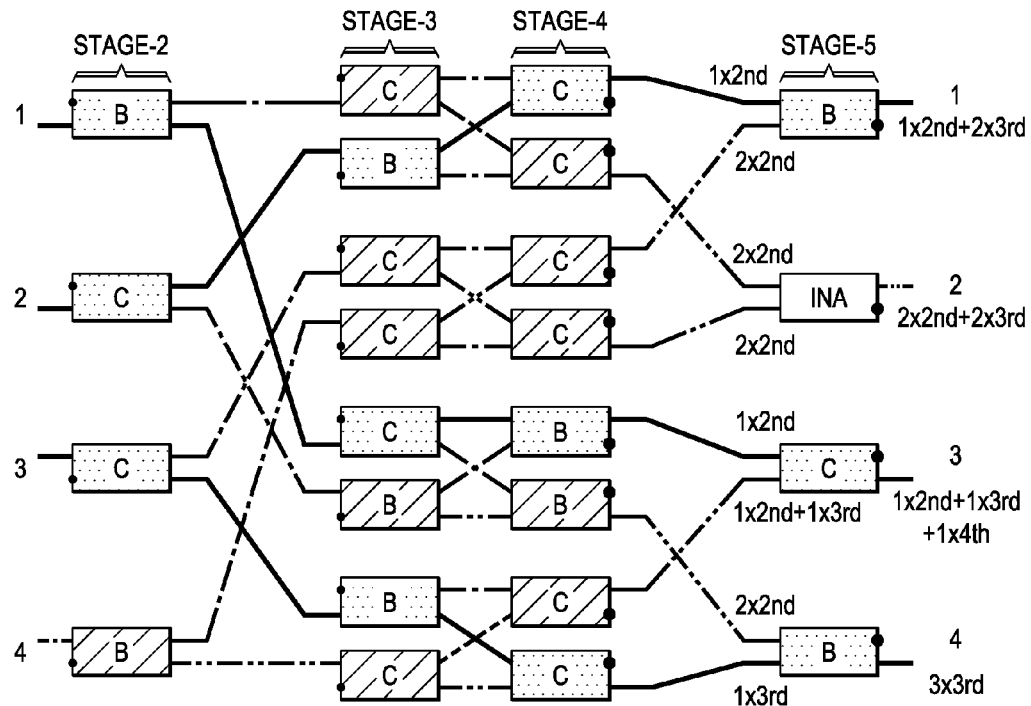
Figure 18E:
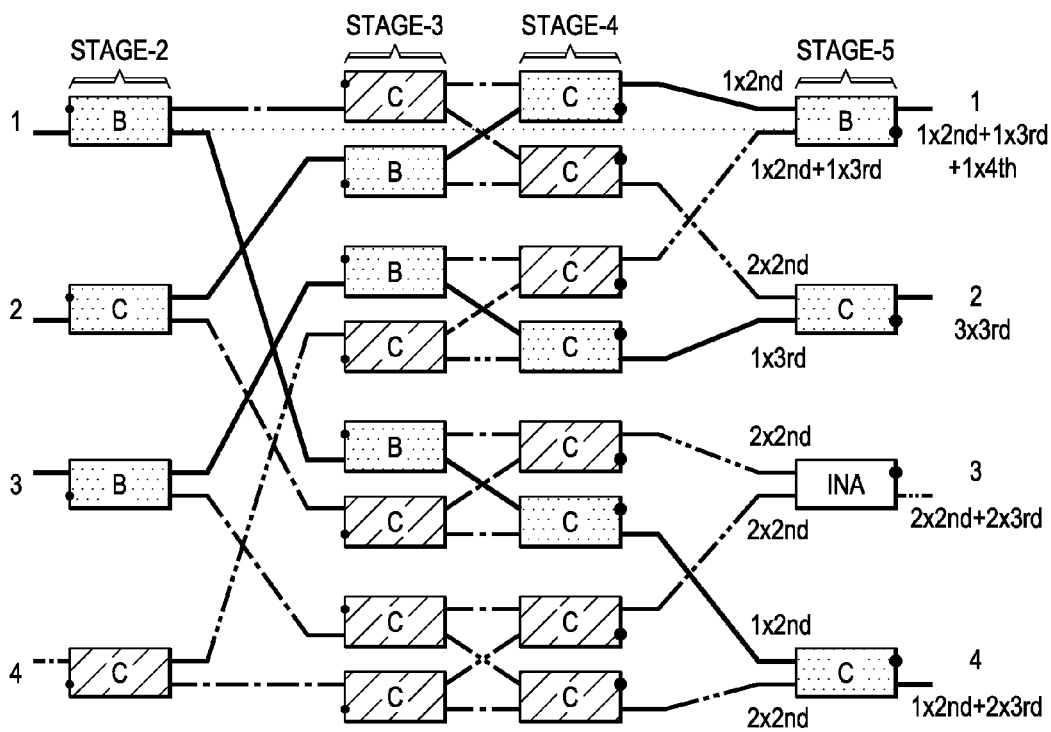
Figure 18F:
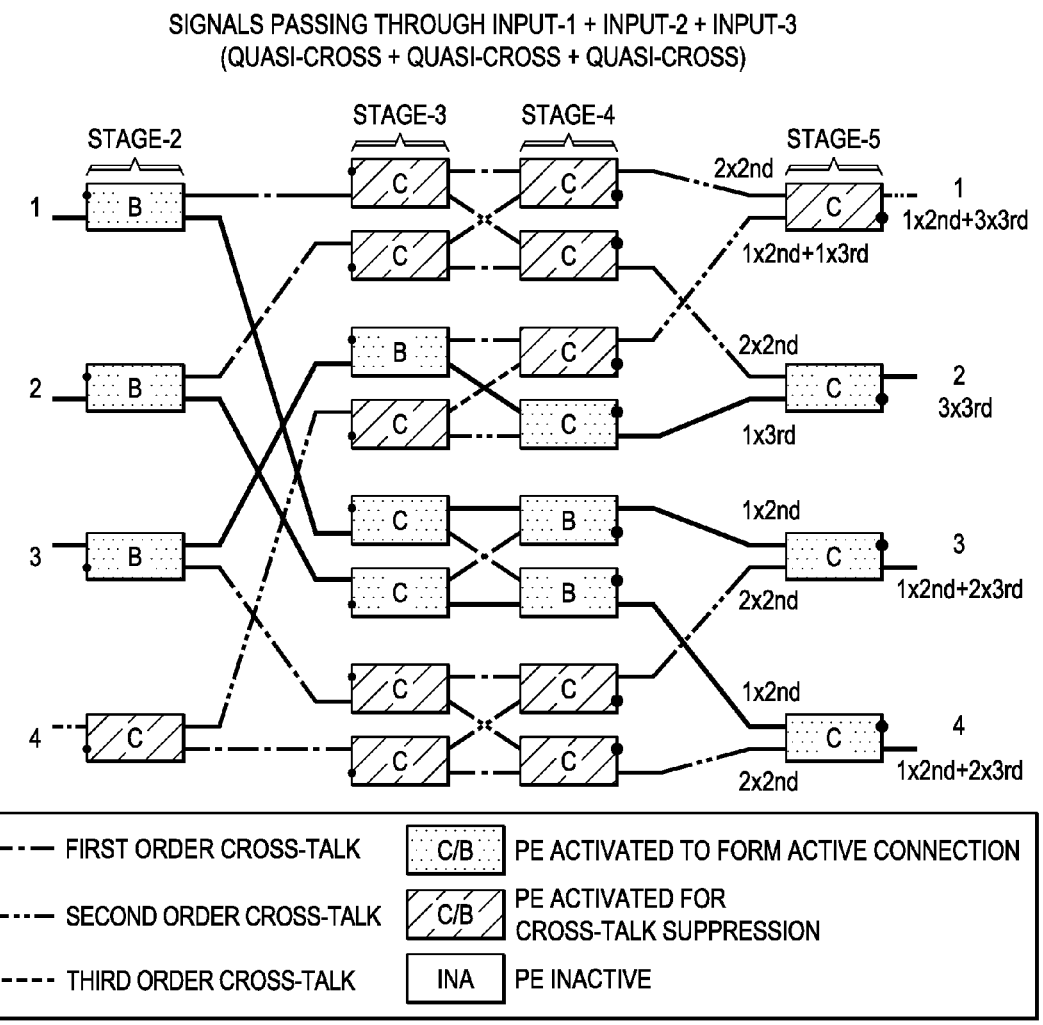
Figure 18G:
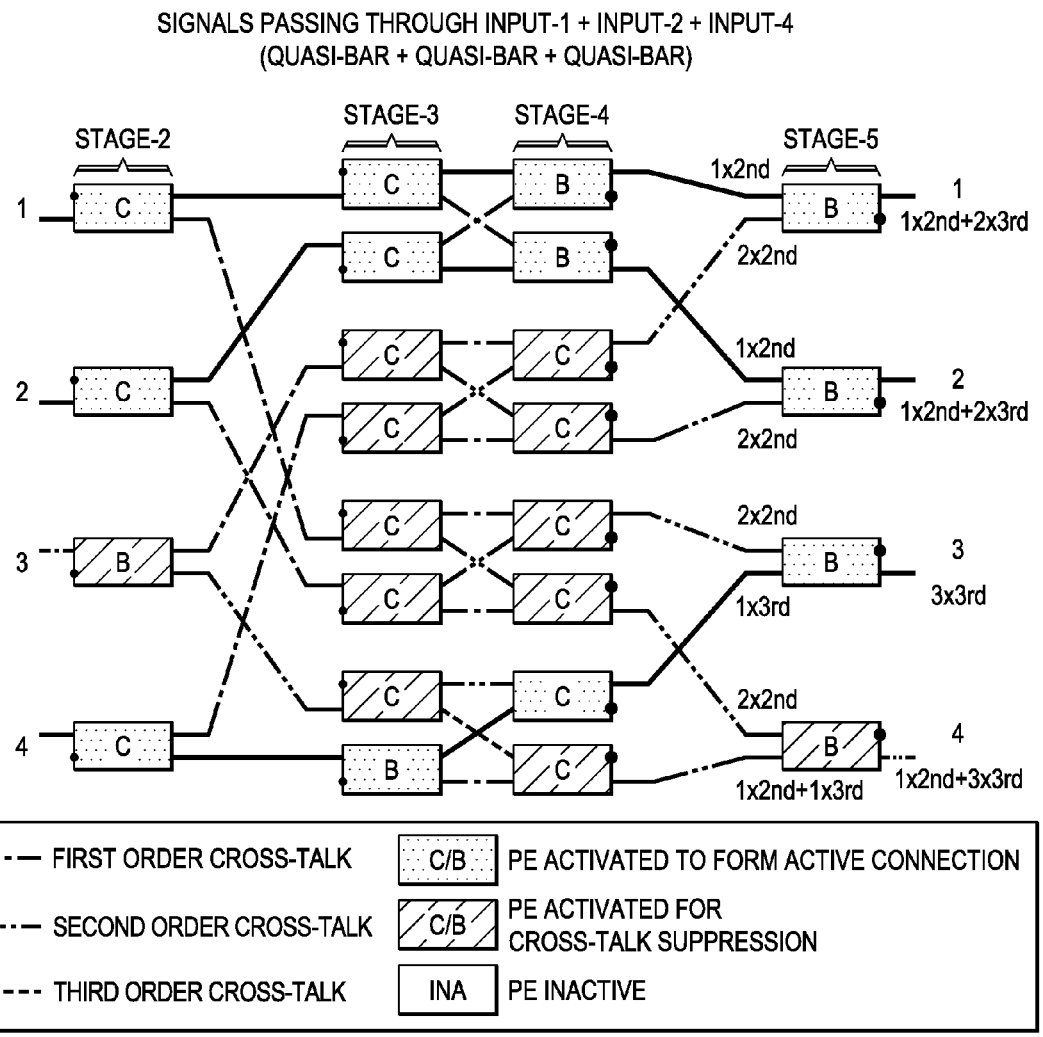
Figure 18H:
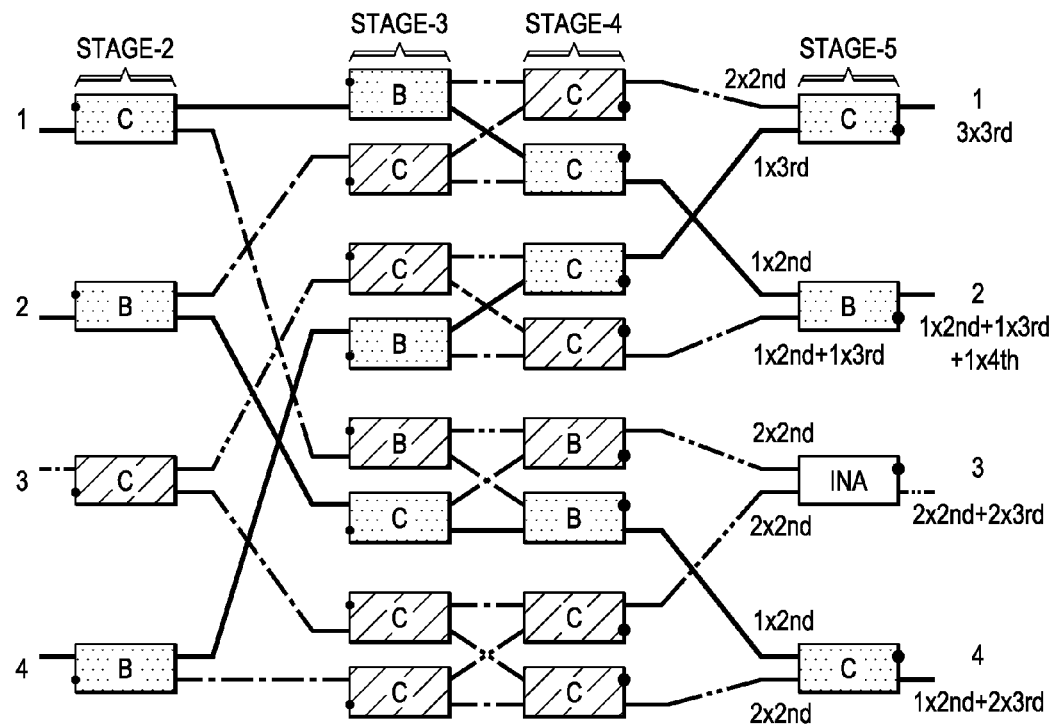
Figure 18I:
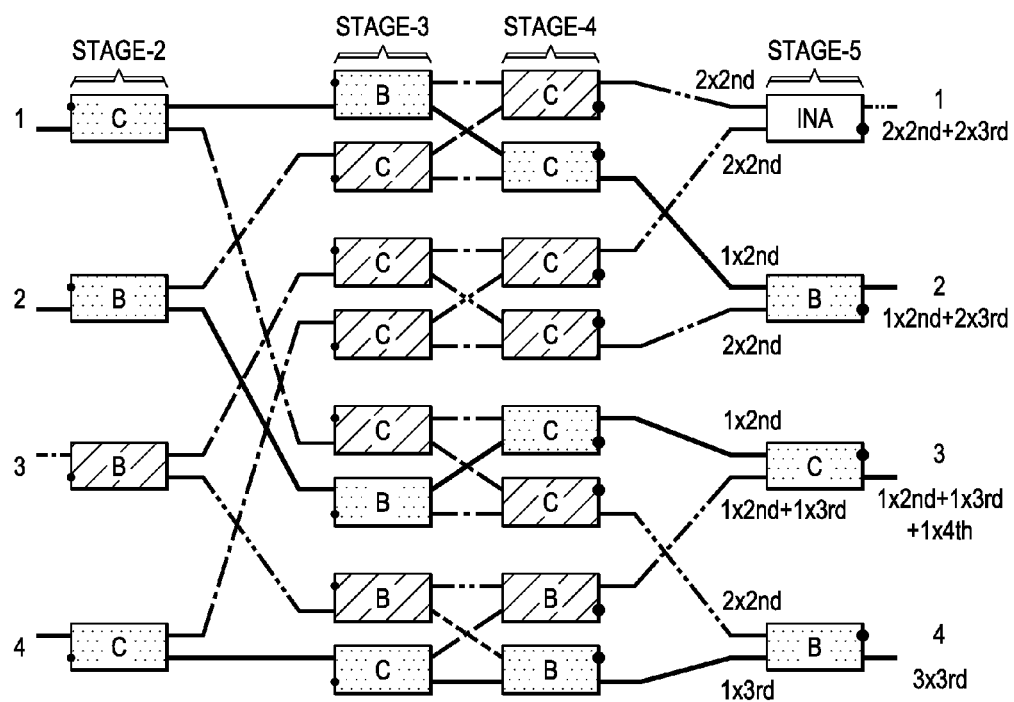
Figure 18J:
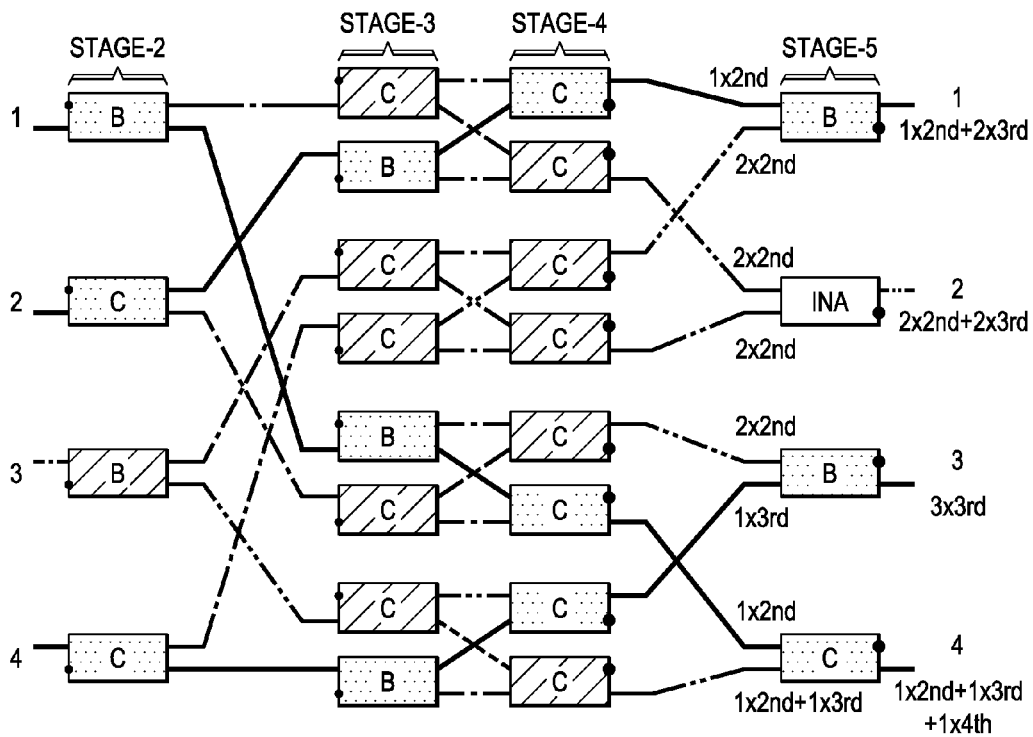
Figure 18K:
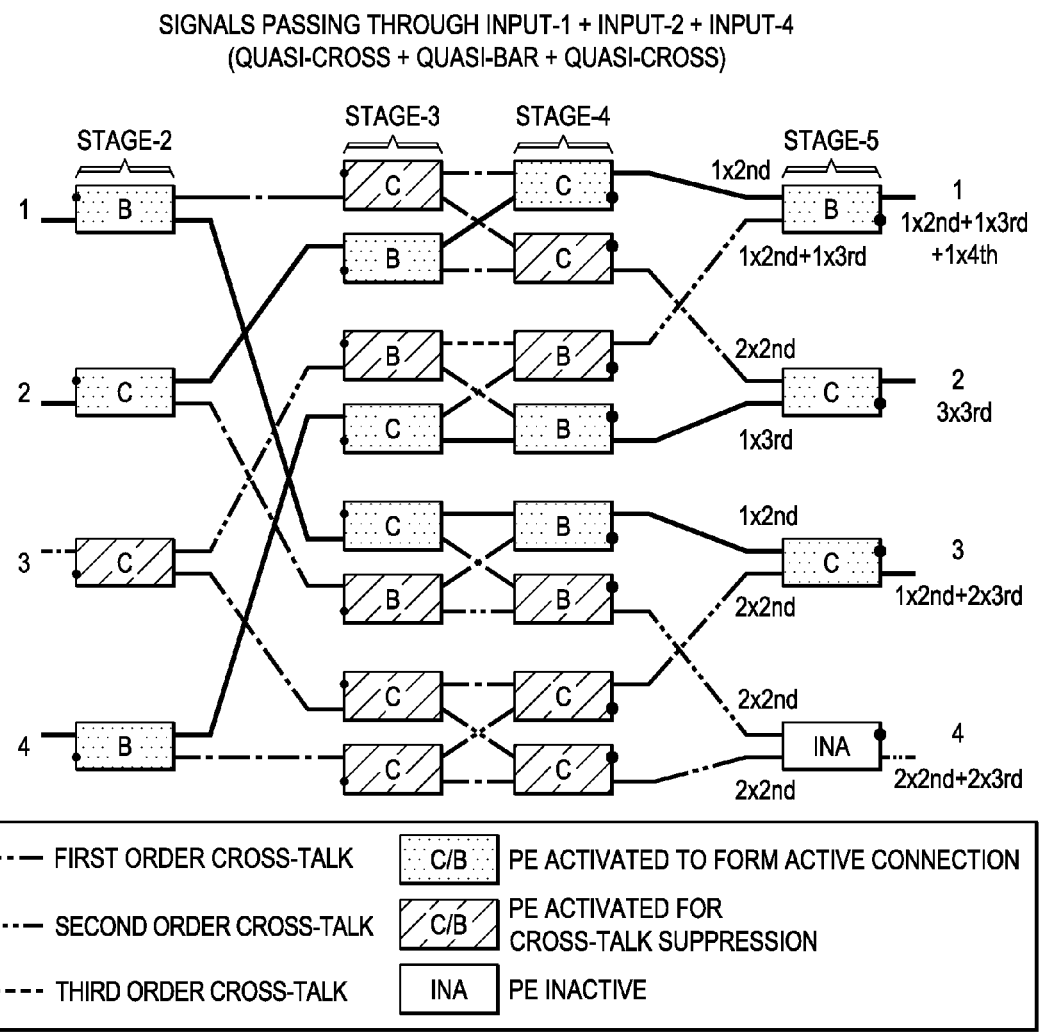
Figure 18L:
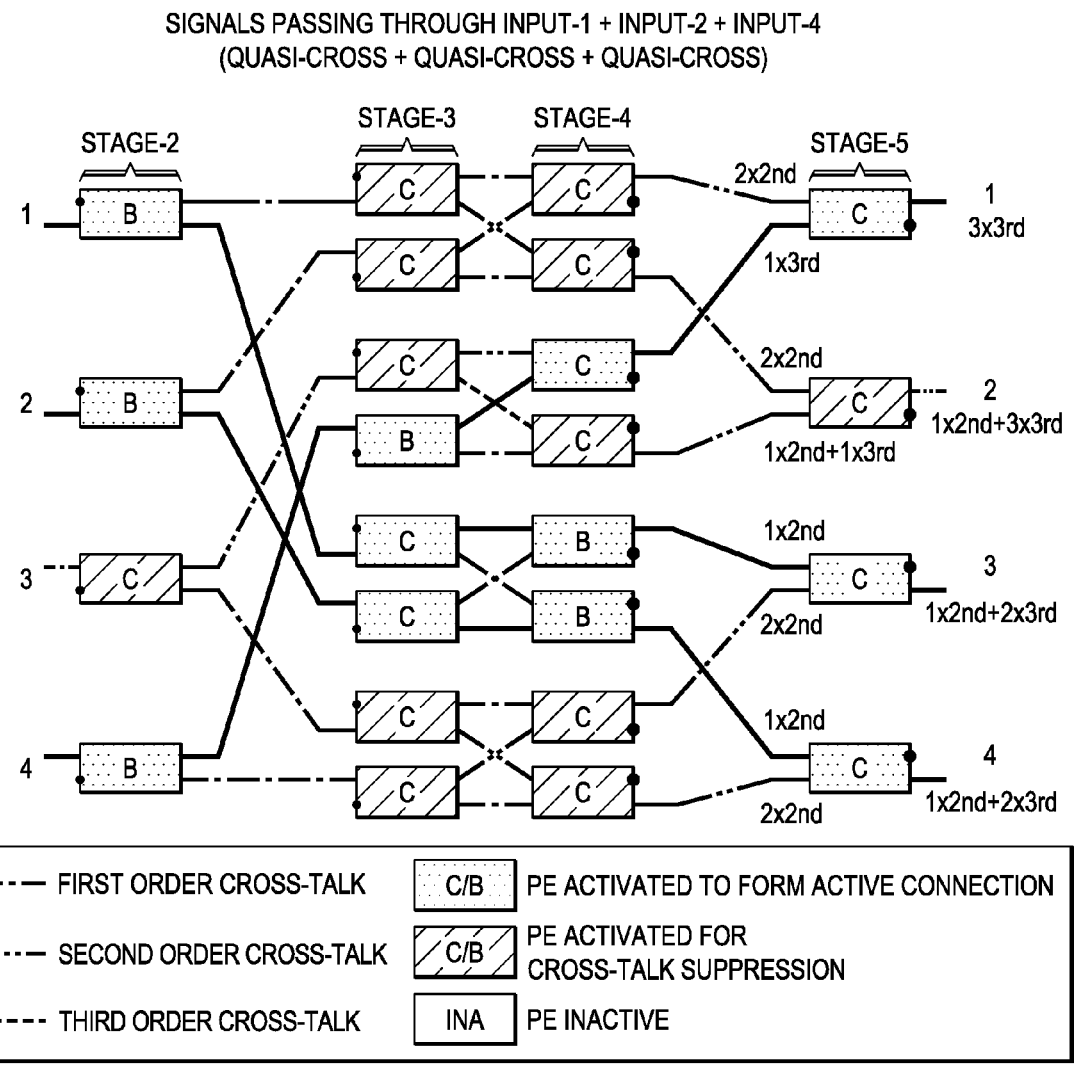

FIG. 15 illustrates the switching configurations if no signals pass through the 4×4 module. FIGS. 16A-16B illustrate the switching configurations if one signal passes through input-1 of the 4×4 module, and FIGS. 16C-16D illustrate the switching configurations if one signal passes through input-2 of the 4×4 module. The switching configurations for when one signal passes through the input-3 or the input-4 can be derived from FIGS. 16A-16D because the 4×4 module is symmetric about the dashed line shown in FIG. 14. This property greatly reduces the analyzing work of 4×4 modules. For example, switching configurations for the case when one signal passes through input port-1 can be used to derive switching configurations for a case when one signal passes through input port-4. FIGS. 17A-17P illustrate switching configurations when two signals pass through the 4×4 module. FIGS. 18A-18L illustrate switching configurations when three signals pass through the 4×4 module. FIGS. 19A-19H illustrate the various switching configurations for the 2×2 modules.

As discussed herein, the term "anear" may refer to the nearby port number of a given port number in set {1,2} or {3,4}. For example, the 1's anear is 2, the 3's anear is 4. As discussed herein, the term "quasi-bar" may refer to a signal's input port being connected to the adjacent output port, e.g., when a signal's input number belongs to {1,2} and output number belongs to {1,2}, or when the signal's input number belongs to {3,4} and output number belongs to {3,4}. As discussed herein, the term "quasi-cross" may refer to a signal's input port being connected to the opposite output port, e.g., when a signal's input number belongs to {1,2} and output number belongs to {3,4}, or when the signal's input number belongs to {3,4} and output number belongs to {1,2}. In one embodiment, the rules determining the switching configurations for photonic elements in stage-2 and stage-5 are summarized as follows:

If no signal passes through the 4×4 module, then all idle cells are set to cross.

If one signal passes through the 4×4 module, then the idle cells in column 2 are set in the following manner: the connected cell and its anear idle cell have the inverse state mutually, and the other idle cells are set to cross. Idle cells in column 5 are set in the following manner: If the connected cell is set to bar, then its anear idle cell is set to cross and the other idle cells are inactive; if the connected cell is set to cross, then the remaining three idle cells are set to cross.

If two signals pass through the 4×4 module over (input-1, input-2) or (input-3, input-4), then idle cells in column 2 are set to cross, and idle cells in column are set as follows: If both connected cells are bar, the remaining two idle cells are inactive; If both connected cells are cross, then the remaining two idle cells are set to bar; If the two connected cells have different state, then the idle cell anear to the bar-configured connected cell is set to cross and the idle cell anear to the cross-configured connected cell is inactive.

If two signals pass through the 4×4 module over (input-1, input-3) or (input-1, input-4), (input-2, input-3) or (input-2, input-4), then idle cells in column 2 are set to the inverse state of their anear connected cell respectively, and idle cells in column 5 are set as follows: if the two connected cells have the same state, their anear cells both have that state; If the two connected cells have different states, the remaining two idle cells are inactive.

If three signals pass through the 4×4 module, then the idle cell in column 2 is set to the inverse state of its anear connected cell, and the idle cells in column 5 are set as follows: If the three connected cells have same state mutually, then the idle cell has that state; If the three connected cells do not have same state mutually, the idle cell is inactive.

Figure 20:
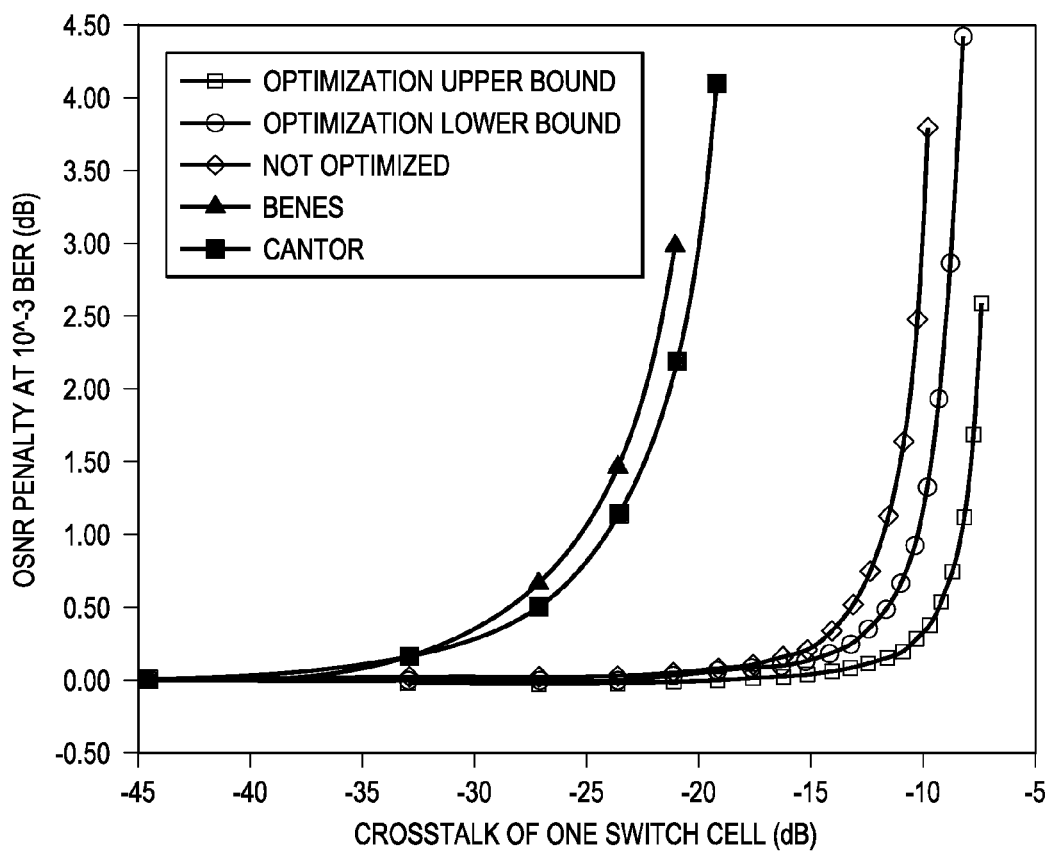
FIG. 20 illustrates a graph of crosstalk penalties for different phonic switching architectures and different levels of element crosstalk.

Aspects of this disclosure increase the manufacturing tolerances for photonic elements and/or photonic switching fabrics. FIG. 20 illustrates an example graph showing the relationship between Optical Signal to Noise Ratio (OSNR) penalties in a 6-span (480 km) line system with 100G coherent transmission for various photonic switch fabrics having different quality cells. The three lines showing the lowest OSNR penalty represent an N×N photonic switching architecture with varying degrees of crosstalk optimization, while the other lines show the OSNR penalty for Benes and Cantor architectures. For the purpose of comparison, assume that a switching fabric is being manufactured for a service provider (or customer) that desires an OSNR penalty of less than one decibel (dB). If photonic elements having an element crosstalk of −10 dB are used, then aspects of this disclosure allow the OSNR penalty for an N×N photonic switching architecture to be reduced from 3 dB (no optimization) to between 1 dB and 0.2 dB (with different levels of crosstalk optimization). If photonic elements having an element crosstalk of −12 dB are used, then aspects of this disclosure allow the OSNR penalty of an N×N photonic switching architecture to be reduced from 1 dB (no crosstalk optimization) to less than 0.1 dB (full cross-talk optimization). If −10 dB or −12 dB photonic elements are used, it may be difficult or impossible to manufacture a photonic switching fabric that meets the <1 dB performance requirement with a Benes or Cantor architectures.

Aspects of this disclosure provide a recursive optimization algorithm for configuring idle photonic switching elements to achieve crosstalk suppression in an N×N photonic switching fabric. As discussed herein, an N×N photonic switching fabric is a fabric with N inputs and N outputs. Different levels of optimization provide different levels of power savings and cross-talk suppression. For example, consider a 8×8 photonic switching fabric with a switching configuration (or permutation) that produces 64 idle cells prior to optimization. Embodiment full optimization techniques may configure all 64 inactive cells to reduce crosstalk, and consequently may provide the best noise performance and highest power usage. Partial optimizations may configure fewer than all 64 inactive cells to reduce crosstalk, and may provide sub-optimal noise performance at lower power usages. One type of partial optimization may configure inactive cells in stages three and four to reduce crosstalk, while another type of partial optimization may configure inactive cells in stages four and five to reduce crosstalk. Yet another type of partial optimization may configure cell inactive cells in stage four to reduce crosstalk. Details for embodiment recursive algorithms for full and partial optimization of N×N switching architectures are provided below.

Figure 21:
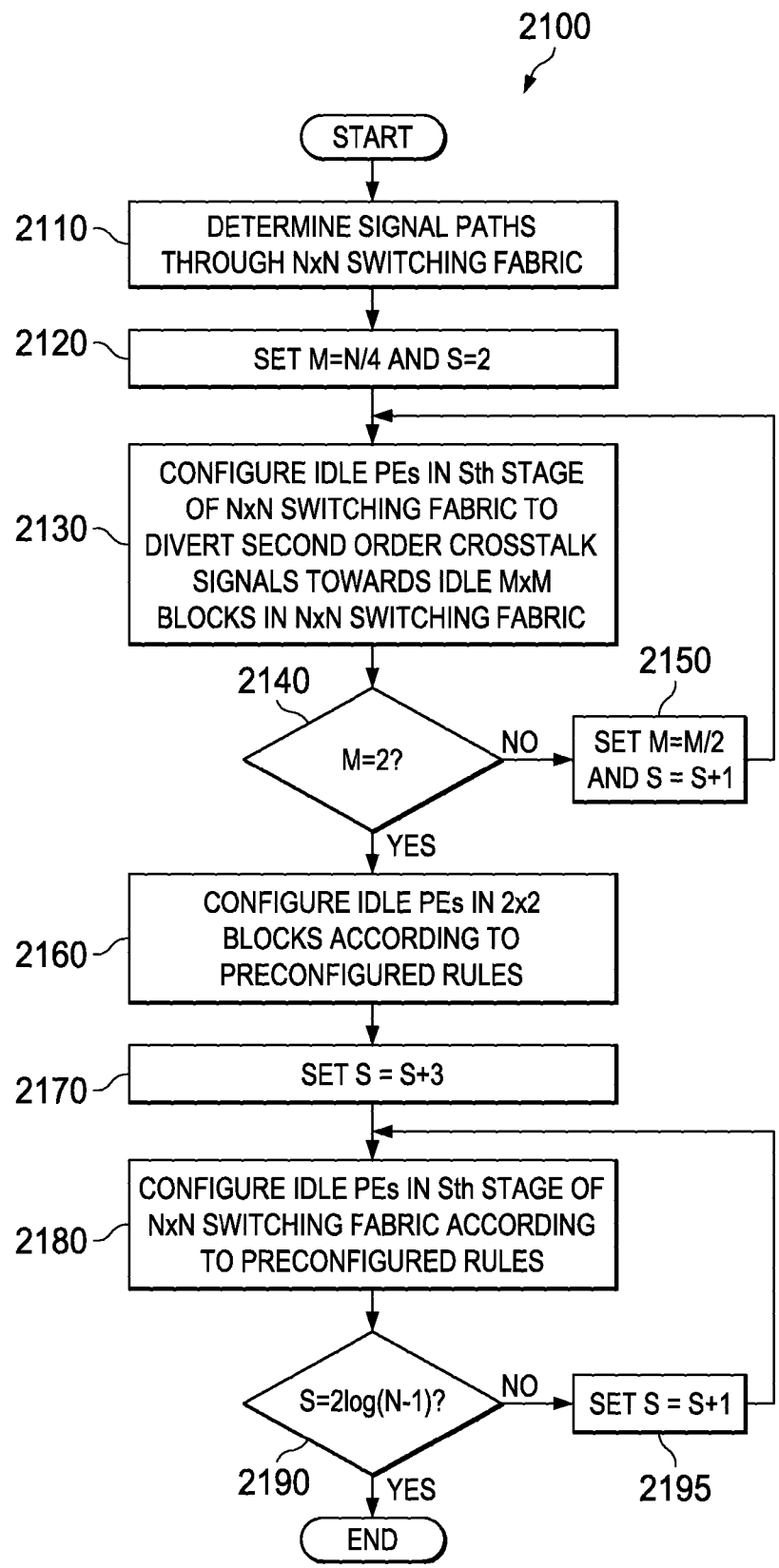
FIG. 21 illustrates a flowchart of an embodiment method for configuring idle photonic elements to suppress crosstalk in an N×N photonic switching fabric

Aspects of this disclosure provide a recursive optimization algorithm for achieving full optimization in an N×N switching fabric. FIG. 21 illustrates a method 2100 for using an embodiment recursive algorithm for full optimization that configures idle photonic elements to suppress crosstalk in an N×N photonic switching fabric, as might be performed by a controller. The method 2100 begins with step 2110, where the controller determines signal paths through an N×N switching fabric. The signal paths may refer to paths that the data signal traverses through the switching matrixes. Thereafter, the method 2100 proceeds to step 2120, where the controller sets a first parameter (M) to N/4 and a second parameter (S) to 2. The parameters correspond to an $S^{th}$ stage of photonic elements that are set to direct crosstalk towards idle M×M subblocks during a given iteration. Generally speaking, the $S^{th}$ stage of photonic elements correspond to a column preceding the group of M×M subblocks. Subsequently, the method 2100 proceeds to step 2130, where the controller configures idle photonic elements in the $S^{th}$ stage of the N×N switching fabric to divert second order crosstalk signals towards idle M×M blocks in the N×N switching fabric. Next, the method 2100 proceeds to step 2140, where the controller determines if M is equal to two. If not, then the controller increments S and divides M by two at step 2150, after which the method 2100 reverts back to step 2130. The number of iterations of the steps 2130-2150 will depend on the size of the switching fabric. For example, an 8×8 switching fabric (e.g., N=8) will include one iteration, while a 16×16 switching fabric will include two iterations. Once M is reduced to two, the method proceeds to step 2160, where the controller configures idle PEs in the remaining 2×2 blocks according to predetermined rules. Thereafter, the method 2100 proceeds to steps 2170-2180, where S is incremented by 3, and the idle PEs in the Sth stage of the N×N switching fabric are configured according to predetermined rules. Next, the method 2100 proceeds to steps 2190, where it is determined whether S is equal to $2 \log_2 N-1$. If not, S is incremented by one at step 2195, and the method reverts back to step 2180. The method 2100 concludes once S is incremented to the value of $2 \log_2 N-1$.

Figure 22B:
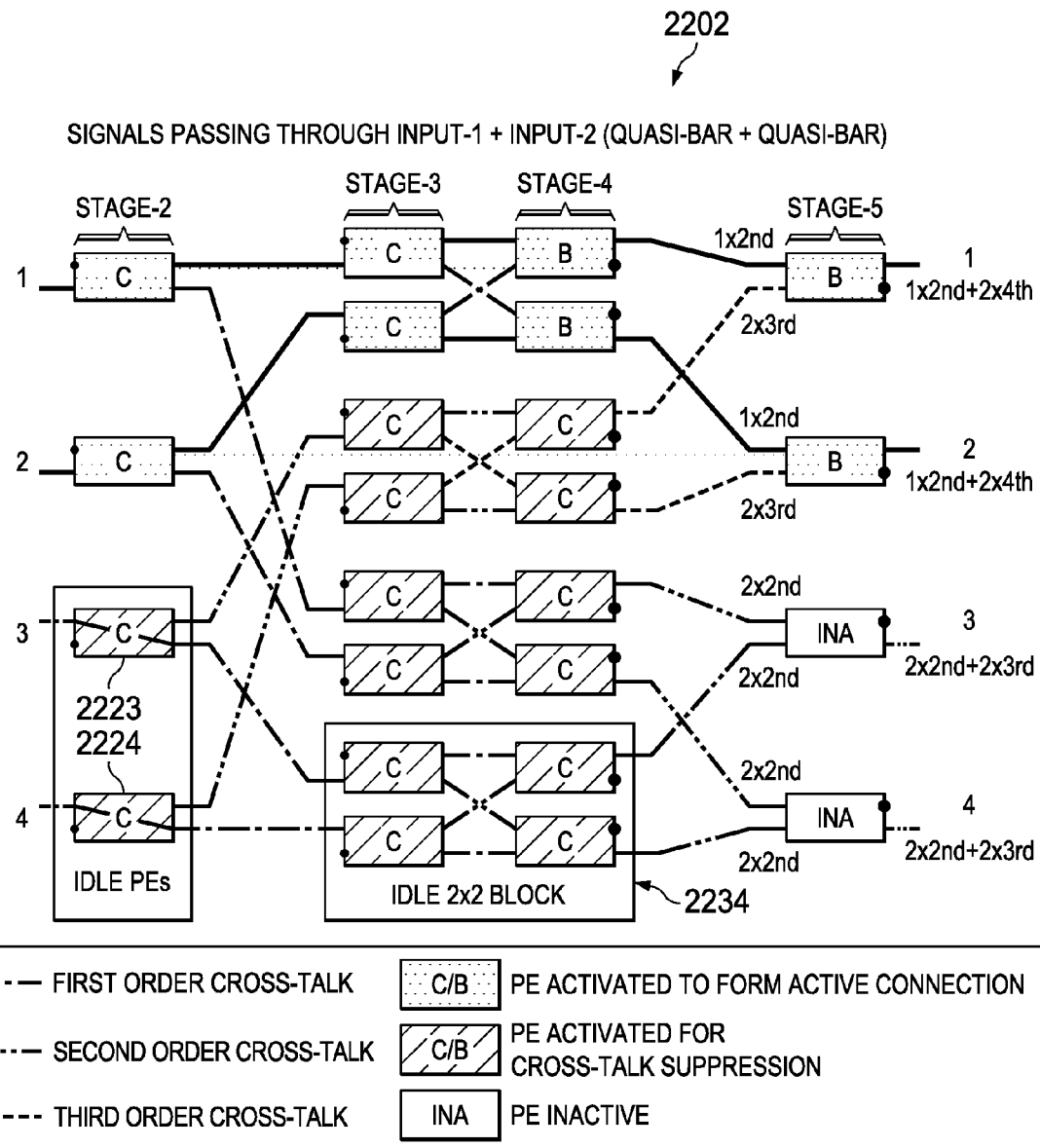
Figure 22C:
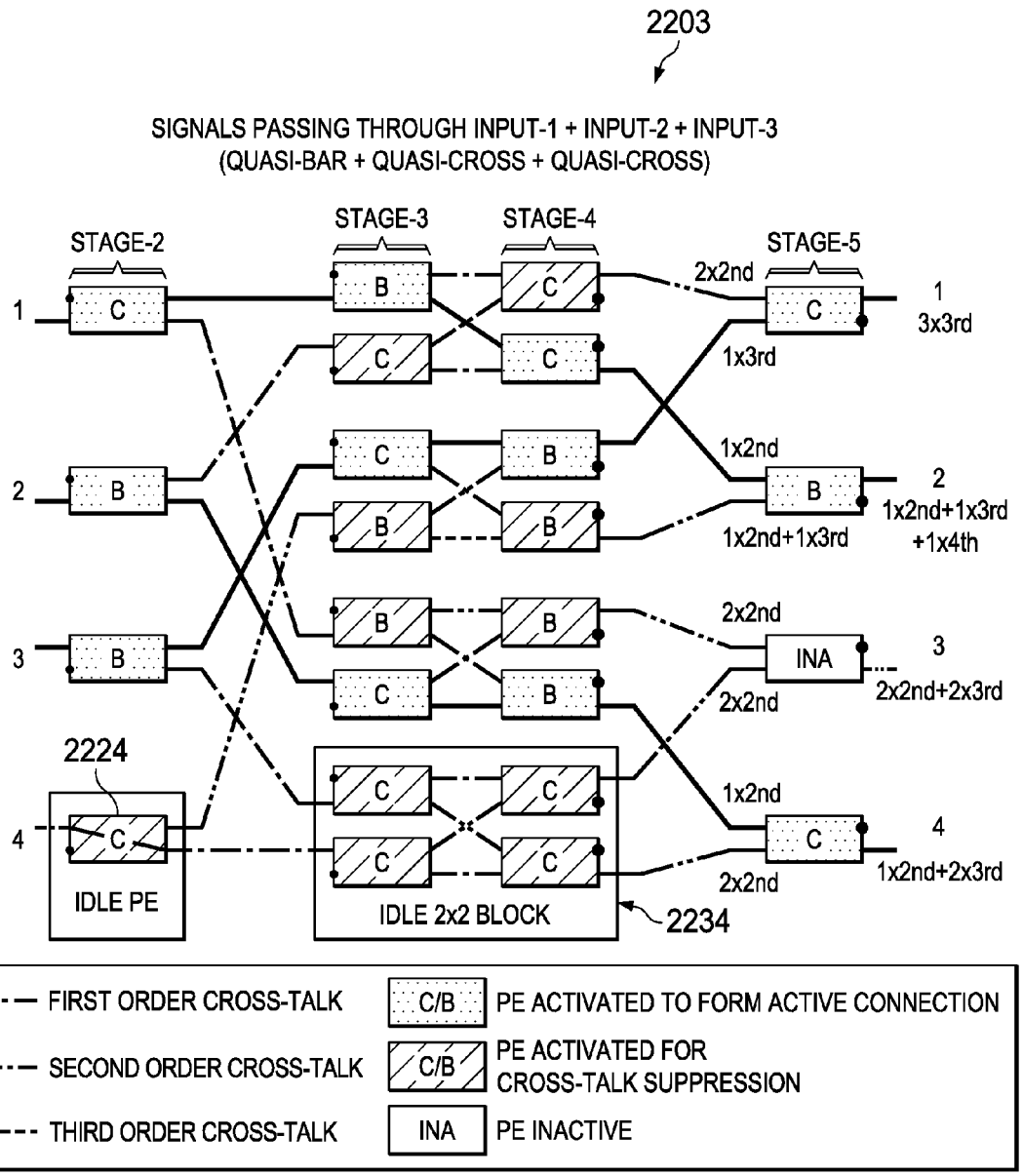

As discussed above, the idle PEs in the Sth stage are set to divert crosstalk towards idle M×M blocks. FIGS. 22A-22C depict how idle PEs in the Sth stage (S=2) are set to divert crosstalk towards idle M×M blocks (M=2) for different switching configurations in a 4×4 switching fabric. In FIG. 22A, the 4×4 switching fabric 2201 has a signal passing from the first input to the first output. Accordingly, the bottom three PEs 2222, 2223, 2224 in the Sth stage (i.e., stage 2) are idle, while the bottom two M×M blocks 2233, 2234 are idle. As such, the idle PEs 2222, 2223, 2224 are configured to divert crosstalk signals toward the bottom two M×M blocks 2233, 2234. Specifically, the PE 2222 has a bar configuration to divert crosstalk to the M×M block 2233, while the PEs 2223, 2224 have cross configuration to divert crosstalk to the M×M block 2234.

In FIG. 22B, the 4×4 switching fabric 2202 has signals passing from the first input and the second input to the first output and the second output, respectively. Accordingly, the bottom two PEs 2223, 2224 in the Sth stage (i.e., stage 2) are idle, while the bottom M×M block 2234 is idle. As a result, the idle PEs 2223, 2224 have a cross configuration to divert crosstalk to the M×M block 2234. In FIG. 22C, the 4×4 switching fabric 2203 has signals passing from the first, second, and third inputs to the first, second, and third outputs, respectively. Accordingly, the PE 2224 and the M×M block 2234 are idle, with the PE 2224 having a cross configuration to divert crosstalk to the M×M block 2234. Notably, the appropriate settings for idle PEs in other switching fabric configurations can be derived from the principles described above. For example, if a signal was passing from input four to output four, then the first three PEs in the Sth stage (i.e., second stage) would be configured to direct crosstalk to the first two M×M blocks. Moreover, these techniques are scalable to any size switching fabric.

Figure 23:
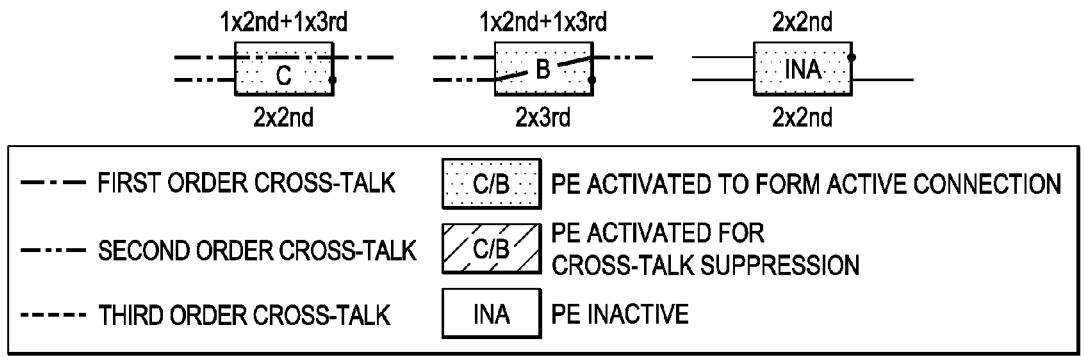
FIG. 23 illustrates a diagram depicting rules for configuring idle blocks in the right-most stages of an N×N switching fabric.

Once M is reduced to two, the 2×2 blocks are configured according to predetermined rules. The rules for determining the switching configurations for 2×2 blocks are demonstrated in FIGS. 19A-19H. After configuring the 2×2 blocks, the stages coupled between the 2×2 blocks and the output ports are configured, e.g., $\log_2 N < S < 2 \log_2 N$. The rules for configuring idle blocks in the right-most stages (e.g., stage 5 in an 8×8 architecture) is depicted in FIG. 23. Specifically, if one of the input ports of the idle photonic element is receiving a higher order of crosstalk than the other, then the output port is linked to the higher order crosstalk input port, as demonstrated by each of the left-most photonic elements in FIG. 23. Conversely, if both input ports are receiving the same order of crosstalk, then the photonic element is left inactive, as demonstrated by the right-most photonic element in FIG. 23.

Figure 24:
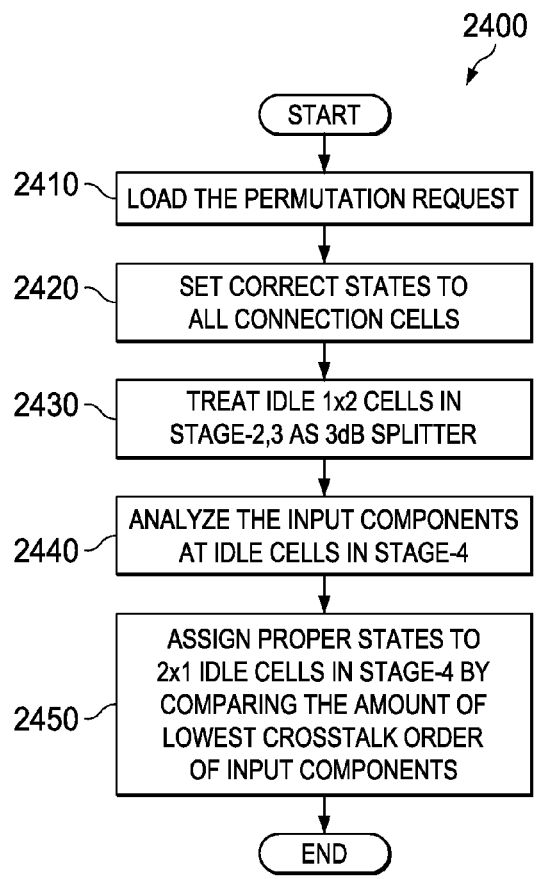
FIG. 24 illustrates a flowchart of an embodiment method for configuring idle photonic elements in stage four of an 8×8 architecture to mitigate crosstalk.
Figure 25A:
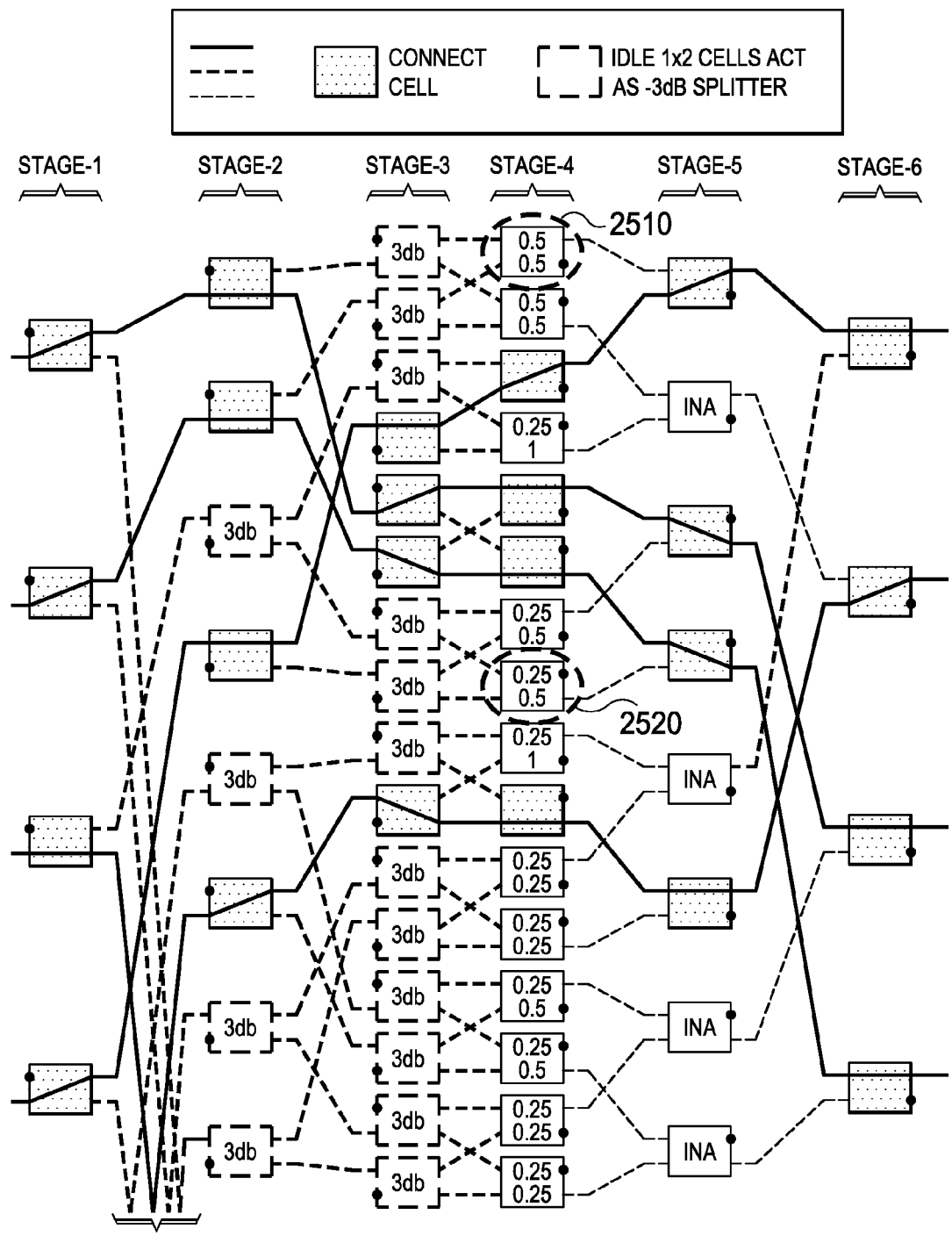
FIG. 25A-25C illustrate diagrams of an embodiment 8×8 dilated banyan architecture having idle cells in stage four configured to mitigate crosstalk.
Figure 25B:
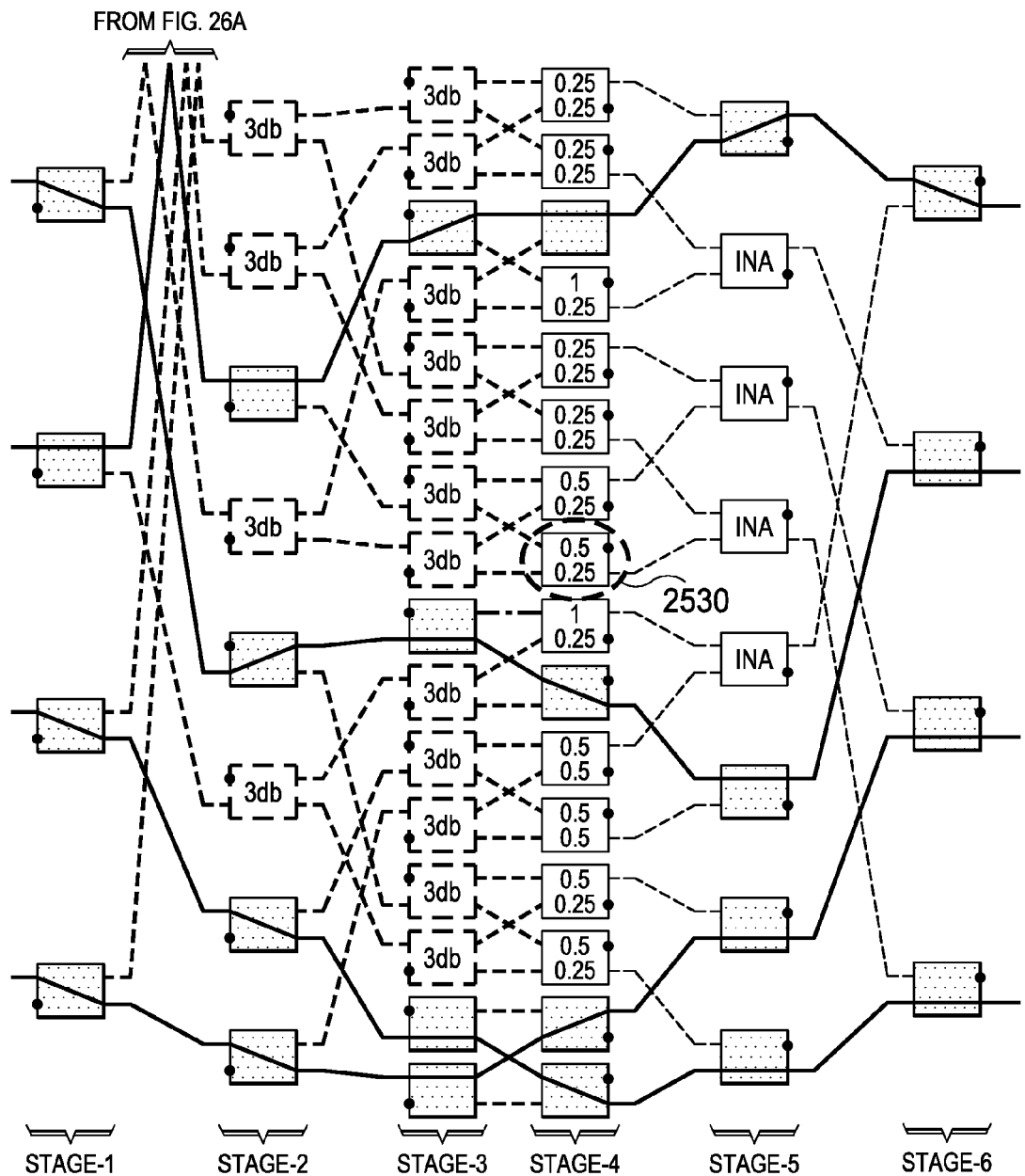
Figure 25C:
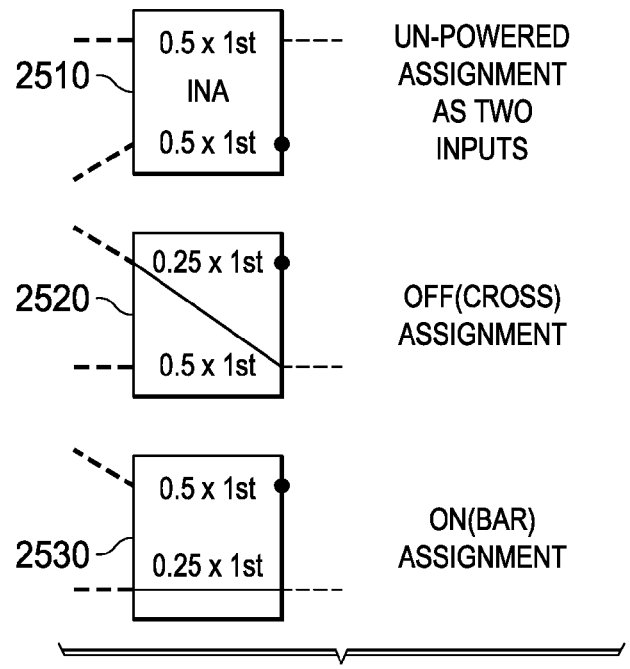

Aspects of this disclosure provide a recursive optimization algorithm for achieving partial optimization in an N×N switching fabric. In one embodiment, only idle cells in stage 4 of an 8×8 switching architecture are configured to reduce crosstalk. FIG. 24 illustrates a method 2400 for configuring idle cells in stage four of an 8×8 architecture to mitigate crosstalk. As shown, the method 2400 begins at step 2410, where the controller loads the permutation request, which defines the signal path configuration of the switching fabric. Next, the method 2400 proceeds to step 2420, where the controller sets the correct states to all connection cells to configure the switching fabric to provide the signal pathways used to transport the data signals. Thereafter, the method 2400 proceeds to step 2430, where the controller treats idle 1×2 cells in the stages 2 and 3 as a 3 db splitter. Subsequently, the method 2400 proceeds to step 2440, where the controller analyzes the input signals at idle cells in the 4th stage. Next, the method 2400 proceeds to step 2450, where the controller assigns proper states to the idle cells in the stage being configured by comparing the amount of crosstalk projected to be received on the input components based on the 3 db splitters. FIG. 25A-25C illustrate an embodiment 8×8 dilated banyan architecture that displays how stage four is configured during recursive optimization.

Figure 26:
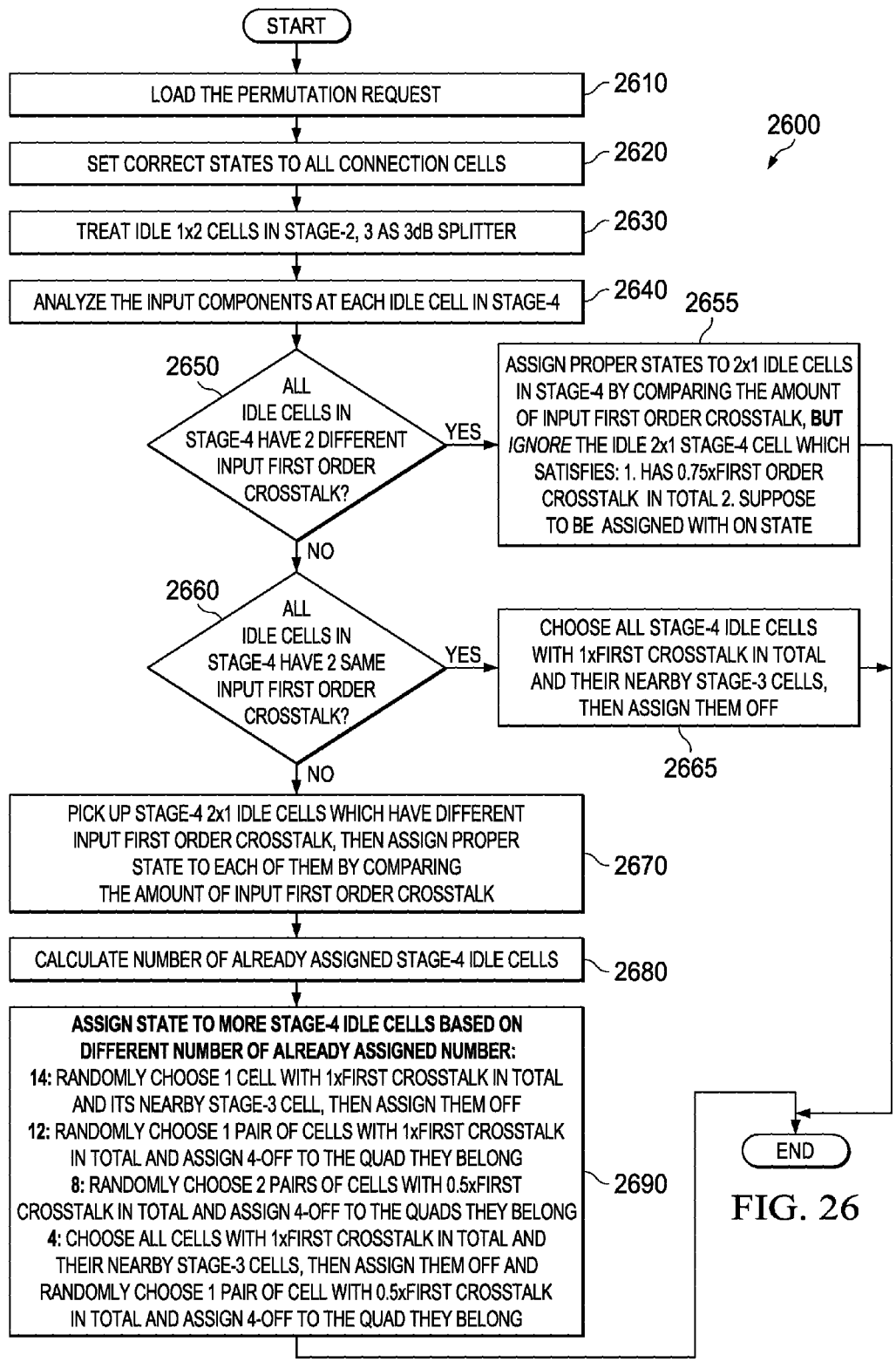
FIG. 26 illustrates a flowchart of an embodiment method for configuring sixteen idle cells in stages three and four of an 8×8 photonic switching fabric to mitigate crosstalk.

In another embodiment, a fixed number of cells in stages 3 and 4 of an 8×8 switching architecture are configured to reduce crosstalk. FIG. 26 illustrates a method 2600 for configuring sixteen idle cells in stages three and four of an 8×8 architecture to mitigate crosstalk. In embodiments, the method 2600 may use a sorting algorithm to sort (and select) idle cells based on their input values. As shown, the method 2600 begins at step 2610, where the controller loads the permutation request, which defines the signal path configuration of the switching fabric. Next, the method 2600 proceeds to step 2620, where the controller sets the correct states to all connection cells to configure the switching fabric to provide the signal pathways used to transport the data signals. Thereafter, the method 2600 proceeds to step 2630, where the controller treats idle 1×2 cells in the stages 2 and 3 as a 3 db splitter. Subsequently, the method 2600 proceeds to step 2640, where the controller analyzes the input signals at idle cells in the stage being configured.

Thereafter, the method 2600 proceeds to step 2650, where the controller determines if all idle cells in stage four have different levels of first order crosstalk over their inputs. If so, then the method proceeds to step 2655, where the controller assigns proper states to the idle cells in the fourth stage by comparing the amount of crosstalk projected to be received on the input components with the exception that cells satisfying one (or both) of the following criteria are left idle: (1) cells having a combination of 0.75× first order crosstalk (or less) across input ports and (2) cells that would set to bar-state (or on-state). A cell meeting both exception criteria for step 2655 is demonstrated by cell 2720 in FIG. 27.

If some of the idle cells in stage four have the same amount of first order crosstalk across their respective inputs, then the method 2600 proceeds to step 2660, where the controller determines if all idle cells in stage four have the same levels of second order crosstalk over there inputs. If so, the method proceeds to step 2665, where the controller identifies stage-4 cells having 1× first order crosstalk across their input ports, and assigns corresponding cells in stage 3 to direct crosstalk away from those cells.

Figure 27:
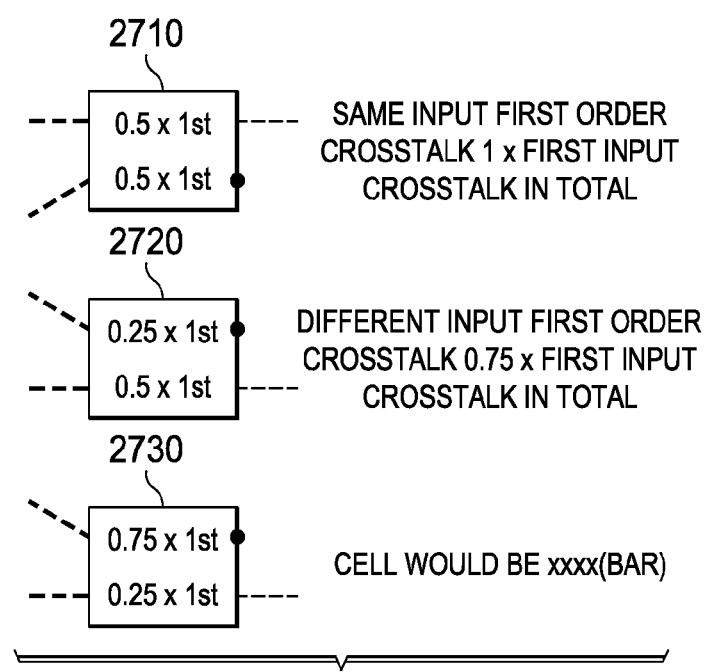
FIG. 27 illustrates a diagram of cell configurations that demonstrate rules applied in the method depicted by FIG. 26.

Otherwise, the method 2600 proceeds to step 2670, where the controller picks stage 4 idle cells having different first order crosstalk across their inputs, and assigns the proper state based on that differential. Next, the method 2600 proceeds to step 2670, where the controller identifies the number of assigned stage-4 idle cells, to determine how many idle cells are left to assign (e.g., number already assigned (in step 2670) subtracted from total number being assigned, e.g., 16). Finally, the method 2600 proceeds to step 2690, where the remaining cells are assigned based on the rules specified in the step 2690. FIG. 27 illustrates cell configurations demonstrating the rules applied in steps 2650-2655 of the method 2600.

Figure 28:
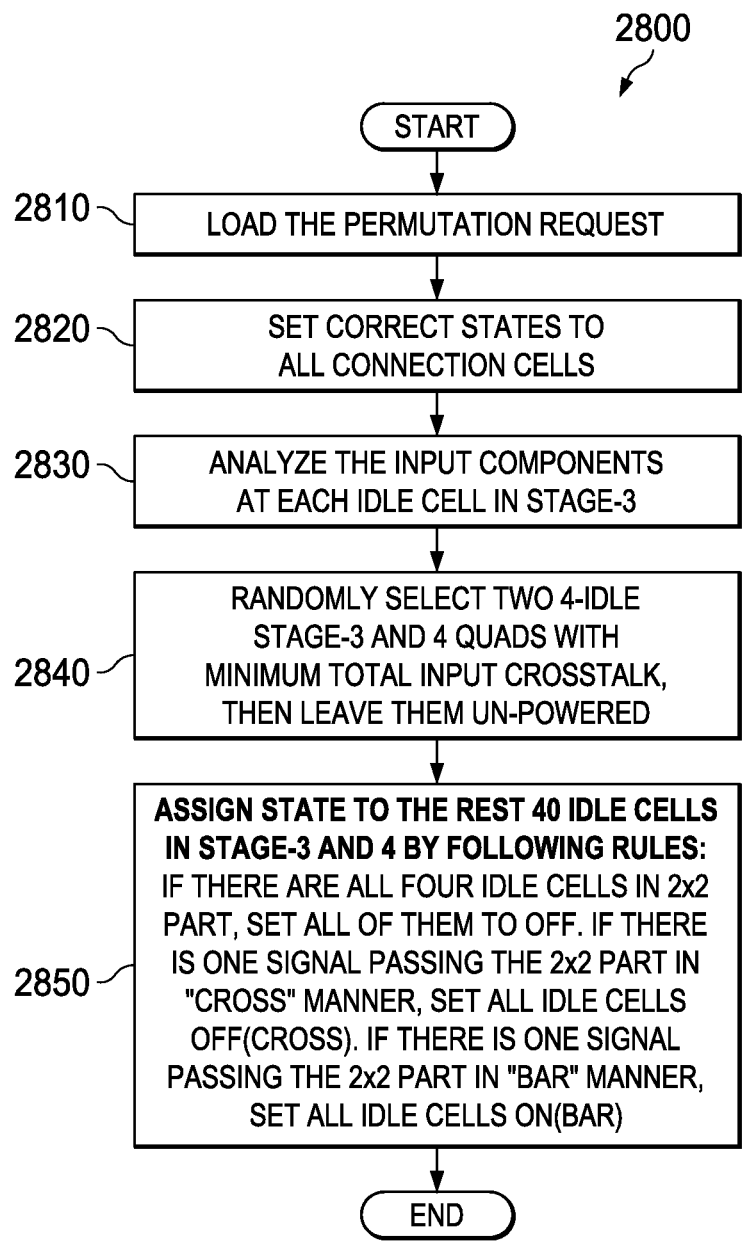
FIG. 28 illustrates a flowchart of an embodiment method for configuring forty idle cells in stages three and four of an 8×8 photonic switching fabric to mitigate crosstalk.

Different numbers of idle cells can be configured to mitigate crosstalk in an N×N switching architecture. FIG. 28 illustrates a method 2800 for configuring forty idle cells in stages three and four of an 8×8 architecture to mitigate crosstalk. As shown, the method 2800 begins at step 2810, where the controller loads the permutation request, which defines the signal path configuration of the switching fabric. Next, the method 2800 proceeds to step 2820, where the controller sets the correct states to all connection cells to configure the switching fabric to provide the signal pathways used to transport the data signals. Thereafter, the method 2800 proceeds to step 2830, where the controller analyzes the input components of each idle cell in stage-3. Subsequently, the method 2800 proceeds to step 2840, where the controller randomly selects two 4×4 blocks of idle cells in stages 3 and 4 with minimum total input crosstalk to leave unpowered. Finally, the method 2800 proceeds to step 2850, where the controller assigns states to the remaining forty idle cells based on the rules specified in step 2850.

Figure 29:
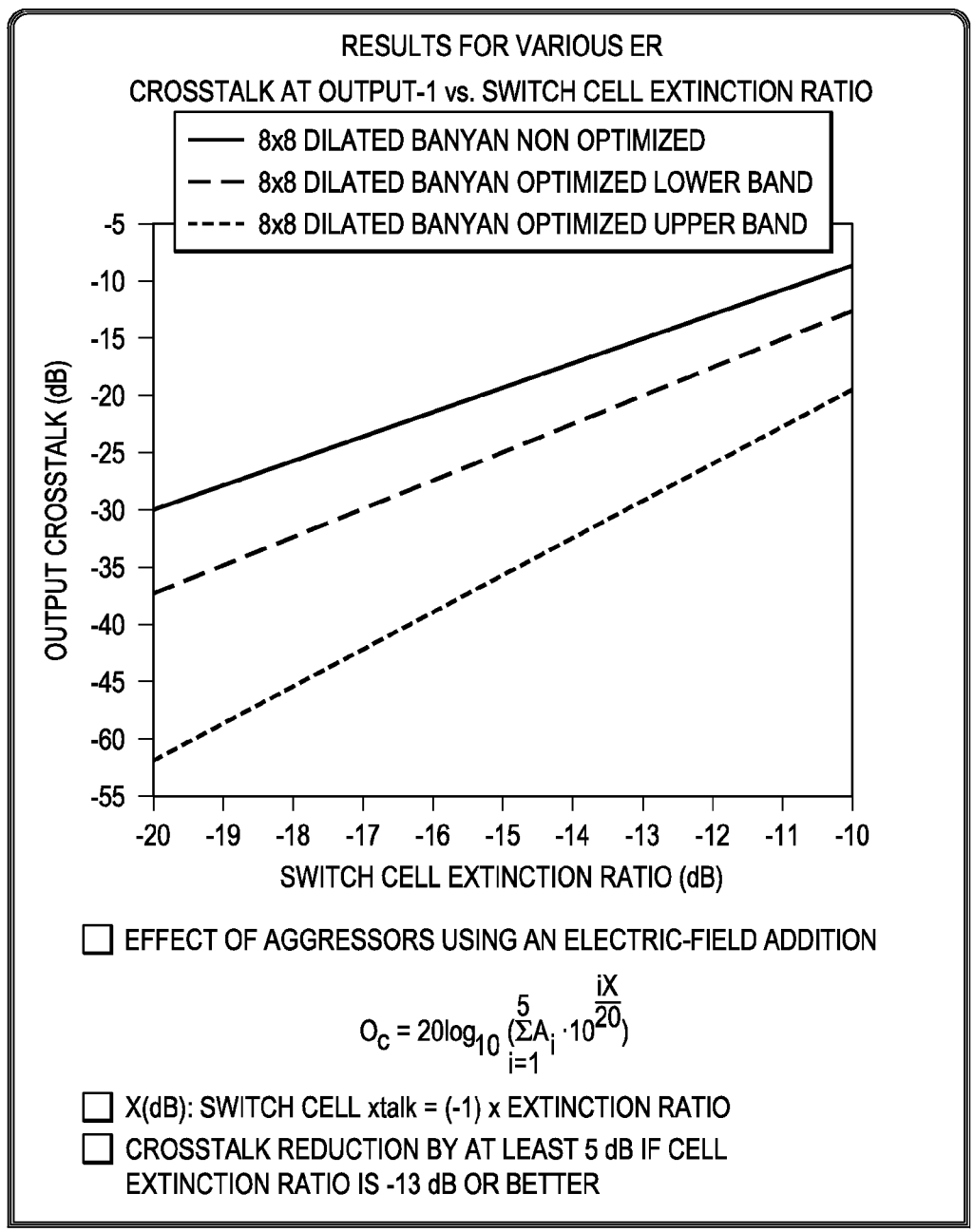
FIG. 29 illustrates a graph of simulated crosstalk for 8×8 dilated banyan architectures with different configurations.

FIG. 29 illustrates results of crosstalk analysis for 8×8 dilated banyan architectures with different configurations over a range of extinction ratios. As shown, the non-optimized architecture provides the worst performance of the illustrated solutions, while the optimized architectures provide different levels of performance improvements based on their level of optimization. FIG. 30 illustrates a chart depicting the performance of different optimization schemes in an 8×8 enhanced dilated banyan (EDB) architecture.

Figure 31:
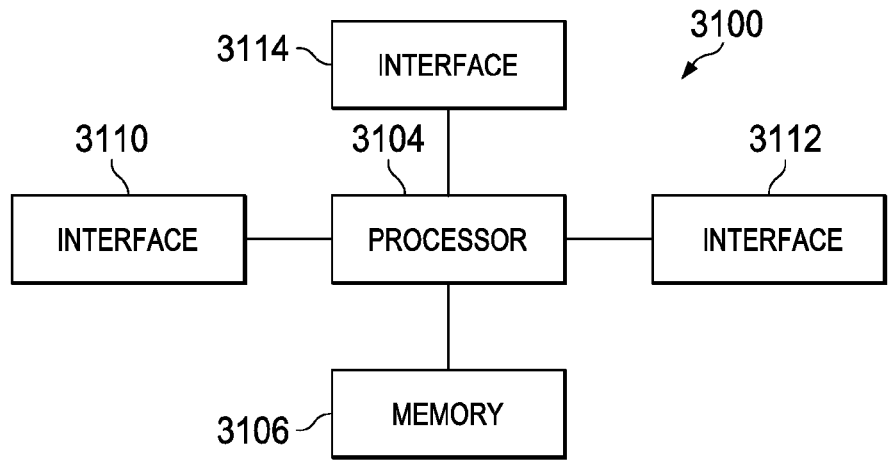
FIG. 31 illustrates a diagram of an embodiment device for performing aspects of this disclosure.

FIG. 31 illustrates a block diagram of an embodiment of a device 3100 for performing methods and techniques described herein. The device 3100 may include a processor 3104, a memory 3106, and a plurality of interfaces 3110, 3112, 3114, which may (or may not) be arranged as shown in FIG. 31. The processor 3104 may be any component capable of performing computations and/or other processing related tasks, and the memory 3106 may be any component capable of storing programming and/or instructions for the processor 3104. The interfaces 3110, 3112, and 3114 may be any component or collection of components that allows the communications device 3100 to communicate with other devices.

Figure 32:
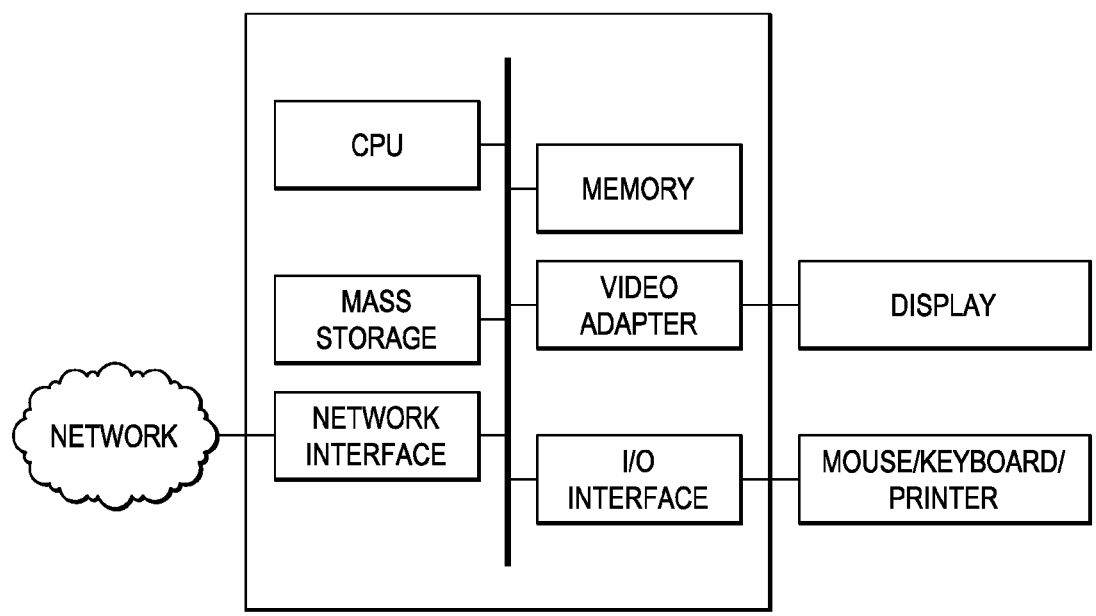
FIG. 32 illustrates a diagram of an embodiment processing system for performing aspects of this disclosure.

FIG. 32 is a block diagram of such a processing system. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The implementation of the bus can assume a silicon photonic connectivity described in the embodiment. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for determining switching configurations of idle cells to suppress cross-talk in photonic switching fabrics, the method comprising:
   identifying signal paths through an N×N photonic switching fabric, wherein the N×N photonic switching fabric includes N input ports, N output ports, and a plurality of photonic elements (PEs) positioned in between the N input ports and the N output ports, the plurality of PEs being arranged in a central stage of 2×2 PE blocks, a first set of PE stages positioned in between the central stage and the N input ports, and a second set of PE stages positioned in between the central stage and the N output ports;
   identifying idle PEs in the plurality of PEs, the idle PEs being inactive when the N×N photonic switching fabric is configured to provide the signal paths;
   determining a cross-talk suppression map for the idle PEs in accordance with a recursive algorithm, the cross-talk suppression map specifying active configurations for at least one idle PE to reduce cross-talk between the signal paths; and
   either sending, by a device, the cross-talk suppression map to a controller of the N×N switching fabric or configuring, by the device, the N×N switching fabric in accordance with the cross-talk suppression map.

2. The method of claim 1, wherein determining the cross-talk suppression map in accordance with the recursive algorithm comprises:
   selecting configurations for idle PEs in the first set of PE stages to direct crosstalk towards idle 2×2 PE blocks in the central stage of 2×2 PE blocks during a first sequence of one or more iterations.

3. The method of claim 2, wherein determining the cross-talk suppression map in accordance with the recursive algorithm further comprises:
   selecting configurations for idle PEs in the central stage of 2×2 PE blocks by applying a first set of predetermined rules to ingress signals of the 2×2 PE blocks.

4. The method of claim 3, wherein the ingress signals of the 2×2 PE blocks include crosstalk signals exiting the first set of PE stages.

5. The method of claim 4, wherein the crosstalk signals exiting the first set of PE stages are a function of both the signal paths and the configurations selected for idle PEs in the first set of stages during the first sequence of one or more iterations.

6. The method of claim 4, wherein the crosstalk signals exiting the central stage of 2×2 PE blocks are a function of the signal paths, the crosstalk signals exiting the first set of PE stages, and the configurations selected for idle PEs in the central stage of 2×2 PE blocks.

7. The method of claim 3, wherein selecting configurations for idle PEs in the central stage of 2×2 blocks comprises:
   selecting configurations for idle PEs in the second set of PE stages by applying a second set of predetermined rules to ingress signals of the idle PEs in the second set of stages.

8. The method of claim 7, wherein the ingress signals of the idle PEs in the second set of PE stages include crosstalk signals exiting the central stage of 2×2 PE blocks.

9. The method of claim 1, wherein the device sends the cross-talk suppression map to the controller of the N×N switching fabric.

10. The method of claim 1, wherein the device configures the N×N switching fabric in accordance with the cross-talk suppression map.

11. An apparatus comprising:
    a processor; and
    a computer readable storage medium storing programming for execution by the processor, the programming including instructions to:
    identify signal paths through an N×N photonic switching fabric, wherein the N×N photonic switching fabric includes N input ports, N output ports, and a plurality of photonic elements (PEs) positioned in between the N input ports and the N output ports, the plurality of PEs being arranged in a central stage of 2×2 PE blocks, a first set of PE stages positioned in between the central stage and the N input ports, and a second set of PE stages positioned in between the central stage and the N output ports;
    identify idle PEs in the plurality of PEs, the idle PEs being inactive when the N×N photonic switching fabric is configured to provide the signal paths;
    determine a cross-talk suppression map for the idle PEs in accordance with a recursive algorithm, the cross-talk suppression map specifying active configurations for at least one idle PE to reduce cross-talk between the signal paths; and
    either send the cross-talk suppression map to a controller of the N×N switching fabric or configure the N×N switching fabric in accordance with the cross-talk suppression map.

12. The apparatus of claim 11, wherein the instructions to determine the cross-talk suppression map in accordance with the recursive algorithm include instructions to:
    select configurations for idle PEs in the first set of PE stages to direct crosstalk towards idle 2×2 PE blocks in the central stage of 2×2 PE blocks during a first sequence of one or more iterations.

13. The apparatus of claim 12, wherein the instructions to determine the cross-talk suppression map in accordance with the recursive algorithm further include instructions to:
    select configurations for idle PEs in the central stage of 2×2 PE blocks by applying a first set of predetermined rules to ingress signals of the 2×2 PE blocks.

14. The apparatus of claim 13, wherein the ingress signals of the 2×2 PE blocks include crosstalk signals exiting the first set of PE stages.

15. The apparatus of claim 14, wherein the crosstalk signals exiting the first set of PE stages are a function of both the signal paths and the configurations selected for idle PEs in the first set of stages during the first sequence of one or more iterations.

16. The apparatus of claim 15, wherein the instructions to select configurations for idle PEs in the central stage of 2×2 blocks include instructions to:

select configurations for idle PEs in the second set of PE stages by applying a second set of predetermined rules to ingress signals of the idle PEs in the second set of stages.

17. The apparatus of claim 16, wherein the ingress signals of the idle PEs in the second set of PE stages include crosstalk signals exiting the central stage of 2×2 PE blocks.

18. The apparatus of claim 14, wherein the crosstalk signals exiting the central stage of 2×2 PE blocks are a function of the signal paths, the crosstalk signals exiting the first set of PE stages, and the configurations selected for idle PEs in the central stage of 2×2 PE blocks.

19. The apparatus of claim 11, wherein the programming includes instructions to send the cross-talk suppression map to the controller of the N×N switching fabric.

20. The apparatus of claim 11, the programming includes instructions to configure the N×N switching fabric in accordance with the cross-talk suppression map.

\* \* \* \* \*